United States Patent
Negishi et al.

[11] Patent Number: 5,871,266
[45] Date of Patent: Feb. 16, 1999

[54] PROJECTION-TYPE DISPLAY DEVICE

[75] Inventors: Masataka Negishi, Saitama-ken; Eiki Matsuo, Nagano-ken, both of Japan

[73] Assignee: Nissho Giken Kabushiki Kaisha, Urawa, Japan

[21] Appl. No.: 793,538
[22] PCT Filed: Jun. 26, 1996
[86] PCT No.: PCT/JP96/01767
   § 371 Date: Feb. 25, 1997
   § 102(e) Date: Feb. 25, 1997
[87] PCT Pub. No.: WO97/01787
   PCT Pub. Date: Jan. 16, 1997

[30] Foreign Application Priority Data

Jun. 26, 1995 [JP] Japan ................................. 7-192346

[51] Int. Cl.$^6$ .................................................. G03B 21/28
[52] U.S. Cl. ............................................ 353/98; 353/102
[58] Field of Search ................................ 353/38, 69, 98, 353/99, 102, 122; 349/5, 61, 62

[56] References Cited

U.S. PATENT DOCUMENTS

| | | | |
|---|---|---|---|
| 5,418,583 | 5/1995 | Masumoto | 353/38 |
| 5,491,525 | 2/1996 | Yamasaki et al. | 353/98 |
| 5,662,401 | 9/1997 | Shimizu et al. | 353/38 |
| 5,749,642 | 5/1998 | Kimura et al. | 353/98 |

FOREIGN PATENT DOCUMENTS

| | | |
|---|---|---|
| 2-195319 | 8/1990 | Japan . |
| 5-203903 | 8/1993 | Japan . |
| 6-1295 | 1/1994 | Japan . |
| 7-174974 | 7/1995 | Japan . |
| 7-181392 | 7/1995 | Japan . |

*Primary Examiner*—William Dowling
*Attorney, Agent, or Firm*—Fish & Richardson P.C.

[57] ABSTRACT

Disclosed is an inexpensive, bright, compact, lightweight, high-definition projection-type display device that has a comparatively simple structure but satisfies demands for oblique projection, uniform illumination, a deep focal depth, and magnified projection over a short distance. The display device comprises a light source (1a); an illumination portion (1) consisting of a group of collection angle control components, which comprises at least one optical surface (1c) for receiving a principal light ray generated from the imaginary center of the light source (1a) and controlling the solid collection angle thereof, and a group of luminous flux control components, which comprises at least two optical surfaces which are an optical surface (1d) mainly having a spatial distribution control function over the principal light ray in a virtual plane provided perpendicular to the direction of propagation of the principal light ray emitted from the group of [luminous flux] control components and an optical surface (1e) for receiving a principal light ray from the surface and mainly having a function of controlling the direction thereof; an image creation portion (2) for creating an original image by selectively reflecting or transmitting luminous flux from the illumination portion (1) and for ensuring that the cone angle of the luminous flux contributing to the image creation does not greatly change before and after; and an imaging portion (3) for collecting the luminous flux emitted from the image creation portion and creating a secondary image on a screen.

15 Claims, 31 Drawing Sheets

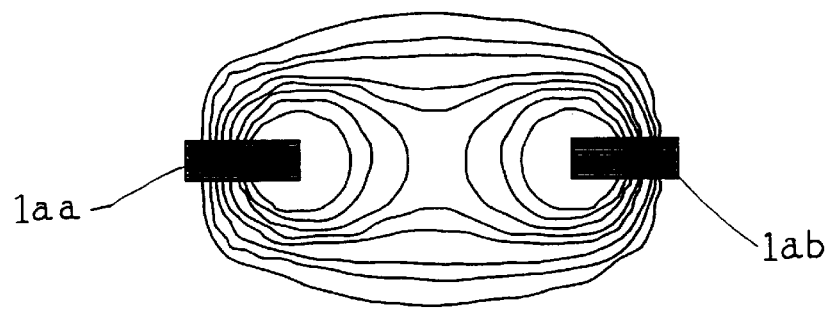
F I G. 10
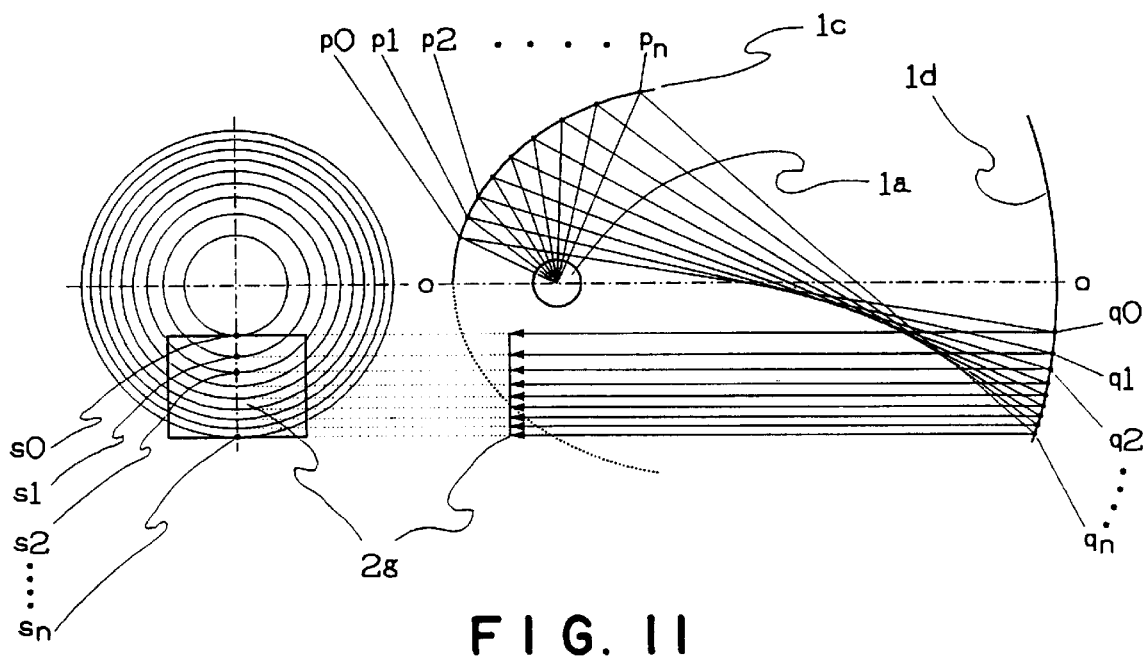
F I G. 11

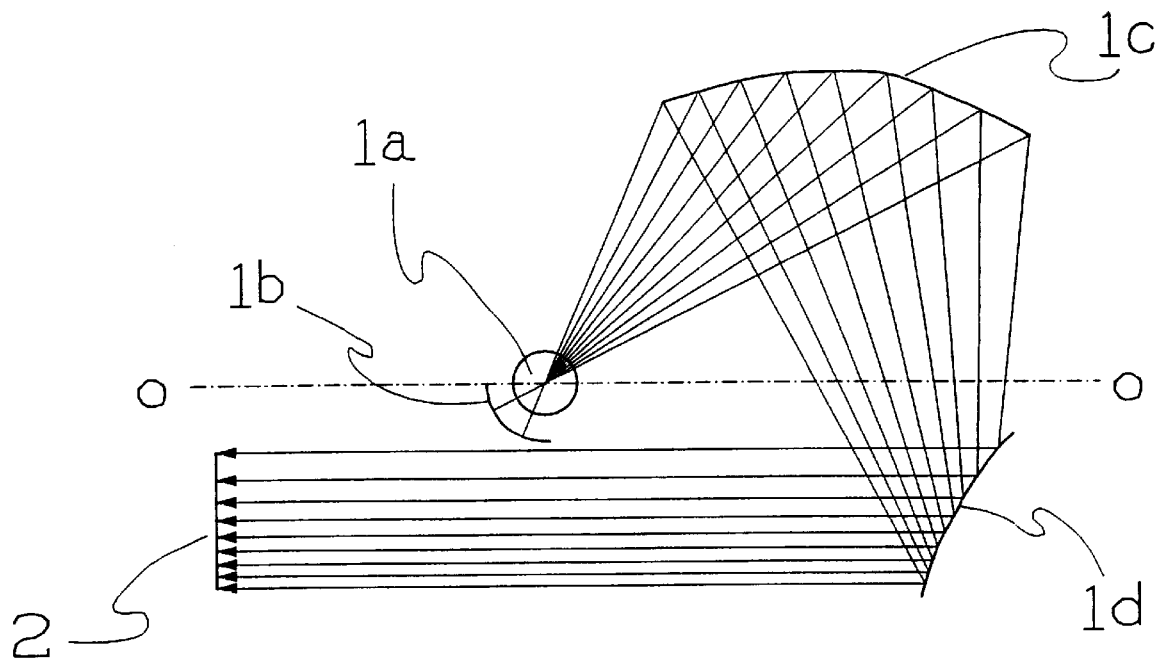
F I G. 14
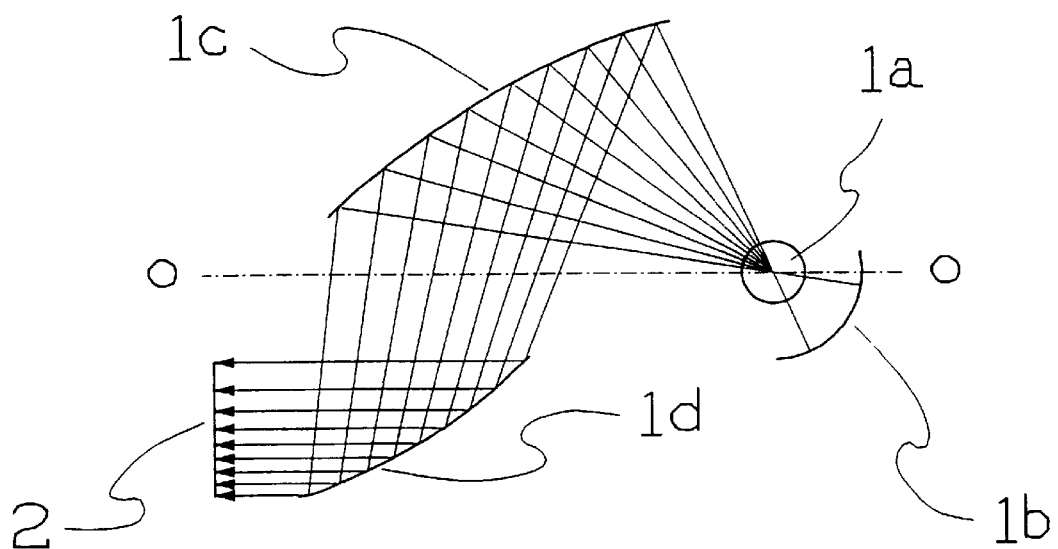
F I G. 15

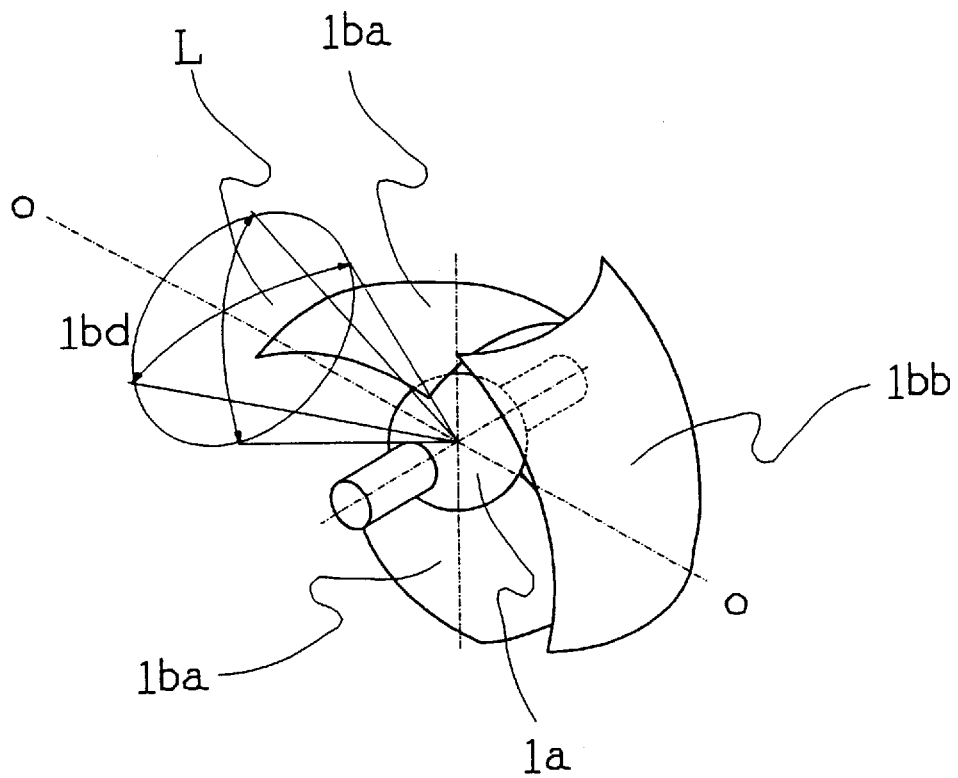
F I G. 20
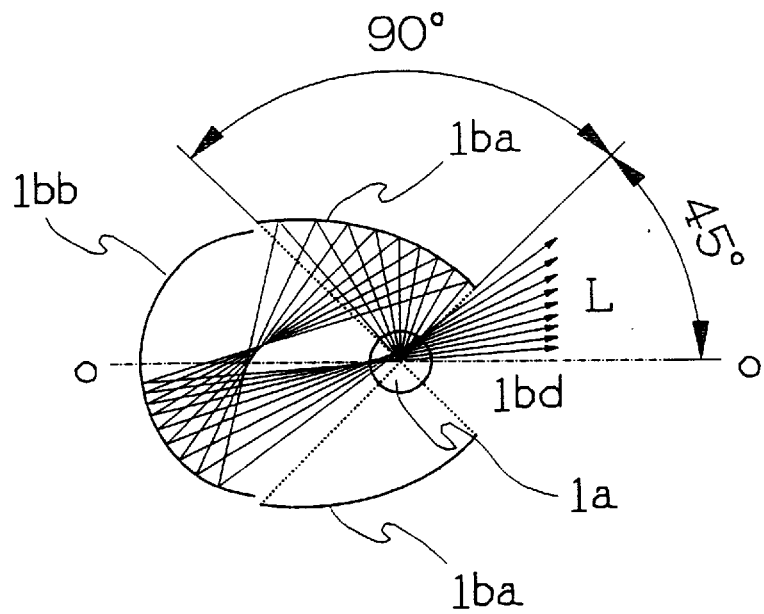
F I G. 21

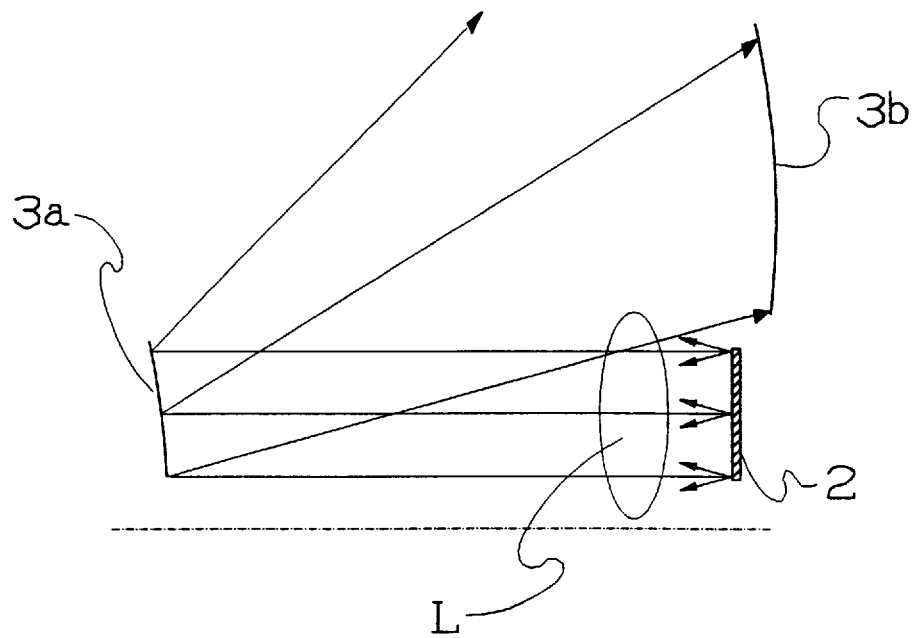
F I G. 24
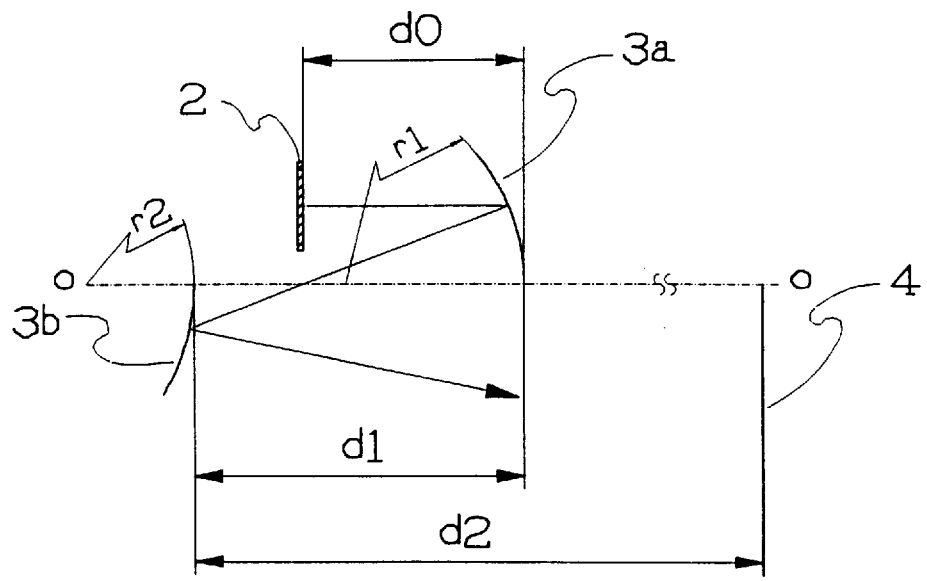
F I G. 25

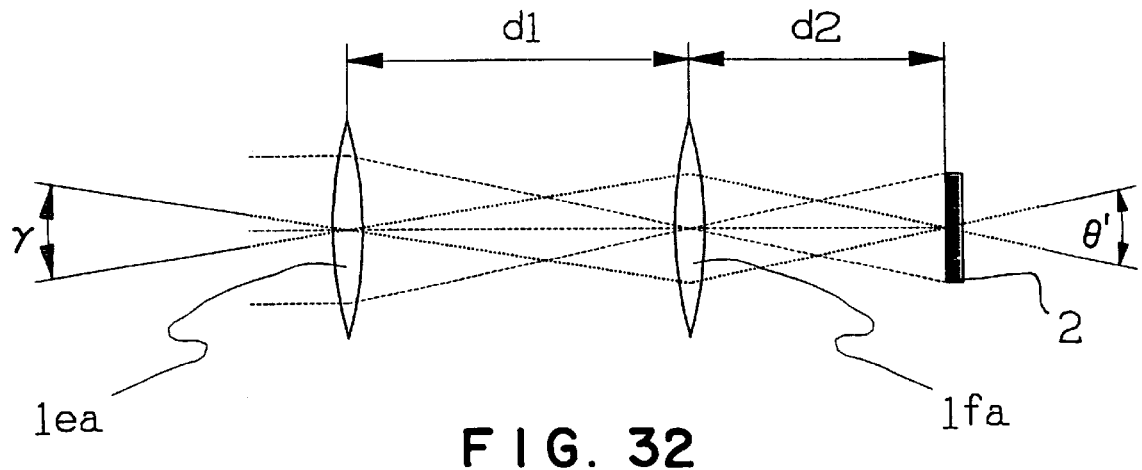
F I G. 32
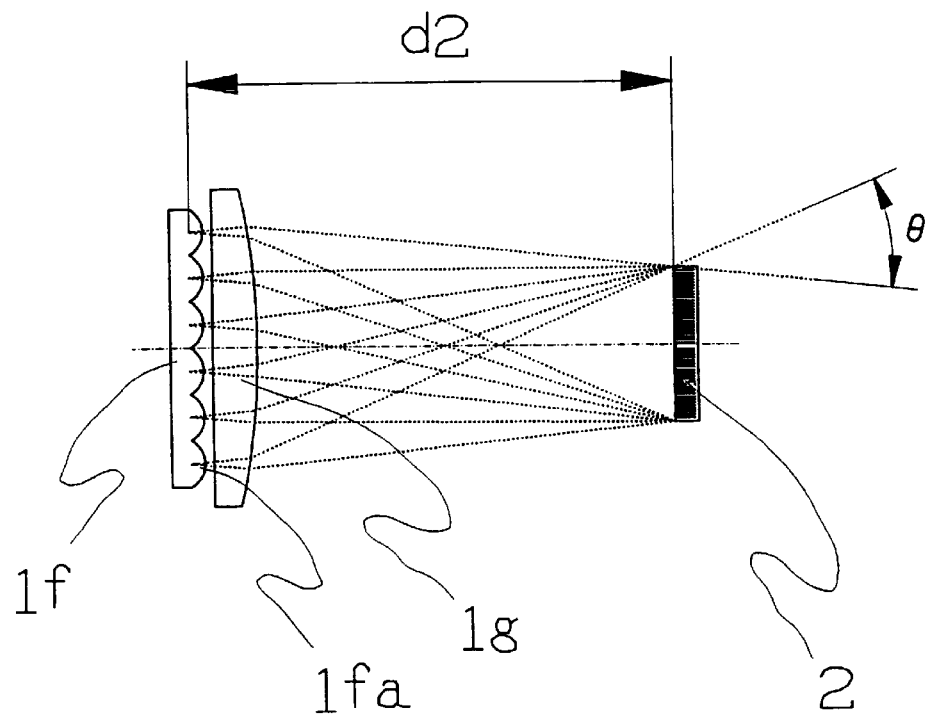
F I G. 33

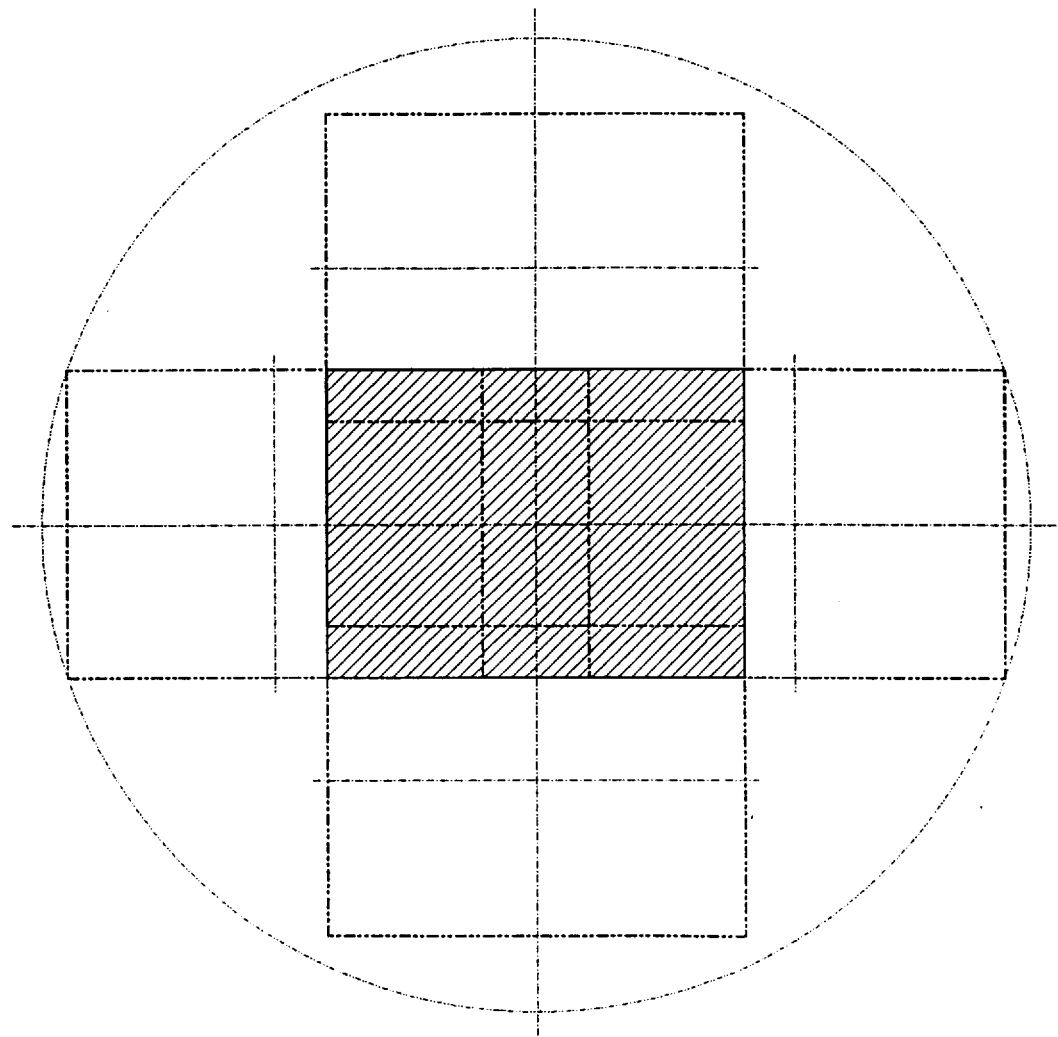
F I G. 35

PROJECTION-TYPE DISPLAY DEVICE

BACKGROUND OF THE INVENTION

1. Technical Field

The present invention relates to a projection-type display device and, in particular, to a projection-type display device suitable for a passive image creation device, exemplified by liquid crystals and/or by a digital micromirror device (DMD) that creates an image by moving a large number of small mirrors independently.

2. Background Art

The recent implementation of the promotion of the high-definition television has led to an increasing demand for large-screen display devices that can be used in ordinary homes. Although there has been progress in increasing the size of CRT devices, which have become standard as conventional display devices, to answer this demand, it is said that structural problems will limit the size thereof to 40 inches. As alternatives, it has become possible to produce plasma or liquid crystal display devices that are thin and have large screens, but these involve problems concerning reliability, lifetime, and particularly cost, so there is no basic solution for a large screen exceeding 60 inches.

Projection-type display devices, which project an original image produced by a small CRT or liquid crystal display device from a front plane or rear plane onto a screen in front of a viewer, have gradually appeared on the market as another method of implementing a large screen. In particular, improvements in compactness, resolution, and transmittance ratio in apparatuses that utilize liquid crystal display devices have astonished consumers and continue to act as a driving force in market diffusion. DMD apparatuses configured of tiny mirrors are also becoming practicable. These differ from CRTs in that they do not generate light in themselves, but are passive image creation devices that require separate illumination portions.

There are a number of technical problems that will have to be conquered to ensure an even wider market presence for a projection-type display device using such a passive image creation device. Representative problems concern: "brightness and uniformity on screen," "space efficiency," "cost," "weight," and "size."

The description below explains in steps the prior-art techniques used to solve the above problems. First of all, the basic configuration of a prior-art projection-type display device is shown in FIG. 36, to illustrate the technical problems concerning "brightness and uniformity on screen." This device is configured of an illumination portion 1 formed of a light source 1a and a parabolic mirror 1c for converting a principal light ray generated from the imaginary center thereof into a parallel beam; an image creation portion 2 formed of an image creation device 2a that selectively transmits luminous flux from the illumination portion 1 and a field lens 2b that controls the direction of the principal light ray; and an imaging portion 3 for projecting the original image created by the image creation portion 2 onto a screen 4. Reference number 3c of the imaging portion 3 denotes an aperture stop for controlling the brightness on screen and 3a, 3b, and 3d denote lenses.

With this optical system, the luminous flux reaching the screen 4 is reduced as the aperture stop 3c is stopped down and thus the imaging portion 3 reduces the cone angle $\phi$ from the image creation portion 2, so that the efficiency of utilizing luminous flux generated from the light source 1a is radically reduced. This is particularly dramatic when the light source 1a is large in comparison with the image creation portion 2.

Next, assume that the light source 1a is changed in a state in which the aperture stop 3c has been stopped down, in FIG. 36. This time, the efficiency of utilizing the luminous flux rapidly rises as the size of the light-generating portion of the light source 1a is gradually reduced. However, if it is assumed that the angle with respect to the optical axis, of the principal light ray generated from the imaginary center of the light source 1a, which is placed in the vicinity of the focus of the parabolic mirror 1c, is $\omega$, it becomes conspicuous that the brightness at the periphery of the image creation portion 2 drops, which is an inherent characteristic of a parabolic surface, in proportion to:

$$\cos^4\frac{\omega}{2}$$

as to the angle $\omega$ increases (that is, with increasing distance from the optical axis). Therefore, when the size of the light-generating portion of the light source 1a is gradually reduced, the cone angle $\theta$ of luminous flux illuminating the image creation portion 2 can be reduced, and it becomes possible to increase the luminous flux until it is within the range of the cone angle $\phi$ of the imaging portion 3. On the other hand, this means that it is no longer possible to control the distribution of the cone angle $\theta$ of the luminous flux and the illuminance distribution in the image creation portion 2.

One means of solving this problem is to use an optical integrator (hereinafter abbreviated to "integrator") as can be seen in Japanese Patent Application Laid-Open No. 3-111806. This method was proposed with the aim of improving the illumination ratio of a conventional projector and eliminating irregularities in the degree of illumination and color of the image, as can be seen in U.S. Pat. No. 2,991,691, for example. The basic configuration thereof is shown in FIG. 37. Luminous flux from a light source 1a is guided by a reflecting mirror 1c into two lens arrays 1d and 1e that configure an integrator, then illuminates a film that configures an image creation portion 2. The luminous flux that passes through this film creates an original image and is projected by a lens of a imaging portion 3 onto a screen 4.

This integrator has two basic functions. In other words, these are an improvement in the efficiency of the luminous flux and an improvement in the uniformity of the brightness. First of all, an improvement in the efficiency of the luminous flux is achieved by a shape-modification function that modifies the circular luminous flux, which has been shaped by the initial reflecting mirror 1c, into the rectangular shape of the film. In an integrator of the most basic two-component configuration, the shape of each individual lens formed in the surface of an integrator on the light-source side, such as that of a lens 1da, is formed to approximate to the shape of the film to achieve this effect. This lens 1da can be considered to be a secondary light source, and a change of shape from a circle to a rectangle is caused by a lens corresponding to the lens 1da in an integrator 1e on the image creation portion 2 side, in other words, by a lens 1ea, to form an image on the image creation portion 2. The lens 1da also functions to create an image of the light source reflected by the reflecting mirror 1c onto the lens 1ea, and thus improve the coupling efficiency of the luminous flux between the lenses 1d and 1e.

The other action concerns uniformity of the brightness, which is achieved by sequentially superimposing secondary images of the light source on the image creation portion 2 by a large number of lens pairs, such as the lenses 1da and 1ea, in accordance with the same principle as that described above. In the above manner, the integrator is a superlative method for simultaneously achieving increased efficiency and uniformity, while having a simple configuration.

However, this integrator is not an universal solution and efficiency could be reduced by conditions imposed by the components configuring the projector. For example, Japanese Patent Application Laid-Open No. 3-111806 presented a number of proposals, based on considerations of the relationship between the size and efficiency of the light source. The basic concepts thereof are shown in FIGS. 38 and 39. There is fundamentally no great difference between FIG. 38 and the previously cited FIG. 37, but points that should be noted are the direction of the electrodes of an electric discharge lamp light source 1a, which is positioned perpendicular to the plane of the paper, and the use of an auxiliary imaging device 1b configured of a spherical mirror. This configuration is not particularly novel, being used in the prior art for overhead projectors and the like, but the combination thereof with an integrator deserves attention. A further step forward is illustrated in FIG. 39, where a portion configured of lenses 1c and 1d and reflecting mirrors 1e and 1f and a double condenser lens system configured of lenses 1c′ and 1d′ and reflecting mirrors 1e′ and 1f′ are used to collect the luminous flux from the light source. As a result, the cone angle of the luminous flux incident on an integrator 1g can be reduced and thus the efficiency of this luminous flux can be improved.

To ensure this improvement in efficiency, it is also important to keep the cone angle of the luminous flux at the lens 1d on the light-source side as constant as possible, in addition to the above described relationship between the size of the light source and the collection angle. Otherwise coupling losses will occur in the luminous flux between the lens 1d and the lens 1e. Japanese Patent Application Laid-Open No. 3-111806 provides absolutely no solution to this problem. It simply stops at making the size of each lens in the optical element 1e on the image creation portion side greater than the size of the light source formed thereon, when a conic surface is used for the lens 1c.

Japanese Patent Application Laid-Open No. 7-174974 discloses an example of the use of a reflecting mirror and aspheric lens between the light source and integrator, as means of solving the above described problem inherent to Japanese Patent Application Laid-Open No. 3-111806. A sectional view thereof is shown in FIG. 40. Luminous flux emitted from a light source 1a is guided onto an optical element 1e via a reflecting mirror 1c and aspheric lens 1d in such a manner that the cone angle distribution thereon is uniform. This was proposed to eliminate the coupling losses of luminous flux in Japanese Patent Application Laid-Open No. 3-111806. This example is configured with an awareness of the cone angle and direction control of the luminous flux. However, since it lacks any consideration of the relationships among the cone angle of luminous flux at the optical element 1e, the size of the light source 1a, and the size of the image creation portion 2, and it does not concern the collection angle from the light source as in Japanese Patent Application Laid-Open No. 3-111806, overall structural conditions ensure that the method disclosed in Japanese Patent Application Laid-Open No. 7-174974 cannot be used to construct the surface. This becomes especially obvious as the cone angle of the luminous flux at the optical element 1e becomes smaller, or the size of the light source 1a becomes relatively large in comparison with the size of the image creation portion 2.

To reduce the cost and increase the yield of image creation devices such as liquid crystal devices, it is most effective to design a smaller device and increase the number of elements that can be produced from a single wafer. However, this would be the cause of a huge decrease in the efficiency of luminous flux. For that reason, there is currently a great deal of work being done on increasing the illumination efficiency, starting with the above described integrators, but this is linked to an increase in the cone angle of the luminous flux in the image creation portion. Therefore, a lens with a small F number (a large cone angle) must be used in the imaging portion. It is not uncommon recently for a lens of F2 class (a cone angle of 29 degrees) to be used, which increases the cost of the imaging portion.

In contrast to this use of a lens with a small F number, some image creation devices necessitate the use of an imaging portion with a large F number. Intense interest has recently been focussed on a display device using a polymer dispersed liquid crystal, as a means for improving the brightness of a liquid crystal display device. A major feature of this display device is the use of the scattering characteristic of a liquid crystal sealed into a small region to make the image visible. This differs from the usual method in which the polarization characteristic is utilized so that the image is made visible with the aid of a polarizer, and has the advantage that the lack of this polarizer can be expected to improve the brightness by an equivalent amount. This concept is illustrated in FIGS. 41 and 42. Note that, although these figures show a transmissive system, the principles are exactly the same for a reflective system. FIG. 41 shows a transmission mode and FIG. 42 shows a scattering mode. In these figures, when luminous flux f is incident on a polymer dispersed liquid crystal, in the transmission mode it is transmitted therethrough unchanged, but in the scattering mode it forms scattered light with a substantially circular diffusion pattern. By switching between these two modes an image is created utilizing changes in light quantity within a region of a specific solid angle.

From the above principle, how the scattered light that reaches the screen in scattering mode is reduced is a decisive factor in improving the contrast. For that reason, an optical system called a Schlieren optical system is employed in the imaging portion 3, but this has a disadvantage in that the F number is large. In other words, this means that a high contrast is obtained by reducing the cone angle φ of the collected luminous flux, thereby reducing the scattered light that reaches the screen. Therefore, although this device has an advantage in being brighter because there is no need for a polarizer, this is cancelled by the stopping down achieved by reducing the cone angle φ of the imaging portion 3, so there is a danger that in fact the image will end up even darker.

If, as an experiment, the F number of the imaging lens that is usually used is made to be approximately 4 and the most suitable F number for ensuring contrast with a polymer dispersion device is 11, the brightness is reduced to ⅛. The effect of removing the polarizer is at most approximately ⅓, so it is clear that the brightness could be reduced to one half or less, as feared.

An optical system using such a polymer dispersed liquid crystal, as disclosed on page 113 of Japan Display '92, is shown schematically in FIG. 43. In this example, a metal halide lamp with a gap of 5 mm is used as a light source 1a and light that has been focussed once by an elliptical mirror 1c is converted into a parallel beam by a collimeter lens 1d. A 3.4-inch polymer dispersed liquid crystal is used as an image creation device 2a, and, after the light has passed through a field lens 2b, it is projected onto a screen 4 by a lens system 3 with an F number of 9.5 (a cone angle of 6 degrees). If a light source 1a of 150 W is used, the luminous flux on the screen is 400 lm.

The illumination portion of FIG. 43 is configured of the single elliptical mirror 1c alone, as described above, but, if the amount of light output per watt of the light source is 2.6 lm/W, a comparatively high efficiency will be exhibited. This is because a liquid crystal panel 2a that configures the image creation portion 2 is comparatively large at 3.4 inches and the light source 1a is relatively small, so that the cone angle θ of luminous flux on the panel can be reduced. However, if it is decided to reduce the size of the panel to reduce costs, it is no longer possible to maintain this high efficiency by the elliptical mirror alone. This is because there are technical limits to reducing the size of the light source 1a together with the panel size, which result in an increase in the cone angle θ of luminous flux incident on the panel 2a, bringing about the previously described problem concerning the F number.

The description now turns to a consideration of the prior-art techniques for solving the second of the technical problems relating to the popularization of projection-type display devices: "space efficiency." The best kind of projection-type display device is of a front projection type that projects an image onto the screen from the same side as that of the viewers. Unfortunately, this type of display device has a large disadvantage in that it takes up part of the space that ought to be occupied by the viewers. Several methods have been used to counter this problem, such as mounting the projector on the ceiling, but the overall cost of extras such as reinforcement of the ceiling is one of the reasons why the front projection type is not popular.

The same type of projector can also be used as a rear projection type, as shown in FIG. 44. In this case, luminous flux from a projector 7a is bent by plane mirrors 7b and 7c, then is projected onto a screen 4. With this rear projection type, it is necessary to shorten the focal distance of the imaging portion in order to reduce the depth of the display device itself. This is equivalent to employing a wide-angle lens in the imaging portion. In the same way as with a pickup element, it might be considered to shorten the focal length of the camera lens that is used, together with reducing the size of the light-receiving portions. However, with a passive image creation device, there is the usual problem with the size of the light source so that there is a limit on the relationship with the efficiency of the luminous flux. Thus it is currently difficult to make the device even more compact.

An optical projector has been proposed in Japanese Patent Publication No. 6-1295. The basic configuration thereof is shown in FIG. 45. This optical projector is provided with a light source 1a having a small light spot, such as a xenon lamp, and reflecting mirrors 1c and 1d providing control over the luminous flux to reproduce a secondary point light source 1a'. In this case, 1b denotes an auxiliary imaging device that operates in the same way as the auxiliary imaging device 1b of FIG. 38 and 1e denotes a flat reflecting mirror that simply bends the luminous flux back. By placing an image creation portion 2 between the thus created secondary point light source 1a' and a screen 4, which is not shown in the figure, an image can be projected onto the screen by the shadowgraph principle. The main purpose of the luminous-flux controlling reflecting mirrors 1c and 1d is to create the secondary point light source 1a' for creating an image of uniform brightness, from consideration of the luminance distribution and luminance intensity distribution of the lamp and differences in distance between each part of the image creation portion 2 and the secondary image on the screen. In other words, their main purpose is to control the illuminance distribution and direction of luminous flux generated from the light source.

Among the main features of this optical projector are four features that make this projector extremely useful: 1) it is possible to project an expanded image from a short distance, 2) oblique projection is possible, 3) uniform brightness can be guaranteed over the screen, and 4) the deep focal depth enables focusing at any place (focus-free). If it is possible to use such a projector, the projection can be from a position at which the viewers are not inconvenienced and the space efficiency problem can be solved at a stroke.

The measures used to solve each of the above technical problems tend to increase the cost of the entire apparatus, which has an effect on the third technical problem relating to the projection-type display device. For example, a microlens array could be employed in the liquid crystal display device that is one of the main components of a passive display device, to improve the transmittance ratio. Similarly, further increases in cost are caused by employing a special illumination system comprising components such as a polarizing prism and an optical integrator to improve the efficiency, and increasing the number and size of lenses in the lens assembly and also employing a dichroic prism to reduce the F number of the imaging lens and reduce the focal distance. Therefore, even if the image creation device is made more compact to reduce costs, that will be offset by the measures used to improve the illumination efficiency.

An example of the use of a reflective optical system in the imaging portion 3 is shown in FIG. 46, as a final example of a prior-art projection-type display device. In this example, a CRT is used as the image creation portion 2. A CRT is a representative example of an active image creation portion that generates its own luminous flux. The imaging portion 3 consists of a reflecting mirror 3a and a correction plate 3b, to configure a system called a Schmidt system. This imaging portion 3 is employed to increase the efficiency of this luminous flux and make the projected image brighter, because the luminous flux from the image creation portion 2 is divergent light, but the resolution is not very good. The advantages and disadvantages of this configuration have already been made clear in the general literature on the Schmidt camera, so they are omitted herefrom. Even now, it is for the purpose of improving the efficiency of luminous flux having a wide dispersion angle that a lens system with an F number in the 1.0 class is used in a projector utilizing a CRT.

The effective obverse of the large aperture of the reflective system utilized in the imaging portion 3 of FIG. 46 is a difficulty in obtaining a large angle of view. That is why it is mainly used in applications such as large-aperture telescopes. In recent projection-type display devices, as touched upon in the example of the rear projection type, there is an increasing tendency for the imaging portion to have a large angle of view, and thus it is difficult to adopt such a configuration. However, this suggests that it is possible to simplify the optical system by using a reflective optical system.

As described above, the various technical problems of "brightness and uniformity on screen," "space efficiency," "cost," "weight," and "size" must be solved in a comprehensive manner, to enable the projection-type display device to achieve wide market acceptance as a large-scale display device. As should be clear from the above discussion of the prior-art techniques, not only is it inevitably necessary to improve the individual technologies, we should go further and consider that we are approaching a time at which we should basically rethink the configuration and purpose themselves, in order to solve such intricate problems.

In this context, the optical projector of the previously mentioned Japanese Patent Publication No. 6-1295 has four extremely good features. However, implementation of this projector involves a number of problems. These can be summarized as two main problems. One is the problem of resolution; the other is a problem concerning mass production. First of all, concerning the problem of resolution, theory states that the effects of half-shadows and diffraction are obvious in the creation of a secondary image by the shadowgraph principle from luminous flux from a light source that is close to being a point source. Thus it is not possible to respond to demands for a resolution that exceeds a certain level. This problem is caused by the lack of an imaging portion in the above optical projector. Two particular problems concerning mass production that can be raised are: "scratches and unevenness in the reflective surfaces used affect the final image" and "shaping accuracy of the reflective surfaces is strict." Conquering these will require an extremely high level of machining accuracy, which is the biggest problem from the mass-production viewpoint. Both of these are also common reasons for making the light-generating portion of the light source extremely small. In contrast thereto, there is also a conflicting problem in that it is difficult to obtain a "light source having a small, bright light spot," to improve the brightness and resolution.

The present invention was developed with the objectives of solving each of these technical problems and satisfying all of the conditions that ought to be provided by a projector, while keeping the advantages of the optical projector of Japanese Patent Publication No. 6-1295. In other words, the objective of this invention is to simultaneously achieve both the technical and manufacturing conditions of:

(1) Implementing the four major features of a magnified projection over a short distance, oblique projection, a uniform illumination, and a deep focal depth, with a bright, high-resolution image.

(2) Providing a compact, light-weight, and inexpensive projection-type display device.

To summarize the technical fields that the present inventor has returned to and fundamentally reconsidered in this case, I have clarified the relationships among the characteristics of the light source, the cone angle of the luminous flux, and control over the luminous intensity distribution, illuminance distribution, and directionality thereof as well as the dimensions of the image creation portion, relating to the implementation of the features listed in (1) above, and have determined a basic way of considering how to construct the illumination portion in practice. These make it possible to implement optimization of the disposition and surface shape of the various optical elements configuring the illumination portion in accordance with the dimensions, shape, luminance distribution, and luminance intensity distribution of the light-generating portion of the light source, and the dimensions and characteristics of the image creation portion.

A reflective optical means is used in the imaging portion, and, as a further step, a configuration has been enabled in which the imaging portion has only a few reflecting mirrors, to implement the features listed in (2) above. In a prior-art projector, it is difficult even just to concentrate on brightness by configuring the imaging portion having such characteristics with only a few mirrors. As described above, the object of the present invention is to implement an ideal projector that satisfies the conditions listed in (1) and (2) above, by implementing a highly efficient, highly sophisticated illumination portion by suitable utilization based on a comprehensive overview of the various luminous flux control techniques, and applying this illumination portion to satisfying the conditions imposed on the imaging portion.

DISCLOSURE OF THE INVENTION

A projection-type display device in accordance with the present invention comprises a light source; an illumination portion consisting of a group of collection angle control components, which comprises at least one optical surface for receiving a principal light ray generated from an imaginary center of the light source and for controlling the solid collection angle thereof, and a group of luminous flux control components, which comprises at least two optical surfaces including an optical surface for carrying out a spatial distribution control over the principal light ray in a virtual plane provided across a direction of propagation of the principal light ray emitted from the group of luminous flux control components and an optical surface for receiving a principal light ray from the surface and for controlling the direction thereof; an image creation portion for creating an original image by selectively reflecting or transmitting luminous flux from the illumination portion and for ensuring that a cone angle of the luminous flux contributing to the image creation does not greatly change before and after; and an imaging portion for collecting the luminous flux emitted from the image creation portion and creating a secondary image on a screen; wherein the following conditions are satisfied:

$$\frac{S}{\delta S} \geq 100, \phi \leq 8°$$

where $S$ is an effective surface area of the image creation portion, $\delta S$ is an effective surface area of the light source that actually emits the luminous flux, and $\phi$ is the cone angle of the luminous flux which the imaging portion collects relating to the luminous flux emitted from the various components of the image creation portion.

The group of collection angle control components having at least one optical surface of the illumination portion of the projection-type display device could be further provided with at least one or more auxiliary imaging devices comprising at least one reflective optical means which makes the light source act as both object point and image point.

The size of the magnification of the auxiliary imaging device of the illumination portion of the projection-type display device, which acts as an imaging device, may be at least one.

A group of shape modification components having at least one optical surface for converting the shape of the luminous flux to substantially the same shape as that of the image creation portion may be provided between the group of luminous flux control components of the illumination portion and the image creation portion of the projection-type display device.

The group of shape modification components of the illumination portion of the projection-type display device is configured of an optical integrator comprising at least two optical surfaces each having a large number of curved surfaces on the surface thereof in a lenticular form, and also the individual external shapes of a large number of curved surfaces formed on an optical surface closest to the group of collection angle control components are approximately the shape. of the image creation portion.

The group of luminous flux control components comprising at least two optical surfaces of the illumination portion of the projection-type display device also has a shape modification function for luminous flux.

Within the group of luminous flux control components comprising at least two optical surfaces of the illumination portion of the projection-type display device, an optical surface mainly having a spatial distribution control function for the principal light ray also has a collection angle control function.

The group of collection angle control components and the group of luminous flux control components of the illumination portion of the projection-type display device may be configured from rotationally symmetrical surfaces having a common axis of rotation, and also each optical surface comprised within the group of luminous flux control components has a curved surface such that a principal light ray generated from the imaginary center of the light source, which is provided on the common axis of rotation, in such a manner as to subtend equal solid angles within any cross-sectional plane comprising the axis of rotational symmetry is divided between areas of equal size on a virtual plane provided on the exit side of the group of luminous flux control components.

An optical surface mainly having a direction control function for the principal light ray and being comprised within the group of luminous flux control components of the illumination portion of the projection-type display device has a surface figure such that the principal light ray after passing that optical surface is mutually parallel.

The imaging portion of the projection-type display device is configured of at least two reflective optical means.

A reflective optical means of the imaging portion closest to the image creation portion of the projection-type display device and having an imaging action is configured of a reflective optical means having the action of a concave reflecting mirror.

At least one portion of the imaging portion of the projection-type display device is capable of movement in a substantially normal direction relative to the image creation portion which acts as a reference surface.

At least one portion of the imaging portion of the projection-type display device is capable of being inclined relative to the image creation portion which acts as a reference surface.

At least one portion of the imaging portion of the projection-type display device is capable of movement in a substantially parallel direction relative to the image creation portion which acts as a reference surface.

The image creation portion of the projection-type display device is configured of a polymer dispersed liquid crystal.

The luminous flux generated from the light source is collected into the illumination portion by the group of collection angle control components of the illumination portion. Luminous flux wherein the cone angle, distribution, illuminance distribution, and direction thereof has been controlled by the action of the group of luminous flux control components is shone onto the image creation portion. Luminous flux that has been selectively reflected and transmitted by the image creation portion forms an original image. Luminous flux emitted from the image creation portion is incident on the imaging portion and the imaging action thereof forms a secondary image on a screen. A condition that holds the cone angle of luminous flux collected by the imaging portion to no more than 8 degrees is an essential condition for the implementation of the features in the projection-type display device of this invention of magnified projection over a short distance, oblique projection, and a deep focal depth, while having an imaging portion of a simple configuration. A condition relating to the sizes of the image creation portion and the light source is an essential condition for keeping constant the efficiency of the luminous flux reaching the screen, when the above condition relating to the cone angle of the imaging portion has been set.

To increase the illumination efficiency, it is necessary to collect as much as possible of the luminous flux from the light source. However, increasing the collection angle indiscriminately will not necessarily increase the brightness on screen. As will be described in detail in the sections on embodiments of this invention, the maximum collectable angle from the light source, which contributes to the improvement in brightness, can be roughly controlled by three parameters: the size of the image creation portion, the size of the light source, and the cone angle of the luminous flux used by the imaging portion. Therefore, particular care is necessary if the imaging portion controls the cone angle of the collected luminous flux to be within a small range from the start or if the image creation portion is small in comparison with the light source, as in the projection-type display device of this invention. If this is not done, the optical components will have to be made bigger than necessary, which is also disadvantageous from the cost viewpoint. For collection angle control, it is also important to thoroughly optimize the direction in which luminous flux is collected and the orientation and disposition of the light source, to correspond to the luminance distribution and luminous intensity distribution of the light source.

When limiting the direct solid collection angle from the light source of the illumination portion, it is essential to skillfully use an auxiliary imaging device that functions with the light source acting as both object point and image point. This makes it possible to reuse the luminous flux that is wasted in the prior art, from the maximum collectable angle upwards. In other words, the auxiliary imaging device is used to return luminous flux that does not contribute to the illumination of the image creation portion, back towards the image creation portion, to enable an increase in the utilization of the luminous flux by incidence within a range of collection angles of the group of collection angle control components. The efficiency of luminous flux incident from the light source can be further increased by making the imaging magnification of this imaging device greater than or equal to one. In some cases, it is necessary to provide a plurality of the auxiliary imaging devices. Apart from efficiency, these auxiliary imaging devices reduce stray light and act to increase the contrast.

The group of luminous flux control components of the illumination portion is concerned with the principal light ray generated from an imaginary center, such as the center of gravity of the luminous flux from the light source or geometric center, and is configured of at least two independent optical surfaces: an optical surface that mainly controls the spatial distribution thereof (hereinafter called a distribution control surface) and an optical surface that mainly controls the direction thereof (hereinafter called a direction control surface). An "optical surface" means a boundary surface having the effect of changing the path of luminous flux, such as a reflecting mirror, a refractive surface of a lens, a Fresnel lens, a diffraction grating, or a gradient index component. The ultimate objective of the group of luminous flux control components is to control the cone angle, the cone angle distribution, the illuminance distribution, and the direction of the luminous flux, at each point of the image creation portion. In general, it is often difficult to determine these analytically, so in practice the optimum shapes are determined by the iterative process described below.

In other words, the spatial distribution of the principal light ray is varied by changing the shape of the distribution control surface. Since a change in the distribution control surface leads to a change in the path and angle of the principal ray, the shape of the direction control surface is corrected accordingly so that the emitted luminous flux maintains the desired position and angle. The cone angle, the cone angle distribution, the illuminance distribution, and the direction of the luminous flux are then checked at each point of the image creation portion. A reference surface used in this process for evaluating the spatial distribution of the principal light ray is a virtual plane provided across the direction of progress thereof. In other words, the virtual plane simply acts as a parameter space; it is not important where the location thereof is set. It should be noted, however, that positioning it in the vicinity of the target surface, whether that is in the vicinity of the direction control surface or in the vicinity of the image creation portion, is easier to understand. As should be clear from the above description of the process, the shape of the surface that configures each of the control surfaces is generally not a simple shape such as a conic shape; it can be varied freely by factors such as the disposition and the departure point of the surface and the position of the light source.

As well as ordinary plano-convex condenser lenses, reflecting mirrors having conic curved surfaces, such as parabolic surfaces or elliptical surfaces, could be used as the group of collection angle control components, making it possible to provide a degree of freedom concerning layout, such as the creation of a secondary light source partway, by clearly separating the group of luminous flux control components. However, the basic role thereof is to set the solid collection angle from the light source, and the distribution control surface of the group of luminous flux control components can naturally also control the collection angle. This is effective in reducing the number of components and making the device more compact.

It is possible to make more effective use of the luminous flux that illuminates the image creation portion by providing a group of shape modification components between the group of luminous flux control components of the illumination portion and the image creation portion, for making the shape of the luminous flux that illuminates the image creation portion close to the shape of the image creation portion. This is a typical method that has been used in the past, particularly in optical integrators. The configuration that is generally used is one in which the luminous flux from the light source is collected by a parabolic mirror and an integrator is used immediately afterwards. This format is sufficiently effective if there is some leeway in the components that determine the efficiency, but the designed efficiency cannot be obtained if control over the cone angle of the imaging portion is provided, as it is in this invention. In such a case, an illumination efficiency that is close to the theoretical limit can be obtained by giving the group of luminous flux control components the role of a luminous flux adjustment component. In other words, the group of luminous flux control components is not used directly in the control of the luminous flux at the image creation portion, but it is used as an adjustment means for a group of shape modification components and the luminous flux incident thereto. This represents the generality of luminous flux control.

In addition to the efficiency with which the luminous flux is utilized, an integrator is particularly useful in making problems such as shaking of the light source and color separation problems less obvious, and thus provide uniform illumination.

In the same manner as that of the group of collection angle control components, the function of the shape modification components can be combined with that of the luminous flux control components, with the same effects of reducing the number of components and the size of the device.

If the group of collection angle control components and the group of luminous flux control components are configured of rotationally symmetrical surfaces having a common axis of rotation, highly-accurate processing is possible. With such a configuration, the shape of each optical surface can be determined in such a manner that the principal light ray generated from the imaginary center of the light source in such a manner that it subtends equal solid angles within any cross-sectional plane comprising the axis of rotational symmetry is distributed between areas of equal size on a virtual plane. This is a very elementary concept relating to specific construction methods, but it is a basic concept for obtaining uniform illumination when the light source is spherical and has uniform directionality. The thus configured group of luminous flux control components is also effective as departure data during optimization that considers factors such as the luminance distribution and shape of the light source. In addition, a design process that takes into account the angle and surface area (distribution) of the luminous flux is not limited to rotationally symmetrical components; it provides ideas for a more generalized design method and it can be applied to the design of any optical surface to create a desired spatial distribution.

Ensuring that the principal light ray emitted from the direction control surface is mutually parallel makes it possible to expect improvements in the adaptability and capabilities with respect to the visual characteristics of the image creation portion, such as a liquid crystal, and a reduction in cost.

The above describes the basic function of the illumination portion, but it is possible to provide a compact, light-weight, inexpensive projector, in comparison with a prior-art device using a lens system, by configuring the imaging portion of at least two reflective optical means.

The entire apparatus can be made more compact by configuring the reflective optical means of the imaging portion which is closest to the image creation portion and which also has an imaging action as a reflective optical means having the action of a concave reflecting mirror with respect to the luminous flux generated from the image creation portion. This also guarantees a long operating distance, increasing the degree of freedom of layout and also making it unnecessary to use expensive dichroic prisms.

Oblique projection can, of course, be provided in a device using ordinary lenses, by ensuring that the cone angle thereof is 8 degrees or less and the F number of the lenses is approximately 7 or more.

It is possible to improve focus adjustment and resolution at close distances by making at least one portion of the imaging portion, which is configured from reflective optical means, movable in a relative manner in a direction approximately normal to the image creation portion.

In a similar manner, it is possible to enable simple relocation of the image projection position and improve resolution by inclining at least one portion of the imaging portion, which is configured from reflective optical means, with respect to the image creation portion.

Similarly, it is possible to change the position of the projected image in the vertical and horizontal directions during oblique projection or, conversely, greatly increase the degree of freedom of installation location of the projector when the position of the projected image is fixed, by making one portion of the imaging portion movable in a direction approximately parallel to the image creation portion.

Using a polymer dispersed liquid crystal in the image creation portion makes it possible to obtain a bright, high contrast projected image. A polymer dispersed liquid crystal forms an image by utilizing the scattering of light by turning an electric field on and off, without using a polarizer, but it is necessary to reduce the cone angle of the imaging portion to ensure contrast. This makes it even most suitable for the image creation portion of the projection-type display device of the present invention.

BRIEF DESCRIPTION OF THE DRAWINGS

FIG. 10 is a conceptual view of the luminance distribution of an electric discharge lamp;

FIG. 11 shows a first example of the illumination portion;

FIG. 14 shows a third variation of the illumination portion;

FIG. 15 shows a fourth variation of the illumination portion;

FIG. 20 shows an example of an auxiliary imaging device;

FIG. 21 is a sectional view through the example of the auxiliary imaging device;

FIG. 24 is a is a conceptual diagram showing a case in which the initial reflective optical means of the imaging portion is configured of a convex mirror;

FIG. 25 shows a first example in which the reflective optical means of the imaging portion is configured of two mirrors;

FIG. 32 is a conceptual diagram showing the luminous flux of an integrator;

FIG. 33 is a conceptual diagram of the state of the cone angle at the image creation portion of an integrator;

FIG. 35 shows the state of image movement on a screen of a fourth embodiment of this invention;

BEST MODES FOR CARRYING OUT THE INVENTION

Figure 1:
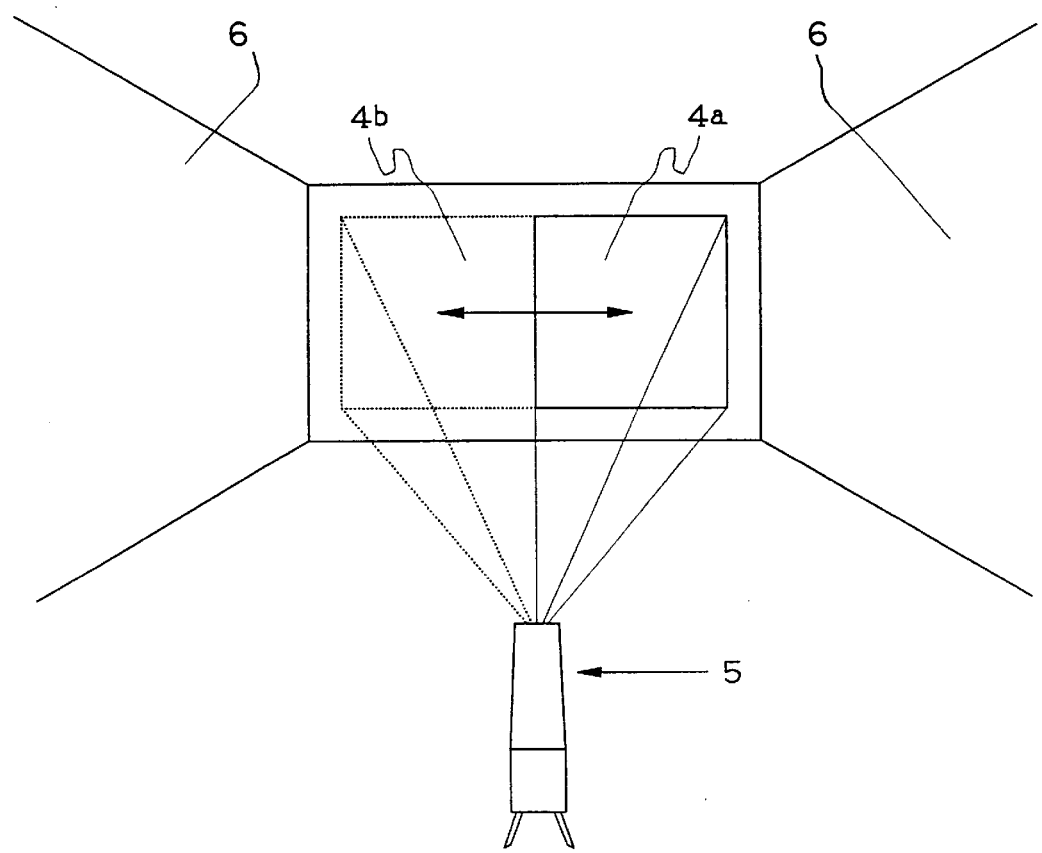
FIG. 1 is a conceptual view of oblique projection when a projector device is placed at a central portion of a room.
Figure 2:
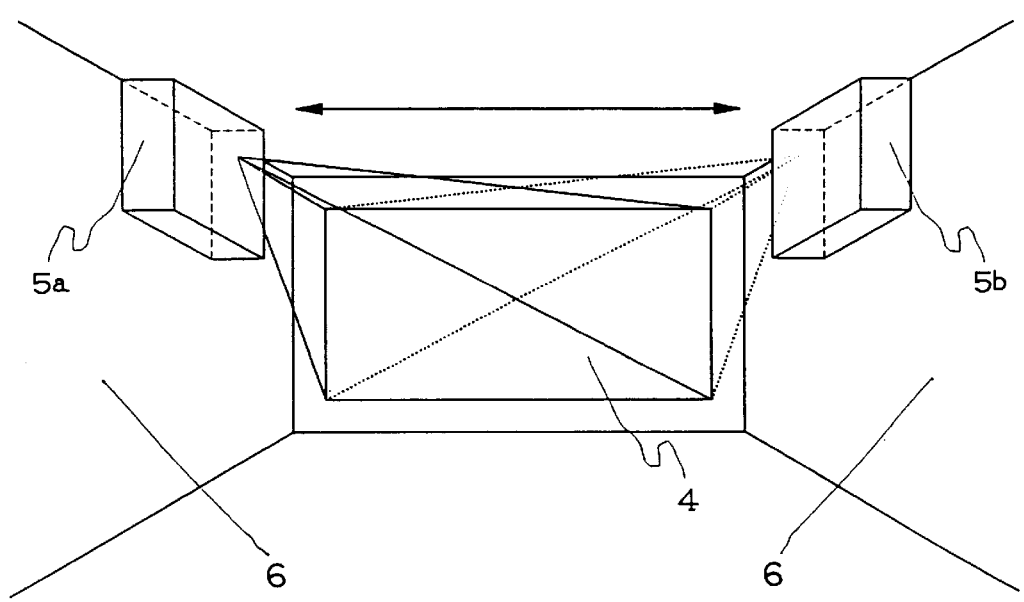
FIG. 2 is a conceptual view of oblique projection when a projector device is mounted on a side wall.
Figure 3:
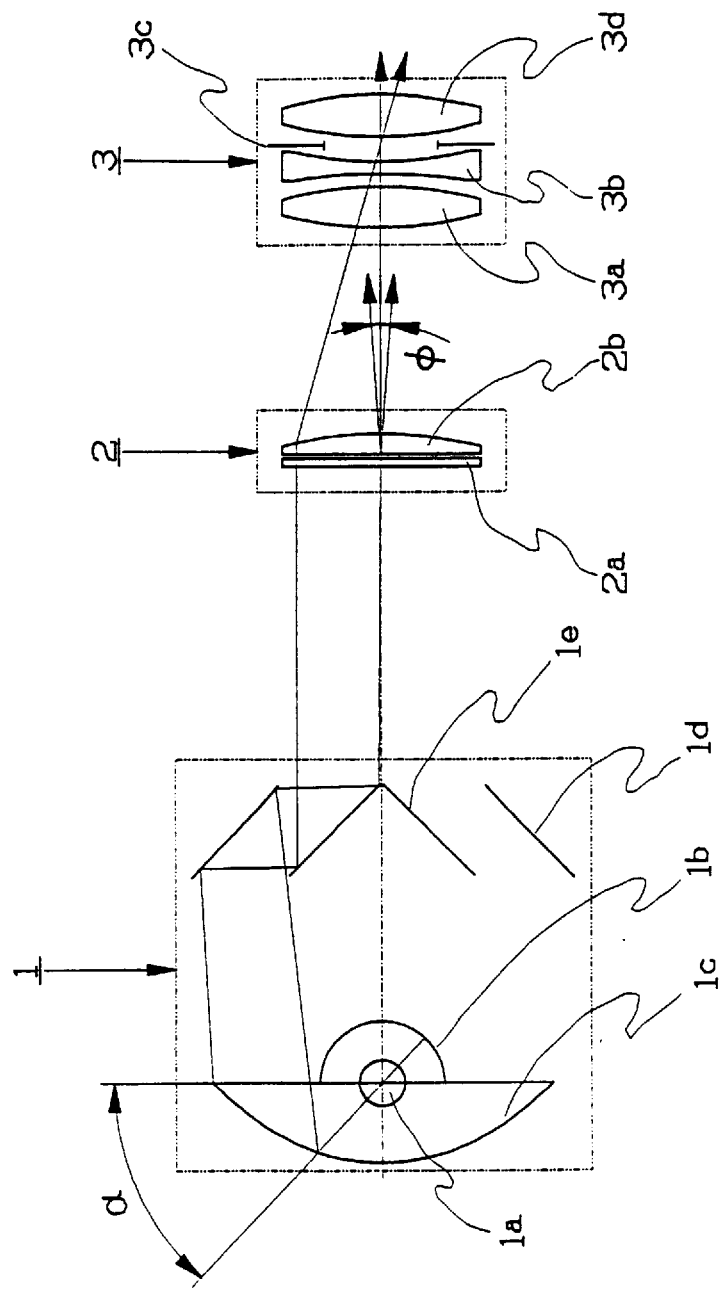
FIG. 3 is a sectional view illustrating the principle of this invention.

The basic concepts of the present invention will be described below, with reference to the accompanying drawings. The description first concerns the definition of "oblique projection," a feature that is considered essential for a projection-type display device. Schematic views illustrating this concept are shown in FIGS. 1 and 2. In these figures, reference numbers 4, 4a, and 4b denote images on a screen, 5, 5a, and 5b denote projector devices, and 6 denotes a side wall of a room. FIG. 1 shows an arrangement where the projector device 5 is fixed in the center of a room. In accordance with this invention, a projector device that is capable of oblique projection can move the image projected at 4a in a simple manner to 4b by, for example, moving part or all of the imaging portion in an approximately parallel direction with respect to the screen. FIG. 2 shows an arrangement where the projector device 5a is installed at an upper portion on the left side with respect to the screen 4, on the side wall 6. In this case, the projector device 5a is capable of creating an even more ideal environment. In an ordinary home, there are many places where the upper portions of side walls 6 are empty, which means that a projector device 5a placed in such a location would be completely unobtrusive. It is clear from FIG. 2 that, since the projection is from an upper oblique portion, a viewer seated in the center of the room would be totally unaware of the presence of the projector device 5, which is not true of prior-art devices. There is also virtually no likelihood of the shadow of the viewer falling across the screen 4. In addition, since the side walls 6 are usually fairly strong, the provision of a simple hook makes it possible to hang up the projector device. If the layout of the room is to be changed for some reason, the projector device 5a positioned on the left wall can be moved in a simple manner to the position 5b on the right, by adjusting an imaging portion 3 (which is shown in FIG. 3 and will be described later), in a similar manner to that shown in FIG. 1. This practical usage characteristic makes it possible to provide an ideal projector device that is impossible to implement in the prior art. No prior-art projector device can project obliquely over such a wide angle, or provide sufficient brightness. The specific configuration of this invention will be described below.

A structure that illustrates the basic concept of the projection-type display device of this invention is shown in section in FIG. 3. It has three main components: an illumination portion 1, an image creation portion 2, and the imaging portion 3. Luminous flux controlled by the illumination portion 1, which comprises a light source, is shone onto the image creation portion 2 and is selectively reflected therefrom or passed therethrough to create an original image. This original image is projected by the operation of the imaging portion 3 on the screen 4 (not shown in the figure) to create a secondary image.

Figure 8:
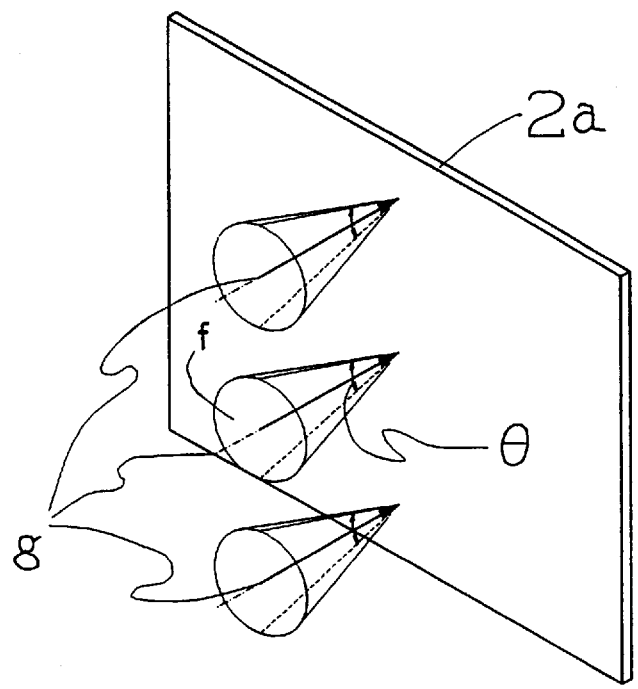
FIG. 8 is a conceptual view of luminous flux illuminating an image creation portion.

The illumination portion 1 has a light source 1a that satisfies fixed conditions with respect to the effective surface area of the image creation portion 2. A principal ray emitted from an imaginary center of the light source 1a is guided onto the image creation portion 2 by three reflecting mirrors 1c, 1d, and 1e. The image creation portion 2 comprises a passive image creation device 2a, which creates the original image by selectively reflecting or passing the luminous flux emitted from the illumination portion 1, and, if necessary, an optical element 2b positioned before or after. The luminous flux emitted from the illumination portion 1 illuminates the various parts of the image creation device 2a as shown in FIG. 8. In this figure, g corresponds to the principal light ray generated from the imaginary center of the light source 1a. θ denotes the maximum cone angle of luminous flux f incident on a portion aimed toward the image creation portion 2.

Control over the cone angle θ of luminous flux in this image creation portion 2 and the distribution thereof, the illuminance distribution for maintaining the fixed conditions for the brightness of the projected secondary image, and the direction in which luminous flux illuminates the image creation portion 2 is borne by a group of luminous flux control components of the illumination portion 1. In the case shown in FIG. 3, 1d acts as a distribution control surface and 1e acts as a direction control surface. In FIG. 8, direction control is performed in such a manner that the principal light ray is incident substantially perpendicular to the image creation device 2a. The control of each of the light source 1a, the image creation portion 2, and the imaging portion 3 is based on consideration of their respective characteristics.

The following condition must be satisfied to ensure that the luminous flux control functions effectively, while maintaining the illumination efficiency:

$$\frac{S}{\delta S} \geq 100$$

In this case, S is the effective surface area of the image creation device 2a and δS is the effective surface area of the light-emitting portion that actually emits the luminous flux. The boundaries of the generated light are often not clearly defined for determining this effective surface area of the light source, particularly when it is an electric discharge lamp. In such a case, the effective size of the light generating portion is determined by forming an expanded image of the light source or by imaging it by means such as a TV camera, then measuring the luminance distribution as shown in FIG. 10. It should be noted, however, that the definition of the effective size of the light source will differ according to the threshold value for brightness, but it is sufficient to consider a range of brightnesses within approximately 10% of the maximum brightness. Note that 1aa and 1ab in FIG. 10 denote electrodes of the electric discharge lamp.

Reflective mirrors 1b and 1c, which form other essential components of the structure of the illumination portion 1 shown in FIG. 3, configure a group of collection angle control components that determines the solid collection angle of the luminous flux emitted from the light source. The reflecting mirror 1b is a reflecting mirror utilizing part of a spherical surface, with the light source at the center thereof. This returns the luminous flux not collected by the mirror 1c directly back to the light source, so that as a result it forms an auxiliary imaging device for enabling reuse of the luminous flux. With a spherical surface, the magnification of the image by the auxiliary imaging device is exactly 1. Recently, light sources are often electric discharge lamps such as xenon or metal halide lamps, and, since the light-generating medium in such a case is a gas, the light-generating portion itself is transparent so that the circumstances under which the light returns are extremely good. If the image creation portion 2 is comparatively large, a light source having a filament, such as a halogen lamp, could also be used.

Figure 9:
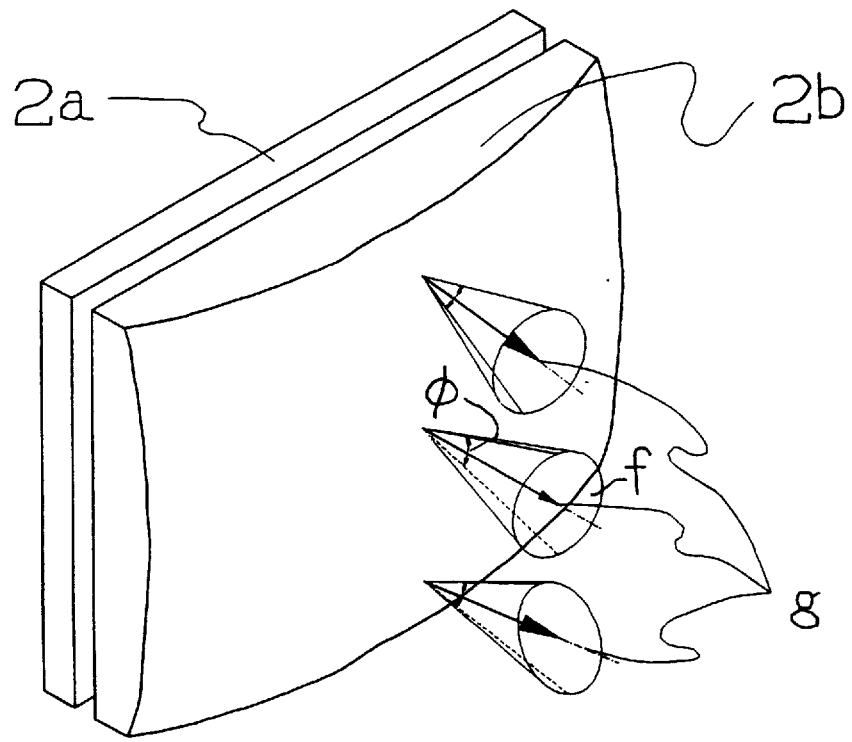
FIG. 9 is a conceptual view of luminous flux emitted from the image creation portion.
Figure 12:
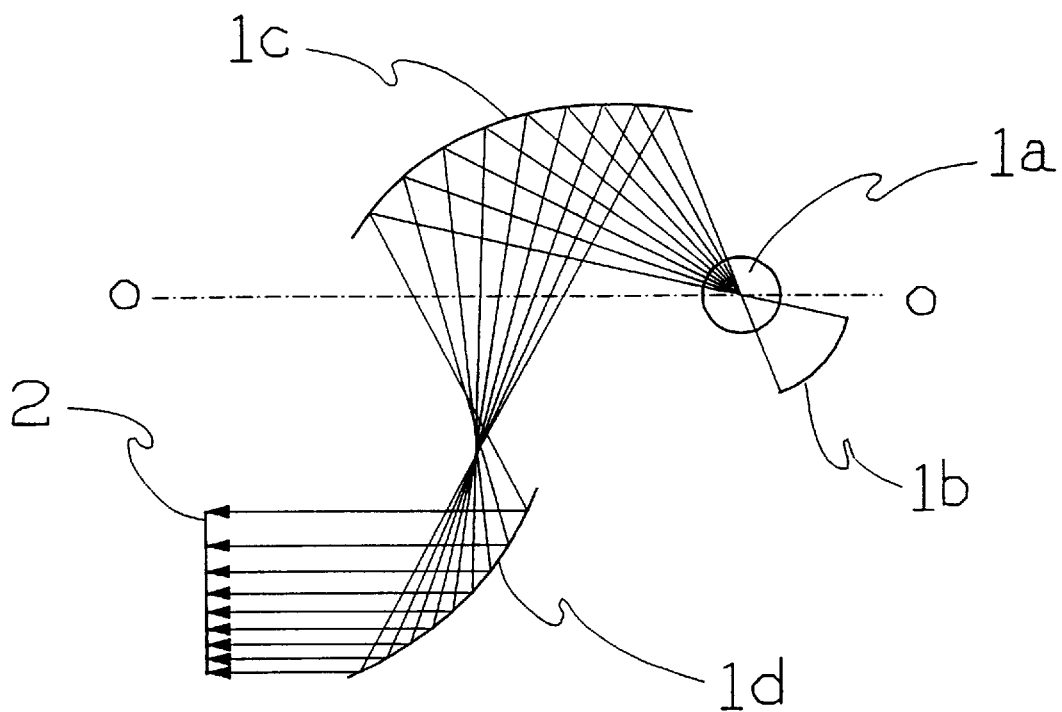
FIG. 12 shows a first variation of the illumination portion.

The way in which luminous flux is emitted from the image creation portion 2 is shown in FIG. 9. In the same manner as in FIG. 8, g denotes the principal light ray and φ denotes the maximum cone angle of luminous flux f emitted from a portion in question and collected on the imaging portion 3. In a liquid crystal display device, a microlens array is used on the side on which luminous flux is incident, as one means of increasing the effective aperture efficiency of the portion that transmits the luminous flux. As a result, the cone angle θ of luminous flux on the incident side differs greatly from the cone angle φ of luminous flux on the exit side. The present invention proposes in such a case to return the cone angle of the luminous flux to its original value by providing another microlens array on the exit side of the display device, to ensure that there are no such great changes in the cone angle of the luminous flux as to make the luminous flux control of the illumination portion 1 essentially meaningless. It should be noted, however, that the action of components such as a field lens 2b provided in front of and behind the image creation portion, as shown in FIG. 9, could change the orientation of the principal light ray considerably.

The imaging portion 3 of FIG. 3 is configured of the three lenses 3a, 3b, and 3d and the aperture stop 3c. Details such as the number and shapes of the lenses of the imaging portion 3 and the position of the aperture stop 3c are not the same as those of configuration that would be used in practice, but are used here for description of the principles. In essence, the image creation portion 2 is configured in such a manner that the only luminous flux that is collected is luminous flux that satisfies the condition that the cone angle φ of the luminous flux f emitted from the image creation portion 2 is 8 degrees or less, in other words, that:

$$\phi \leq 8°$$

This is an essential condition for enabling the implementation of a projection-type display device which has the characteristics of magnified projection over a short distance, oblique projection, and a deep focal depth, and which is also inexpensive. This adjustment of the cone angle φ is performed by separately-provided means such as the aperture stop 3c which is either fixed or adjustable. It should be noted, however, that if luminous flux with a cone angle φ of 8 degrees or less is already made on the illumination portion side, this aperture stop could be omitted.

The basic configuration and condition setting described above make it possible to implement a projection-type display device having the four main features that are the objectives of this invention. One of the most important conditions for the implementation of the above ideal projector is that the imaging portion 3 should control the cone angle φ of the luminous flux f collected from the image creation portion 2 to be small. By keeping this small, it is possible to deepen the focal depth of the image in the region of the screen, with the result that magnified projection over a short distance and oblique projection can be implemented simply. In general, the depth δL of the focal depth is inversely proportional to the cone angle ξ of the luminous flux projected at the screen:

$$\delta L \propto \frac{1}{\xi}$$

The cone angle ξ on the screen and the cone angle φ of the collected luminous flux at the imaging portion 3 have the following relationship when they are small:

$$\phi = \beta \times \xi$$

It should be noted, however, that β is the size of the total magnification when the image creation portion 2 is projecting onto the screen. For a projection-type display device, the projection is always magnified, so β is greater than 1. From the above, the following is true:

$$\delta L \propto \frac{\beta}{\phi}$$

Therefore, if the magnification is fixed, it would be good if the imaging portion 3 could make the cone angle φ of the collected luminous flux as small as possible, to deepen the focal depth δL. If this is done, a large difference in the distance from the imaging portion 3 to the secondary image on the screen can be absorbed when magnified projection over a short distance or oblique projection is implemented. This also makes it possible to suppress the prescribed mechanical precisions, such as those of the spacing or eccentricity of optical components in the imaging portion 3, to be low Conversely, as φ becomes greater, the prescribed mechanical precisions become stricter, and it becomes difficult to configure the imaging portion 3 to absorb differences in distance and satisfy the prescribed resolution. Thus, if φ increases, the complexity and cost of the optical system increase in proportion thereto.

When the imaging portion 3 has made the cone angle φ of the collected luminous flux much smaller, it is necessary to be aware that the effects of diffraction in the imaging portion 3 will inevitably make the resolution on the screen worse. For example, assume that the application is the high definition television, which has approximately 1035 scan lines, and assume an image creation portion 2 with a diagonal on the order of one inch. In this case, if the aspect ratio of the image creation portion 2 is 9:16, the resolution r required of the imaging portion 3 is given by:

$$r = 1035 \div \left( \frac{25.4 \times 9}{18.3} \right) \approx 83 \text{ line/mm}$$

Within a tolerance, the required resolution can be considered to be a multiple of the numerical value. Furthermore, this numerical value counts each of the black and white scan lines as one line, but if this is re-read in such a manner that black and white together are counted as one line (line-pair per mm, hereinafter abbreviated to lp/mm), the excess quantity is absorbed and the numerical value can be used as it is. If this is considered to be the limiting resolution required of the imaging portion 3, the F number (F No.) at the diffraction limit of the imaging portion 3 is given by:

$$F \text{ No.} = \frac{1}{\lambda \times r} = \frac{1}{0.000546 \times 83} \approx 22$$

where λ is the central wavelength (0.000546 mm). Furthermore, if the cone angle φ is calculated from the relationship:

$$\sin \frac{\phi}{2} = \frac{1}{2 F \text{ No.}}$$

a value of φ that is approximately 2.6 degrees is obtained. Therefore, even if a comparatively high resolution is required, setting the imaging portion 3 so that the cone angle φ of the collected luminous flux is at least 2.6 degrees ensures that the effects of diffraction can be ignored. In this manner, the lower limit of the cone angle φ is set as appropriate from the required limiting resolution and the display specifications at that point. The upper limit is preferably as small as possible, as described above, but the problem of collection efficiency from the light source 1a, which will be mentioned later, cannot be ignored. Therefore, it is necessary to think about the many conditions relating to cone angle φ, such as the conditions for oblique projection (that is, the focal depth and the resolution conditions) and the collection efficiency, and balance them.

Before proceeding to specific embodiments of this invention, the discussion turns to considering the relationships among the actual light-emitting area δS of the light source, the effective surface area S of the image creation portion, the luminous flux collection angle α of the light source of the illumination portion, and also the luminous flux cone angle φ of the imaging portion, which are extremely important points in actual design.

The starting point for investigating the generalized Lagrange invariant is page 87 of Aberrations of Optical Systems, edited by W. T. Welford, as an authority for investigating the above described relationships. The general form thereof is given by the following equation:

$$I = dx\,dy\,dp\,dq$$

where dxdy is the cross-sectional area of luminous flux at the portion under study and dpdq is defined as the cone angle φ of luminous flux that passes therethrough. If absorption losses and the vignetting within the optical system are ignored, these factors can be multiplied together to establish the law: "Lagrange invariant I always remains constant during passage through an optical system." This equation can be applied to a general case as well, irrespective of the relationship between object and image. In practice, thorough care must be taken when actually applying the equations, but if the image creation portion 2 is illuminated by luminous flux of a small cone angle φ and if a light source 1a having a small volume compared with the image creation portion 2 is used, as in the present invention, use of this equation makes it possible to proceed with an unimpeded design.

For example, in the configurational example shown in FIG. 3, assume that the group of collection angle control components and the group of luminous flux control components are configured in a rotationally symmetrical plane having a common axis of rotation. Assume that the illumination portion 1 has a spherical light source and the center thereof is on the same axis of rotation. Assume also that the spherical mirror 1b configuring the auxiliary imaging device is a hemisphere centered on the light source and it intercepts exactly half of the luminous flux emitted from the light source 1a. In this case, the Lagrange invariant I relating to the light source 1a and the luminous flux emitted therefrom is given by the following equation, where α is the angle from the light source measured from a normal drawn perpendicular to the axis of rotation:

$$I = 2\pi \delta S \cdot \sin \alpha$$

An invariant I' at the image creation portion is given by the following equation, with the cone angle θ of the luminous flux being small:

$$I' = S\theta^2$$

If the illumination angle θ of the image creation portion is considered to be equal to the cone angle φ produced by the imaging portion, substitution with I and I' being equal gives:

$$2\pi \delta S \cdot \sin \alpha = S\phi^2$$

In this case, assume that the cone angle φ of the luminous flux produced by the imaging portion is kept constant, to clarify the meaning of the above equation. If it is also assumed that the effective surface area S of the image creation portion 2 that is used is also constant, it is clear that the collection angle α produced by 1c must be made smaller as the effective surface area δS of the light source 1a increases. Conversely, if the collection angle α is considered to be constant, with the aim of improving illumination efficiency, it is clear that the effective surface area δS of the light source 1a must be made smaller as the effective surface area S of the image creation portion 2 decreases. Thus the above four quantities are in an inseparable relationship. If the condition set by the present invention concerning the cone angle φ of the imaging portion 3 is also implemented, it is clear that conditions must be set between the effective surface area S of the image creation portion 2 and the effective surface area δS of the light source 1a, to guarantee an illumination efficiency of at least a fixed level.

If it is supposed that the coupling losses of the spherical mirrors can be ignored and the luminance intensity distribution of the light source is uniform, the "Sin α" of the above equation expresses the efficiency η of the luminous flux, including the effects of the auxiliary imaging device. Re-writing by using this relationship gives:

$$\frac{S}{\delta S} = \frac{2\pi}{\phi^2} \eta$$

In this case, if two of the conditions are substituted into this equation, that is, the condition that guarantees that the final efficiency of the luminous flux is at least 30%:

$$\eta \geq 0.3$$

and the condition for the cone angle that was set as the condition for oblique projection:

$$\phi \leq 8°$$

(where φ is converted into radians), then the following is obtained:

$$\frac{S}{\delta S} = \frac{2\pi}{\phi^2} \eta \geq 97$$

This is used as the condition to be set for the effective surface area of each of the image creation portion and the light source. This condition will be modified by configurational conditions of the optical system in the auxiliary imaging device and the luminance intensity distribution of the light source, but it can be assumed to be standard.

Figure 4:
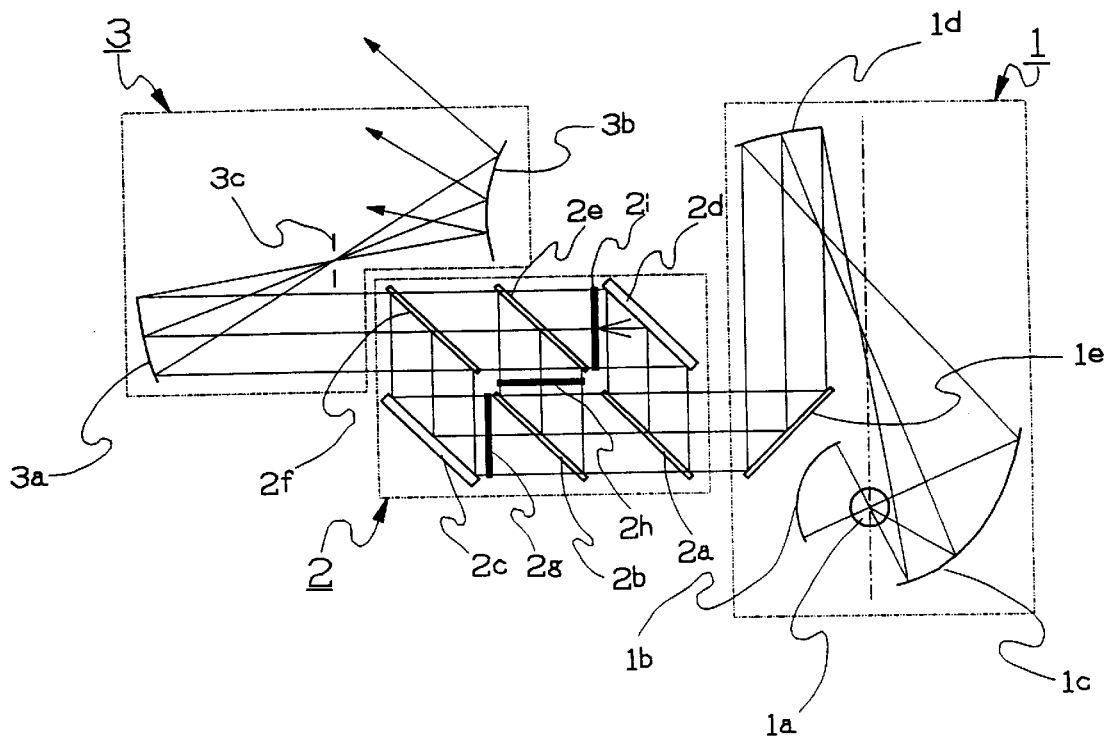
FIG. 4 is a sectional view of a first embodiment of the present invention.

Specific embodiments of the projection-type display device of this invention will now be considered. A sectional view of the configuration of a first embodiment is shown in FIG. 4. A light source 1a that forms a illumination portion 1 is configured of an electric discharge lamp such as a metal halide lamp. In the embodiment, the electrodes are disposed perpendicular to the plane of the paper. A principal light ray generated from the imaginary center of the light source 1a is sequentially reflected by reflecting mirrors 1c and 1d so that princiapl light rays therefrom are converted into a mutually parallel bundle of rays. The reflecting mirrors 1c and 1d configure a group of luminous flux control components. 1c is a distribution control surface and 1d is a direction control surface. In addition, the surface 1c also acts to provide collection angle control, together with a reflecting mirror 1b. The reflecting mirror 1b forms an auxiliary imaging device that returns the luminous flux that has not been collected directly by the reflecting mirror 1c back to the light source, to improve the efficiency of the luminous flux as a result. The reflecting mirrors 1c and 1d are rotationally symmetrical surfaces having a common axis of rotation that suns vertically through the imaginary center of the light source 1a in the plane of the paper. The reflecting mirror 1b is a spherical reflecting mirror centered on the imaginary center of the light source 1a. 1e denotes a flat reflecting mirror having the action of folding the luminous flux. This reflective means that simply folds the optical path can be employed anywhere within the optical system as required, but it is not essential to this invention. The luminous flux of this illumination portion 1 is shone onto the image creation portion 2.

The image creation portion 2 illustrated here is a representative example of the use of a transparent liquid crystal device with a diagonal on the order of 1.4 inches. The structure of this image creation portion 2 is already known in the art, and thus it is not an essential part of this invention. In the figure, 2c and 2d denote simple plane reflecting mirrors and 2a, 2b, 2e, and 2f denote components know as dichroic mirrors, which perform color separation and composition. The components 2g, 2h, and 2i, shown in black, are transparent liquid crystal panels corresponding to the primary colors, which are placed at equal spacing between the imaging portion 3 and the illumination portion 1. In this case, the principal light ray of luminous flux that passes through the liquid crystal is configured to be incident perpendicularly on the liquid crystal. This makes it possible to prevent any losses in light quantity on passage through the dichroic mirrors and changes in brightness, color, or contrast on passage through the liquid crystal. Luminous flux that has passed selectively through the liquid crystal and been shaded thereby is directed to the imaging portion 3.

The imaging portion 3 is configured of only two reflecting mirrors 3a and 3b, having a common axis of rotational symmetry. The reflecting mirror 3a presents a concave surface to the image creation portion 2 and has a convergent action. After the parallel bundle of rays emitted from the image creation portion 2 is incident on the reflecting mirror 3a, it is focussed on a stop 3c provided in the vicinity of the focal point of the reflecting mirror 3a, on the axis of rotation of the reflecting mirror 3a. In this example, the cone angle φ of the imaging portion 3 is standard at approximately 3.5 degrees and the resolution is approximately 25 lp/mm. If the main bundle of rays incident on the imaging portion 3 is parallel, the configuration in which this initial reflecting mirror 3a is set to be concave is extremely effective in making the entire imaging portion 3 compact. The luminous flux that has passed through the stop 3c is reflected by the convex reflecting mirror 3b that has a divergent action, and forms a secondary image of a size of approximately 60 inches on a screen 4, which is approximately 2.4 meters away but is not shown in the figure. The above was an outline of the overall configuration of the first embodiment of the present invention. The configuration and function of each of the components will now be described in detail.

The illumination portion 1 of this invention is subjected to fixed conditions concerning the size of the image creation portion 2, the size of the light source 1a, the collection angle from the light source, and the cone angle of the imaging portion 3, and it is also required to provide luminous flux control from detailed consideration of the characteristics of the various components of a projection-type display device. For example, taking the light source 1a that is used in isolation, each type of light source has characteristics such as its own distinctive shape, luminance distribution, and luminance intensity distribution of the light-emitting portion and the external shape thereof. Information relating to these characteristics is essential information when it comes to designing the illumination portion 1, and it is also plays an important role in luminous flux control in the integration of the various components with consideration of these factors.

Japanese Patent Publication No. 6-1295 described how to use a computer to determine the disposition of reflective surfaces and the shapes of curved surfaces that enable illuminance distribution and direction control, either analytically or successively. Under the conditions of this invention, whereby the light source 1a is small in comparison with the size of the image creation portion 2 and the cone angle θ of the luminous flux shone onto the image creation portion 2 is small, this basic thinking can be applied to the group of luminous flux control components as well.

Taking the two reflecting mirrors 1c and 1d configuring the group of luminous flux control components of the illumination portion 1 of this embodiment as an example, the basic procedure for determining the shapes thereof will now be described with reference to FIG. 11. This FIG. 11 is a sectional view in which the illumination portion 1 of FIG. 4 has been rotated in the plane of the paper so that the vertical common axis of rotation is lying horizontally. In FIG. 4, the image creation portion 2 is positioned with respect to the illumination portion 1 after the folding produced by the flat mirror 1e, but this flat mirror is omitted from FIG. 11 and the image creation portion 2 is positioned without change on a line extending from the axis of rotation. The auxiliary imaging device 1b is also omitted. The above simplifications have no significant effect on the description of the group of luminous flux control components.

To ensure that just the basic concept is described in an easy-to-understand manner, the actual design method is simplified so that only the essentials are given. Since the distribution control surface 1c and the direction control surface 1d of this example are configured from rotationally symmetrical surfaces having a common axis of rotation, a comparatively straightforward design can proceed. First of all, the common axis of rotation o—o (the optical axis) of 1c and 1d, the position on the optical axis of the light source 1a, and also the position of the liquid crystal display devices (such as 2g) of the image creation portion 2 are determined as the initial conditions. The start-point coordinates p0 and q0 of the control surfaces 1c and 1d are then determined. In this example, p0 and q0 are on opposite sides of the optical axis. An arbitrary number of divisions n is then decided upon, the liquid crystal display device 2g is divided into annular sections of equal surface area, as shown in the figure, and section points thereof are labelled s0, s1, s2, . . . , sn. The principal light ray reflected from 1d is configured to be parallel to the optical axis, so that s0 and q0 are the same distance from the optical axis. Relating to the principal light ray generated from the imaginary center of the light source 1a, the previously designed collection angle range by 1c is divided into n parts, in such a manner that the solid angles subtended thereby are equal. This ends the design preparations.

The principal light ray that is sent out in the initial angular direction from the light source 1a reaches p0 and a tangent is determined towards q0 at the point p0. The tangent at q0 is determined in such a manner that the principal light ray reflected at q0 is aimed towards s0. Thus the coordinates and inclination of the initial point is fixed at each surface. In the same manner, the principal light ray aimed in the next angular direction goes out from the light source 1a and the intercept p1 between that light beam and the tangent passing through p0, which is obtained by the previous process, is obtained. The intercept between the straight line from s1 parallel to the optical axis and the tangent of the surface passing through q0 is next obtained to give q1. The tangent at q1 is determined in such a manner that the principal light ray emitted from p1 to q1 is aimed towards s1. Subsequently, the above process is repeated as appropriate to obtain a series of points defining the surface shapes of each of 1c and 1d, whereby a plan for one set of curves is determined.

A simulation is then run, considering factors such as the detailed shape, luminance distribution, and luminance intensity distribution of the actual light source 1a. This simulation is subjected to a detailed check to determine whether the cone angle φ of the luminous flux at the image creation portion 2 and the distribution and illumination thereof have favorable distributions, and whether the efficiency satisfies the required specifications. These tests are performed on a number of plans, from among which the optimal reflective surface shapes and spatial arrangements of the reflecting mirrors 1c and 1d are determined. The above process is comparatively simple, since it is based on previously fixed conditions such as the size of the light source, but it would be extremely difficult work involving a great deal of trial and error if no conditions were set. During the determination of the initial plan, the distribution of the principal light ray on 2g is set so that 2g is divided into sections of equal surface area, but the starting points for these sections and surfaces of the principal light ray can be used as parameters in the determination of subsequent plans. During this time, it is necessary to set a virtual plane for controlling the distribution of the principal light ray, but in this embodiment, the liquid crystal display device 2g of the image creation portion 2 itself acts as a virtual plane. This virtual plane could be set at any place that is considered to be most suitable for that particular design.

Based on the above fundamental idea, various algorithmic contrivances are used for obtaining the optimal shapes during the actual design. Moreover, such methods can also be applied to general surfaces other than rotationally symmetrical surfaces. This work is all done interactively, using a computer. Even with such a comparatively simple two-surface configuration as described above, it is possible to consider many variations relating to the shapes of the reflective surfaces and the spatial arrangements. Other embodiments are shown in FIGS. 12 to 16. In these FIGS., 1a denotes a light source, 1b denotes an auxiliary imaging device, 1c denotes a distribution control surface, 1d denotes a direction control surface, and 2 denotes a image creation portion.

Figure 13:
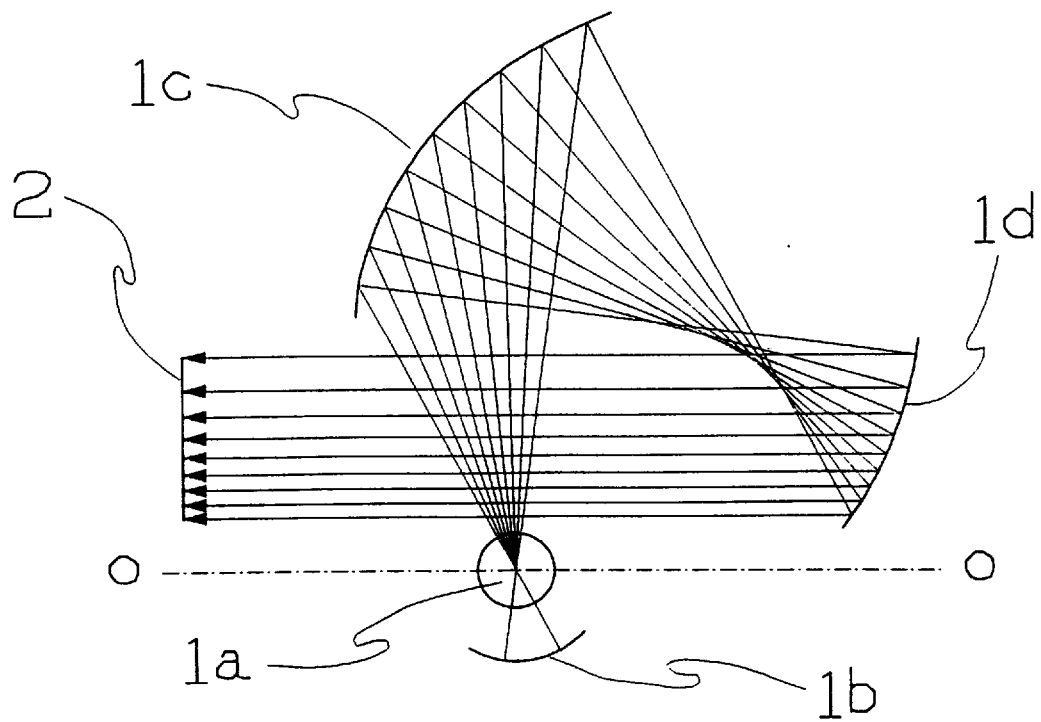
FIG. 13 shows a second variation of the illumination portion.
Figure 16:
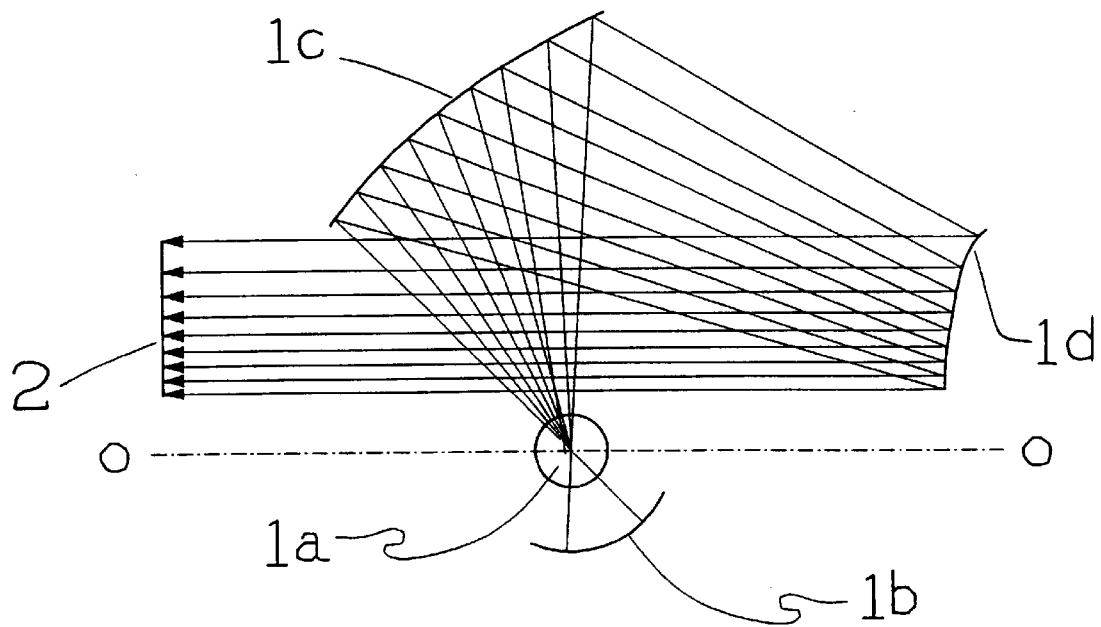
FIG. 16 shows a fifth variation of the illumination portion.

In the embodiment of FIG. 11, the configuration is such that the principal light ray from the light source 1a mainly consists of a component in the optical axis direction but in a direction away from the image creation portion 2, which is reflected by the reflecting mirror 1c, and subsequently the luminous flux reflected by the reflecting mirror 1d is reflected towards the image creation portion 2 in a direction parallel to the optical axis. In contrast thereto, in a variation shown in FIG. 12, the light from the light source 1a has a component in the optical axis direction directed close to the image creation portion 2 that is reflected by the reflecting mirror 1c. In a variation shown in FIG. 13, the basic arrangement is similar to that of the embodiment shown in FIG. 11, except that although the reflecting mirrors 1c and 1d of FIG. 11 are on opposite sides of the optical axis o—o, the reflecting mirrors 1c and 1d of FIG. 13 are on the same side of the optical axis. In a variation shown in FIG. 14, the luminous flux from the light source 1a mainly consists of a component in the optical axis direction but in a direction away from the image creation portion 2, which is directed towards the reflecting mirror 1c and reflected thereby, then the direction thereof is controlled such that it is reflected by the reflecting mirror 1d on the opposite side of the optical axis. In this variation, the reflecting mirror 1d is a convex mirror, in contrast to the concave mirror of all of the previous examples. In a variation shown in FIG. 15, the basic arrangement is similar to that of the embodiment shown in FIG. 12. However, in contrast to the embodiment of FIG. 12 where the luminous flux crosses itself between the reflecting mirrors 1c and 1d, the luminous flux does not cross itself between the reflecting mirrors 1c and 1d in FIG. 15. In a variation shown in FIG. 16, the basic arrangement is similar to that of the embodiment shown in FIG. 13. However, in contrast to the embodiment of FIG. 13 where the luminous flux crosses itself between the reflecting mirrors 1c and 1d, the luminous flux does not cross itself between the reflecting mirrors 1c and 1d in FIG. 16. As a result, the reflecting mirror 1d is not configured as a concave mirror, but as a convex mirror.

The above described embodiments of FIGS. 11 to 16 related in particular to configurations in which the group of luminous flux control components for controlling the cone angle, the distribution thereof, the illuminance distribution, and the direction of the luminous flux are two reflecting mirrors. In other words, the light source 1a is an electric discharge lamp with the electrodes disposed perpendicular to the plane of the paper. The distribution control surface 1c also provides all control over collection angle. The luminous flux emitted from the direction control surface 1d is always parallel to the optical axis. The auxiliary imaging device 1b is always a spherical mirror. These control conditions control the various specifications relating to structure and are simply cited here to make the description easier to understand; they should not be taken as limiting the present invention in any way.

Figure 17:
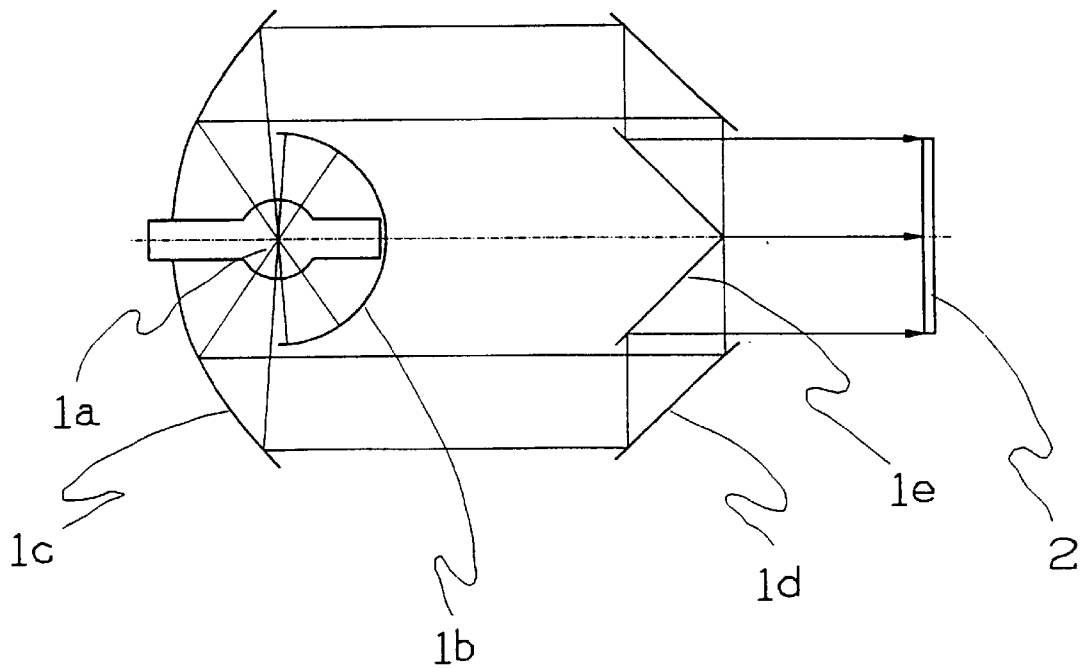
FIG. 17 shows a second example of the illumination portion.
Figure 18:
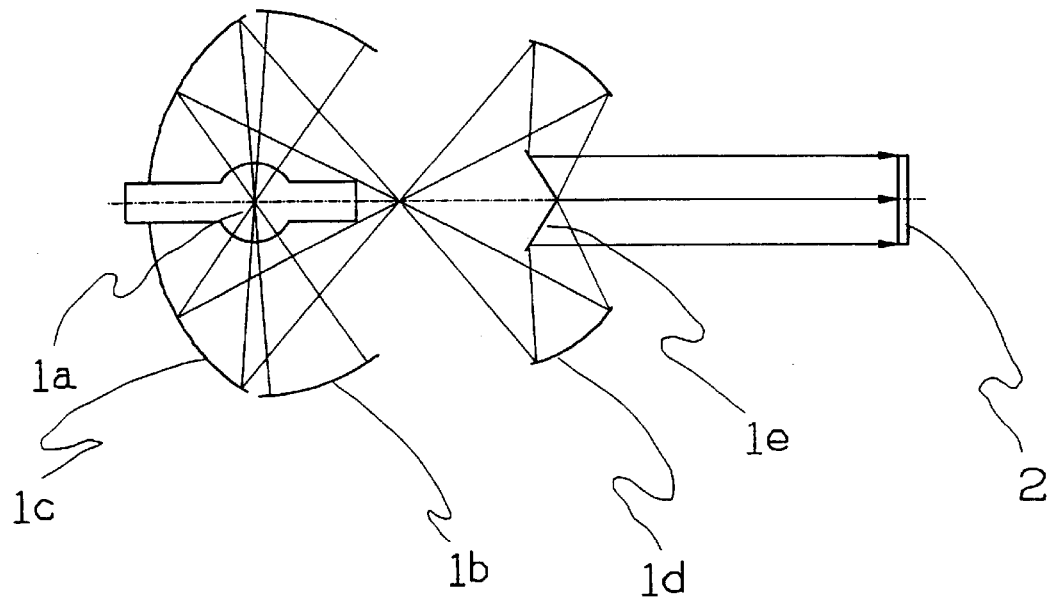
FIG. 18 shows a third example of the illumination portion.

Other embodiments in which the illumination portion 1 is configured of rotationally symmetrical reflective surfaces having a common axis of rotation are shown in FIGS. 17 and 18. Each of these embodiments is configured of an electric discharge lamp light source 1a positioned along the optical axis, two reflecting mirrors 1c and 1d that form a group of luminous flux collection angle control components, two reflecting mirrors 1d and 1e that form a group of luminous flux control components, and an image creation portion 2. The reflecting mirror 1b is an auxiliary imaging device formed from part of a spherical surface.

The reflecting mirror 1c of FIG. 17 is a parabolic surface that converts the principal light ray from the light source 1a into luminous flux parallel to the optical axis. The group of luminous flux control components consists of the reflecting mirror 1d as a distribution control surface and reflecting mirror 1e as a direction control surface, and the reflecting mirror 1e controls the principal light ray emitted from the illumination portion so that it is parallel to the optical axis. The shapes of these surfaces are determined in the same manner as in the above described two-mirror configurations. In FIG. 18, the reflecting mirror 1c is configured of an elliptical surface and, except for a temporary focus between that mirror and the reflecting mirror 1d, the configuration is basically the same as that of FIG. 17.

In the same manner as the embodiment of FIG. 11, this configuration has many different variations. It is clear that there are various different combinations and an extremely large number of variations can be envisioned, for example, the shapes of the reflecting mirrors 1c, 1d, and 1e could be of a type that disperses the principal light ray or converges it, the principal light ray could cross itself or not between the reflecting mirrors 1c and 1d or the reflecting mirror 1d and 1e, the crossing points could occur straddling the optical axis, or they could occur on the same side. In addition to these, there are many variations in the direction in which the principal light ray is emitted from 1e.

Details of such variations are omitted, but points of the variations that are thought to be important will be itemized below. Various features such as the following could be raised: "The reflecting mirror 1c in the group of collection angle control components can also act as a distribution control surface for the group of luminous flux control components," "If the reflecting mirror 1c is also acting as a distribution control surface for the group of luminous flux control components, either of the reflecting mirrors 1d and 1e could have a section that is cone-shaped defined by a straight section line," "Of course, all of the surfaces could be defined by a curved section line," "If there is a minimum of two control surfaces, control is possible," "The reflecting mirror 1e is a rotationally symmetrical surface that is concave or convex, in most cases having a tip point on the optical axis," "Having the principal light ray cross itself between the reflecting mirror 1c and 1e makes it possible to reduce the width of the illumination system, but it is necessary to be careful about interference in the longitudinal direction of the light source," "The crossing type of principal light ray could pass through an aperture stop, to vary the brightness or the cone angle," and "The non-crossing type of principal light ray enables gentler curvatures for the curved surfaces, which often makes control easier." The most suitable arrangement can be selected by skillful use of these features, depending on the overall configuration and specifications, including those of the imaging system.

Figure 19:
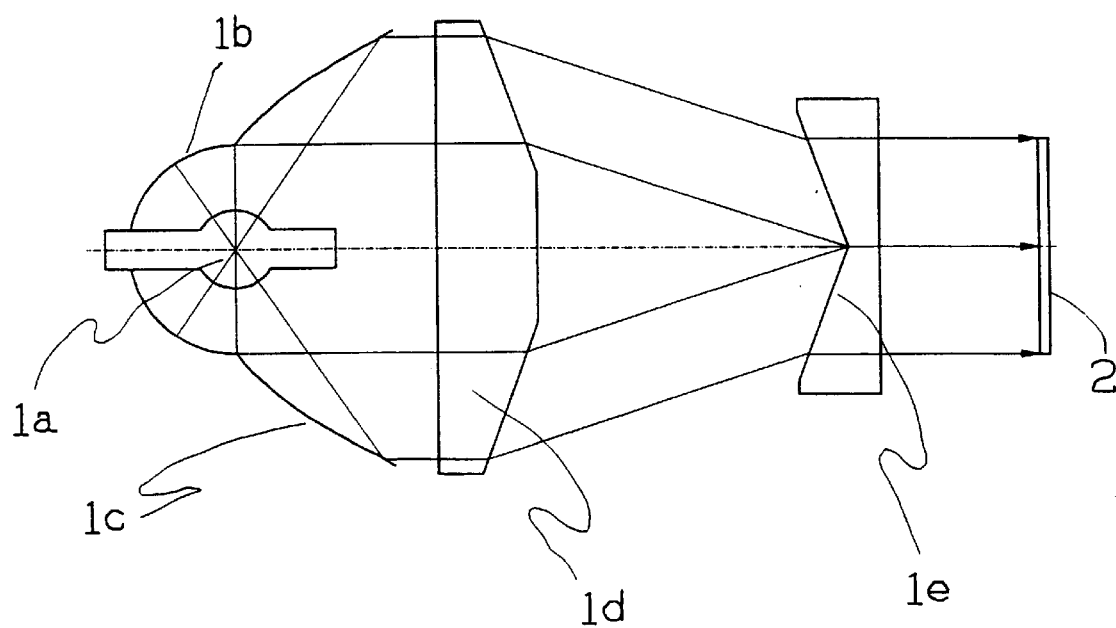
FIG. 19 shows a fourth example of the illumination portion.

Another embodiment, in which the group of luminous flux control components is configured of lenses, is shown in FIG. 19. This embodiment is configured of an electric discharge lamp light source 1a positioned along the optical axis, two reflecting mirrors 1c and 1d that form a group of luminous flux collection angle control components, and two lenses 1d and 1e that form a group of luminous flux control components. 1b is an auxiliary imaging device formed from part of a spherical surface. Each of the two lenses has a single flat surface, but they could also naturally have curved surfaces. These control surfaces could be made to form curved surfaces by basically the same consideration as those configuring the reflection system of FIG. 11, and as a natural result they form aspheric surfaces. They need not be continuous curved surfaces; Fresnel lenses or lenses with varying refractive index could equally well be used. In general, a configuration using lenses makes it possible to dispose the various components linearly.

The embodiment of FIG. 19 is also configured of surfaces that are rotationally symmetrical about an axis that is the optical axis. By following the basic idea illustrated in FIG. 11, it can be easily understood that the shapes of the control surfaces configuring the group of luminous flux control components can be made to be rotationally symmetrical surfaces, by making the distribution of the principal light ray over a virtual plane as a developed shape not concentric circles but an elliptical distribution. Since the shape of the image creation portion is frequently rectangular, an improvement in efficiency can be expected from converting the circular or annular shape of luminous flux created by the rotationally symmetrical reflecting mirror 1c into an elliptical shape. This embodiment can be considered to illustrate the use of the group of luminous flux control components as a group of shape-modification components as well.

In addition to the above, optical components capable of changing the direction of the principal light ray could all be used as control surfaces, including combinations of reflective surfaces and lenses, and all combinations thereof are possible. In other words, the important part is the basic idea concerning the structural method. They need not be continuous curved surfaces; components such as Fresnel lenses or diffraction gratings could equally well be used. It should be noted, however, that a non-continuous surface such as a Fresnel lens raises no problems relating to ideal boundaries, but it is necessary to be aware when using such a lens that it leads to a loss of luminous flux due to the ordinary vignetting. Color scattering can occur with a diffraction-grating type of component, but it can be used without any problems if a component such as an integrator is used.

The above description illustrated variations in the group of collection angle control components and the group of luminous flux control components relating to the illumination portion 1 of the first embodiment of FIG. 4. The distribution control surfaces mainly control the distribution of the principal light ray at virtual planes, and provide control over the cone angle of the luminous flux as well as the distribution and illuminance distribution thereof. The direction control surfaces mainly control the direction of the luminous flux, but they also naturally have an effect on the cone angle and distribution of the luminous flux. Differences in the shapes of the control surfaces and their distances from the light source will produce different results, even if the distribution of luminous flux at a virtual plane is the same. It is therefore generally necessary to verify the design by simulation. The fundamentals of this control is based on Lagrange invariants and is designed to control the spatial spreading of the luminous flux and the cone angle distribution of the luminous flux.

If the control surfaces are configured of the above described rotationally symmetrical surfaces, control within the plane containing the axis of rotation can be performed freely, but control in planes normal to this axis of rotation is dependent on distance from the axis of rotation. More specifically, if the principal light ray generated in equal solid angles from the light source is distributed between areas of equal size on a virtual plane, as shown in FIG. 11, the Lagrange equation:

$$dxdydpdq=dx'dy'dp'dq'$$

gives:

$$\frac{dpdq}{dx'dy'} = \text{constant}$$

so that, if the size dxdy of the light source is constant not only in the direction of the principal light ray, the solid angle dp'dq' of the luminous flux on a virtual plane is also substantially constant. However, if dp' and dq' are viewed separately as corresponding directional components, the proportions thereof vary with the distance from the axis of rotation. In other words, there is a limit on control up to the cone angle distribution of luminous flux comprising components in each direction, when using only rotationally symmetrical surfaces. If such detailed control is necessary, it is possible to remove this dependence on the direction of rotation, by introducing non-rotationally symmetrical surfaces or utilizing an aggregate body of a large number of independent curved-surface patches.

The above was a description of the group of luminous flux control components that is an important structural element of the illumination portion 1 of this invention. The description now concerns the auxiliary imaging device 1b which is provided in the vicinity of the light source 1a and which is an important component configuring the group of collection angle control components of this illumination portion 1. The provision of an auxiliary imaging device within the illumination portion 1 for returning part of the luminous flux back towards the light source has already been employed in many commercial products such as overhead projectors, starting with Japanese Patent Publication No. 6-1295 and Japanese Patent Application Laid-Open No. 3-111806. When there is a desire to reduce the general power consumption or further increase the brightness on the screen, the demand naturally strengthens for an increase in the efficiency of the light source. In that case, an effective means would be to utilize the portion of the luminous flux from the light source that is not used in illuminating the image creation portion 2.

If the cone angle θ of the luminous flux at the image creation portion 2 is set to be small, as in this invention, it often happens that it is not possible to obtain a sufficiently small light source to match this, and thus it is necessary to reduce the direct solid collection angle at the group of collection angle control components and also employ an auxiliary imaging device. The object point and image point of the auxiliary imaging device provided with the above objective are the light source itself, setting up the condition that the imaging point should be in the vicinity of the original light spot.

If such an auxiliary imaging device is used, it is theoretically possible to increase the efficiency by setting the size of the imaging magnification thereof to be at least one, that is, by configuring it as an enlarging system. In other words, if the collection efficiency of luminous flux achieved by the regular optical system $1c$ and $1d$, etc., without the auxiliary imaging device $1b$ of FIG. 4, is assumed to be $\eta_0$ and the enlargement ratio of the light-generating portion achieved by the auxiliary imaging device satisfies the following condition:

$$\beta = \frac{1}{4\eta_0(1-\eta_0)}$$

the efficiency of the auxiliary imaging device is at a maximum, at which point the maximum efficiency is given by:

$$\eta_{max} = 2\eta_0(1-\eta_0)$$

which can be deduced by simple calculations if the light source is assumed to be a spherical light source and the luminous intensity distribution thereof is assumed to be constant. If the auxiliary imaging device is a reducing system, the efficiency is at its highest when the magnification is one, so that the efficiency $\eta$ cannot exceed the efficiency $\eta_0$ of the original regular illumination portion.

To answer ordinary demands, it is sufficient to provide the spherical mirror $1b$ (equivalent to a magnification of one) that is used by this embodiment. It should be noted, however, that it is necessary to consider the situation well, even when the same spherical mirror is provided. In other words, if the size of the light source is comparatively large and the radius of curvature of the spherical mirror is too small, the effects of aberration will make the light source image even bigger, or positional accuracy will become more severe. Conversely, if it is too large, the cost will increase and the overall size of the device will be affected. It is therefore necessary to use a mirror with the optimal radius of curvature for the size of the light source. It is also important to determine how the auxiliary imaging device should be disposed with respect to the light source.

Figure 22:
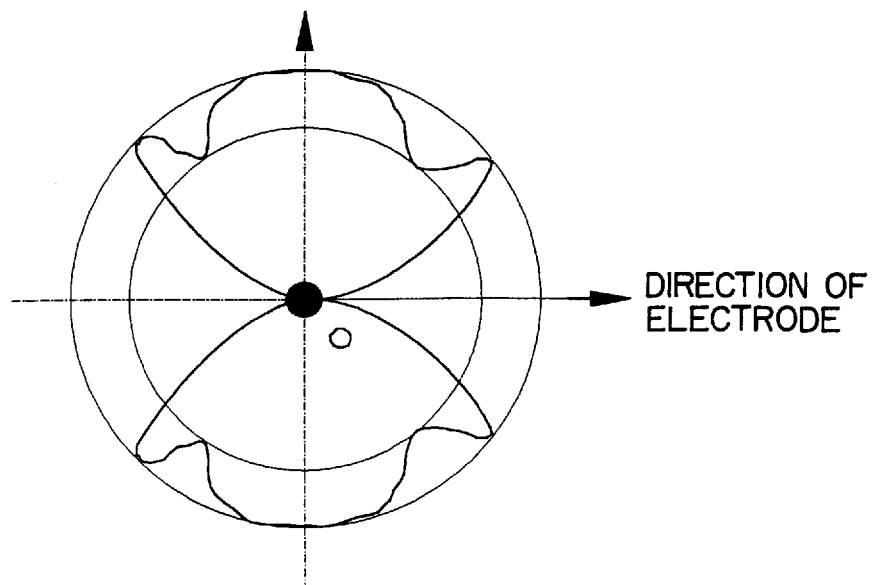
FIG. 22 is a conceptual diagram of the luminous intensity distribution of an electric discharge lamp.

If an even higher efficiency of the luminous flux is required, it is preferable to use an auxiliary imaging device having a suitably large imaging magnification instead of the spherical-surface reflecting mirror $1b$. An example of such an auxiliary imaging device is shown in FIG. 20. This auxiliary imaging device is configured of two reflecting mirrors $1ba$ and $1bb$. In the figure, $1ba$ is drawn as if divided into two parts, but it is basically an integral component. In this embodiment, the electrodes of an electric discharge lamp $1a$ such as a metal halide lamp are disposed perpendicular to the optical axis o—o of the auxiliary imaging device. An aperture portion $1bd$ through which the luminous flux L is emitted is equivalent to the portion of the luminous flux from the light source $1a$ that the illumination portion collects. FIG. 20 shows one means whereby the aperture portion other than $1bd$ is covered by the reflecting mirrors $1ba$ and $1bb$, and the luminous flux is effectively folded back towards the aperture portion $1bd$. The portions extending from the electrodes are not covered by reflecting mirrors, but, since the light source $1a$ usually has a luminance intensity distribution such as that shown in FIG. 22, there are virtually no losses of luminous flux from these portions. In this manner, it is important to consider not just the size of the light source but also the luminance intensity distribution and the shape thereof, to utilize it efficiently.

A cross-sectional view comprising the optical axis o—o of the auxiliary imaging device of FIG. 20 and also normal to the electrode direction is shown in FIG. 21. Each reflecting mirror is rotationally symmetrical about the optical axis o—o which is drawn horizontally, and the aperture portion $1bd$ through which the luminous flux is emitted is placed on the right in the figure. The opening angle of the aperture portion $1bd$ through which the luminous flux directed towards the image creation portion 2 is emitted is set in such a manner that it submits an angle of ±45 degrees with respect to the optical axis o—o of the reflecting mirrors. In this configuration, luminous flux that is generated over a cone angle of 90 degrees directly upward from the light source $1a$ is reflected by the reflecting mirror $1ba$ at the top of the figure then, after being reflected by the reflecting mirror $1bb$ at the lower left of the figure, it is fed towards the reflecting mirror $1c$ of the illumination portion 1 through a range of 45 degrees of the upper part of the aperture portion $1bd$. Thus the imaging magnification of the imaging device is set to be approximately two. This is exactly the magnification condition for maximum efficiency. In a similar manner, the luminous flux generated over a range of 90 degrees directly downward is emitted from a range of 45 degrees of the lower part of the aperture portion $1bd$.

Consider a different path for the luminous flux in the embodiment of FIG. 21. In other words, the luminous flux that is initially generated in range of 45 degrees on the lower left side passes the reflecting mirror $1ba$ at the top, the reflecting mirror $1ba$ at the bottom, and the reflecting mirror $1bb$ at the upper left side, and is then emitted through the lower part of the aperture portion $1bd$, in substantially the opposite manner to that described previously. In that case, the imaging magnification of the imaging device is approximately one. Therefore, the auxiliary imaging device of this embodiment satisfies the condition that the optical magnification should be at least 1, whichever path is followed, which provides an effective means for increasing the efficiency, by combining the two paths. This is only one example, but it makes it possible to provide various different auxiliary imaging devices that satisfy the condition that the magnification should be at least one, using combinations of the flux characteristics of the light source, and the dimensions and shape thereof.

The above described auxiliary imaging device of FIG. 20 is basically configured of a combination of the two reflecting mirrors $1ba$ and $1bb$. However, the application of this device as an imaging device will differ according to the direction in which the luminous flux of the light source initially propagates, so it is necessary to be aware that it consequently comprises a plurality of imaging devices. The discussion as to whether the imaging magnification of this device as an auxiliary imaging device is greater than one is a theoretical assumption. With an electric discharge lamp in practice, for example, when an image that is larger than the size of the original light spot has been created, the electrodes cause vignetting so that the theoretical efficiency cannot be achieved. It is therefore possible that a good effect can be achieved in some cases by using an auxiliary imaging device that has a magnification of less than one. It might also be important to use some means to deliberately move the image of the light source away from the position of the light spot, as in Japanese Patent Publication No. 40-6028.

The above described returning of the light directly back to the light spot will raise the temperature in the vicinity of the light spot and greatly change the light-generating conditions of the lamp. This is likely to adversely affect factors such as the spectral distribution of the light and the lifetime of the device. In this respect, in addition to making the disposition of the auxiliary imaging device a prerequisite, it is necessary to optimize the various conditions relating to the light source, such as gaps over the electrodes, the input power, and the cooling conditions. It is also necessary to provide means such as a cold mirror through which thermic rays pass, on the reflective surfaces of the auxiliary imaging device, in order to avoid thermal effects.

It is naturally possible to use lenses in this auxiliary imaging device itself, but it is better to use reflective optical means in cases where the auxiliary imaging device will often handle a large solid angle and it has to be constructed as simply and in as small a space as possible. Conversely, with this embodiment, it could be effective to position a lens in the vicinity of the exit aperture $1bd$ and use it to create a parallel beam. In such a case, it is also possible to perform luminous flux control by $1ba$ and $1bb$, so that the parallel light rays emitted from the lens can be used as illumination luminous flux at the image creation portion. If the luminous flux is controlled after it is emitted, it is possible in principle to obtain close to twice the quantity of luminous flux by forming $1ba$ and $1bb$ as elliptical surfaces and placing a light source at each focus.

The description now turns to the imaging portion 3, which is the final structural component of the first embodiment shown in FIG. 4. The first point to be noted is that the imaging portion 3 is configured of only two reflecting mirrors $3a$ and $3b$. This configuration is totally impossible with a prior-art projection-type display device. To repeat a previous statement, to implement the four features which such a projection-type display device ought to be provided, this invention uses luminous flux of a cone angle of no more than 8 degrees, with a configuration that is as simple as possible. As a result, this configuration is possible.

That is to say, the number of aberrations to be corrected by the optical system of the imaging portion 3 can be reduced by using the illumination portion 1 to control the cone angle of luminous flux emitted from the image creation portion 2 and input to the imaging portion 3, as well as the distribution, illuminance distribution, and direction thereof, and by keeping the cone angle φ of the luminous flux incident on the imaging portion 3 small, so long as the resolution and the efficiency of the luminous flux are within permissible ranges. This makes it possible to overcome the fatal defect of "there are too few parameters for use in correction," which is the greatest problem when a reflective optical system is used in the imaging portion 3, and this small number of parameters can be used effectively in the correction of, for example, astigmatism, distortion, and field curvature, out of Seidel's five aberrations. Of these, field curvature can be corrected by, for example, bending the screen, making it possible to concentrate on the remaining two aberrations.

Based on the above fundamental concepts, it is possible to implement a projector that satisfies the conditions of being compact, light-weight, and inexpensive, in addition to having the four major features. In certain limited applications, it may be possible to use a single reflecting mirror, by making the cone angle φ of the luminous flux collected by the imaging portion 3 sufficiently small, but from the point of view of freely controlling the usually required conditions such as brightness, resolution, and projection distance, it is essential to use at least two reflective components. Similarly, when reflecting mirrors are used, it is essential to make them aspheric surfaces to ensure unlimited correction.

When a reflective optical system is used in the configuration of the imaging portion 3, the reflective optical means which is closest to the image creation portion 2 and which has an imaging action frequently has a convergent action with respect to the image creation portion 2. This fact will now be described with reference to the conceptual diagrams of FIGS. 23 and 24. For the sake of simplification, assume that the image creation portion 2 is configured of a transparent display device, and the bundle of principal rays L is mutually parallel and is incident perpendicularly on the image creation portion 2. Assume also that the imaging portion 3 consists of two reflecting mirrors $3a$ and $3b$.

Figure 23:
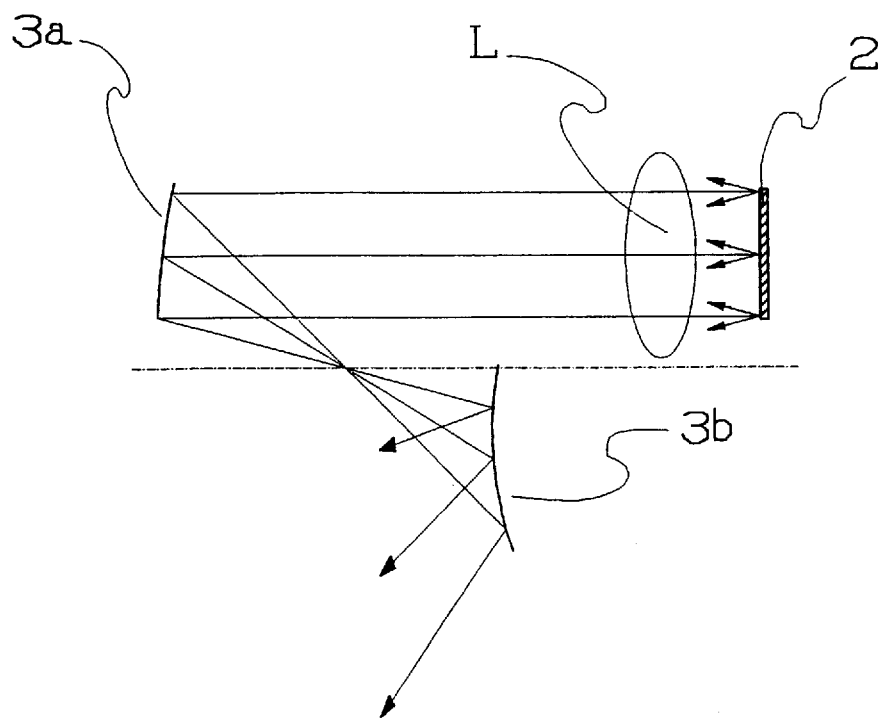
FIG. 23 is a conceptual diagram showing a case in which the initial reflective optical means of the imaging portion is configured of a concave mirror.

With the above configuration, if the first reflecting mirror $3a$ of the imaging portion 3 has a convergent action, the reflected bundle of principal rays L is propagated in a mutually converging direction, as shown in FIG. 23. This configuration has the advantage of being compact and it is easy to avoid the vignetting by the image creation portion 2. In contrast, when $3a$ has a divergent action, the bundle of principal rays L diverges after being reflected as shown in FIG. 24, and the subsequent reflecting mirror $3b$ has to be large. It is also likely that the image creation portion 2 itself will shade the luminous flux, imposing large restrictions on layout. The above description relates to examples in which the bundle of principal rays L from the image creation portion 2 is parallel, but this limitation does not apply to cases in which the bundle of principal rays L is, for example, convergent after passing through the image creation portion 2.

Another reason is that there may be a structural component such as a color separation system between the image creation portion 2 and the imaging portion 3, as also shown in FIG. 4, which often means that a sufficiently long operating distance is necessary. It is thus advantageous to dispose a component that acts as a concave lens on the screen side of the imaging portion 3. Therefore, when implementing an imaging portion with few structural components, it is preferable to make the initial surface close to the image creation portion 2 a concave surface (having the action of a convex lens).

The description now concerns the aperture stop $3c$ of the imaging portion 3 of FIG. 4, which in this embodiment is provided in the vicinity of the focal point of the reflecting mirror $3a$ which has a convergent action. This aperture stop operates to block off the luminous flux that has a cone angle larger than a predetermined value. Not only that, it can also be used as a simple method of adjusting the amount of luminous flux reaching the screen and the resolution if necessary, in a similar manner to that of an ordinary lens system, by varying the size of the aperture within a permissible range. This stop need not necessarily be an aperture; it could equally well be a small circular mirror positioned on a flat plate. In an extreme case, the reflective deposition range of the mirror $3b$ can simply be made a constant shape, depending on the disposition of the reflecting mirrors of the imaging portion. In addition to the above actions, this stop also acts as an important means for cutting excess flaring and stray light.

Figure 5:
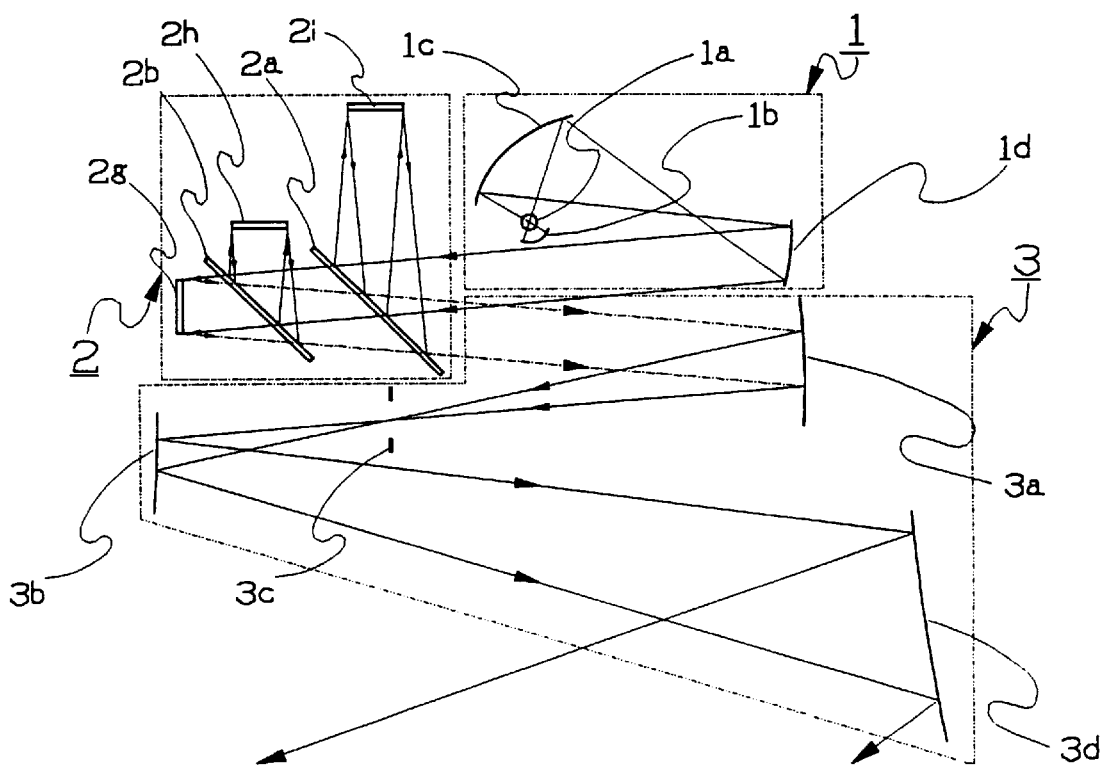
FIG. 5 is a sectional view of a second embodiment of the present invention.

The above detailed description concerns a first embodiment of the present invention, as shown in FIG. 4, including variations of structural components thereof. A second embodiment based on this invention is shown in FIG. 5. The configuration of the illumination portion 1 is substantially the same as that of the first embodiment. In other words, luminous flux emitted from an electric discharge lamp light source 1a disposed perpendicular to the plane of the paper is guided by a reflecting mirror 1c configuring a group of collection angle control components to a reflecting mirror 1d. In the same manner as in the first embodiment, the reflecting mirror 1c also acts as a distribution control surface of a group of luminous flux control components. The reflecting mirror 1d plays the role of a direction control surface. This configuration differs from that of the first embodiment in that the principal light ray is inclined at a fixed angle with respect to the normal of the image creation portion 2 and is incident as a mutually parallel bundle of rays. Many of the variations described in the sections on the illumination portion of the first embodiment can also be used in this illumination portion 1.

Components 2a and 2b of the image creation portion 2 are dichroic mirrors used for color separation and composition, as in the first embodiment. It is clear that this color separation system is intended to be far simpler than that of the first embodiment. This is because a reflective image display device is used in the image creation portion 2. In this figure, 2i, 2g, and 2h denote display devices corresponding to each color, which specifically use a polymer dispersed liquid crystal. Alternatively, a reflective type of liquid crystal display device using a TN liquid crystal or a reflective type of image display device such as a DMD could be used. The reason why the principal light ray is inclined at a fixed angle to the normal of the image creation portion 2 is to prevent the bundle of rays reflected from the reflective image creation portion from vignetting shadows on the other structural components.

Dichroic prisms could be used instead of the dichroic mirrors 2a and 2b. This would be effective if it is not possible to guarantee a sufficient operating distance by simply inserting a color separation system, when a lens system is used in the imaging portion. However, this would greatly increase the cost in comparison with the dichroic mirrors of this embodiment. Furthermore, when dichroic mirrors are used in such a configuration, it is necessary to be careful not to cause any deterioration in the plane characteristics and resolution, since the contribution of the mirrors differs for each display device. Methods have long been known for preventing the deterioration of characteristics by using the mirrors not as plane parallel plates but as wedge plates.

This embodiment and the first embodiment are each configured in such a manner that the principal light ray from the illumination portion 1 that illuminates the image creation portion 2 is mutually parallel. This is not essential to the present invention, but such a configuration is often preferable when a projector is constructed in practice. A number of reasons could be given for this. One reason concerns the liquid crystal display device that is the main device configuring the image creation portion 2, which has a defect in that image contrast and characteristics such as transparency and hue can vary with the angle of the incident luminous flux. When using such a display device, it is therefore preferable to ensure that the principal light ray of the luminous flux that shines on the image creation portion 2 is incident either perpendicular to the image creation portion 2 or at as close as possible to a fixed angle thereto.

The same thing could be said of optical components using multi layer films, such as the dichroic mirrors that are employed in these embodiments to perform color separation and the dichroic prisms that are used in commercial products. Such optical components are sensitive to the angle of the incident luminous flux, which means that having different angles of incident luminous flux would require these components to have stringent specifications. Thus it is often best from various different viewpoints to ensure that the luminous flux passing through the image creation portion 2 satisfies the condition that it is parallel light.

The luminous flux that has passed through the image creation portion 2 is incident on the imaging portion 3. The imaging portion 3 of this second embodiment is configured of three reflecting mirrors 3a, 3b, and 3d having a common axis of rotation, and a stop 3c. The operation of the stop 3c is similar to that of the first embodiment. Since the principal light ray of the illumination luminous flux is parallel, the reflecting mirror 3a having an imaging action is, of course, concave and aimed toward the image creation portion 2. The reflecting mirrors 3b and 3d can take shapes that are either concave or convex, depending on the positions of the various mirrors. The luminous flux reflected by the image creation portion 2 passes the above described reflecting mirror 3a, the stop 3c, and the reflecting mirrors 3b and 3d, to form a secondary image on a screen 4 which is not shown in the figure. The imaging portion 3 of this embodiment is on the lower side of the illumination portion 1, but this is a convenient configuration when the projector is disposed on the ceiling or on an upper portion of a side wall. It is also a configuration that is not likely to be affected by the heat generated from the light source.

The above outlined the overall configuration of the second embodiment. The various structural components will now be described in a little more detail. Since components of the illumination portion 1 such as the reflecting mirrors 1b and 1c close to the light source are subjected to temperatures in excess of 200 degrees [Centigrade] if it is an electric discharge lamp, they will inevitably be susceptible to the effects of heat and there is a worry that they will deform or change with time. The use of a heat-resistant material such as a synthetic resin, glass, or metal could therefore be considered, but, of these materials, glass has a good affinity for reflecting films and there is a wide selection range, so it is effective for use in portions close to the light source and places where the luminous flux is focussed.

However, the shapes of the various control surfaces that configure the illumination portion 1, as described above, are generally not simple shapes such as spherical surfaces, so the fabrication thereof leads to difficulties. Furthermore, a comparatively high shaping accuracy is required, in comparison with the rough accuracy of 50 to 100 $\mu$m that is the shaping accuracy of reflecting mirrors such as parabolic surfaces used for illumination in the prior art. Various methods, such as grinding, bending, glass molding, or precision glass molding could be considered as the method for creating these desired glass shapes. Using grinding alone to fabricate such an optical system is time-consuming and disadvantageous from the cost point of view. Therefore the first method to consider is, of course, molding. But even the same molding covers a number of fabrication methods. Since there is currently no fabrication method that satisfies all of the conditions of size, shape, and accuracy simultaneously, it is necessary to consider the advantages and disadvantages of each fabrication method before selecting a method that is suitable for the product and place of use.

For glass, the molding temperature is extremely high, leading to many restrictive conditions. However, a reflective surface does not require a large thickness difference as a lens does, so it can basically have a uniform thickness. Moreover, since only shaping is required, the material that is easiest to shape can be selected. Whichever of the above methods is selected, a reflective surface is advantageous from the mass-production point of view in that there are few restrictions on a favorable cycle of conditions, in comparison with the ordinary molding of a lens. The reflecting mirrors configuring the illumination portion 1 of this embodiment are constructed to use rotationally symmetrical surfaces, but this is an advantageous condition in the fabrication thereof in practice. This is because a rotationally symmetrical surface can be machined on a lathe, making it easy to achieve accuracy. Milling machines that make it possible to machine freely curved surface to a comparatively high level of accuracy have recently appeared on the market, but a lathe is most convenient when the grinding of the subsequent processing and maintenance are considered.

The description now proceeds to the configuration of the imaging portion 3, but the same methods as those used in conventional lens design can be applied if the imaging portion 3 is configured of reflecting mirrors 3a, 3b, and 3d having a common axis of rotation, as in this embodiment. The previous description has already touched upon curving the screen 4 as means of reducing the number of aberrations that have to be controlled, but this is equivalent to controlling the Petzval Sum of the imaging portion 3. This is a standard procedure during ordinary lens design. By previously controlling the Petzval Sum according to the degree of curvature of the screen 4, the main aberrations to be corrected in the imaging portion 3 can be reduced to astigmatism and distortion, as previously mentioned. With a reflective system, it is not possible to use Petzval Sum correction on differences in refractive index between the wide range of glass materials, unlike in a refractive system.

Consider a case in which the imaging portion 3 is configured of two aspheric reflecting mirrors 3a and 3b, as shown in FIG. 25, as a real-life example. o—o in FIG. 25 denotes a common axis of rotation (optical axis). The luminous flux emitted from the image creation portion 2 is reflected by the reflecting mirror 3a then is again reflected by the reflecting mirror 3b to form a secondary image on the screen 4. During this time, the combined focal distance f and the Petzval Sum p are given by the following equations:

$$\frac{1}{f} = \frac{1}{f_{3a}} + \frac{1}{f_{3b}} - d1 \times \frac{1}{f_{3a}} \times \frac{1}{f_{3b}}$$

$$p \propto \frac{1}{f_{3a}} + \frac{1}{f_{3b}}$$

where each subscripted f denotes the focal distance of the corresponding reflecting mirror 3a or 3b and d1 denotes the distance between the two reflecting mirrors along the optical axis. Therefore, if the screen 4 is flat, there ought to be no field curvature and thus the Petzval Sum is zero, so that f3a and f3b have to be made to have the same absolute value but with opposite signs. This leads to a combination of a concave reflecting mirror and a convex reflecting mirror of the same curvature. In that case, the only way to ensure the combined focal length f of the imaging portion 3, which is determined by the projection distance and the enlargement magnification, is to adjust the sole remaining paraxial parameter d1. Of course it is not necessary to make the radii of curvature strictly equal; it goes without saying that in practice there is a range within which aberrations can be corrected. The decision as to what value to set for the optimal Petzval Sum depends on factors such as the distance from the optical axis of the image creation portion, the focal distance, and the disposition.

When the imaging portion 3 is configured of about two or three reflecting mirrors, it is possible to set up equations relating to a number of paraxial conditions concerning imaging and the Petzval condition, select a physically possible layout, and sequentially try out corresponding aberration corrections, in the same manner as in the above deliberations. The specific shape of each of the reflecting mirrors is then determined by optimization in which the remaining aberrations are observed and reduced. If these surface shapes are rotationally symmetrical with respect to the optical axis, an aspheric surface equation for the conic curved surfaces that are often used in ordinary optics, to which is added high-order correction terms, can be used as follows:

$$Z = \frac{ch^2}{1 + \sqrt{1 - (1+k)c^2h^2}} + Ah^4 + Bh^6 + Ch^8 + Dh^{10} + Eh^{12} \ldots$$

Figure 26:
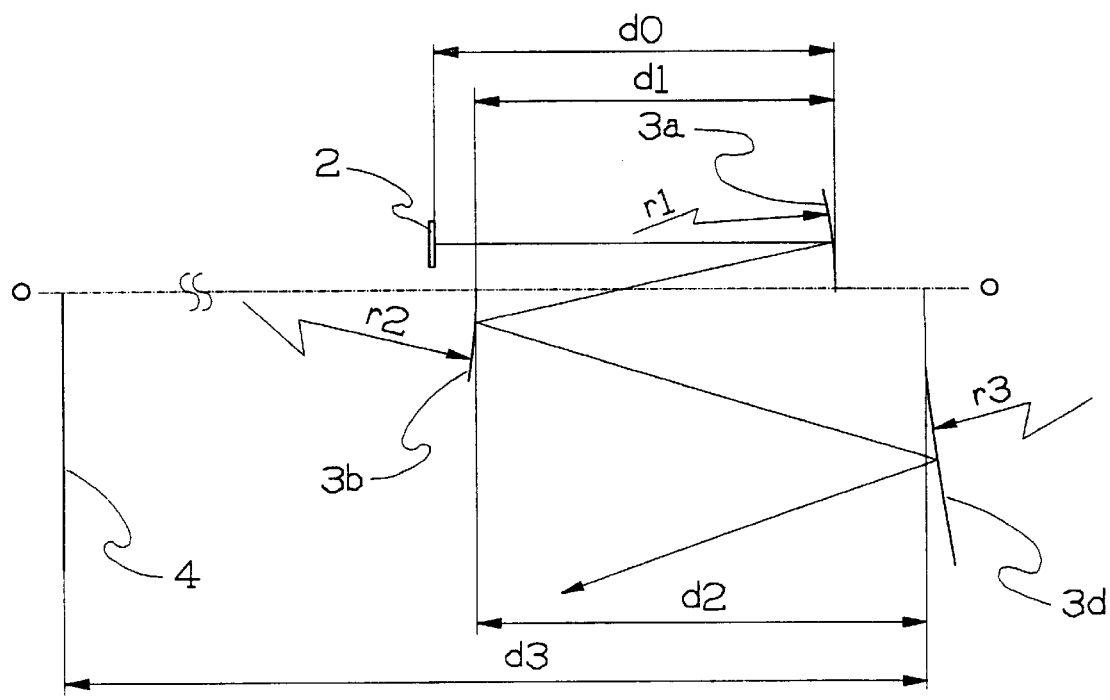
FIG. 26 shows a first example in which the reflective optical means of the imaging portion is configured of three mirrors.
Figure 27:
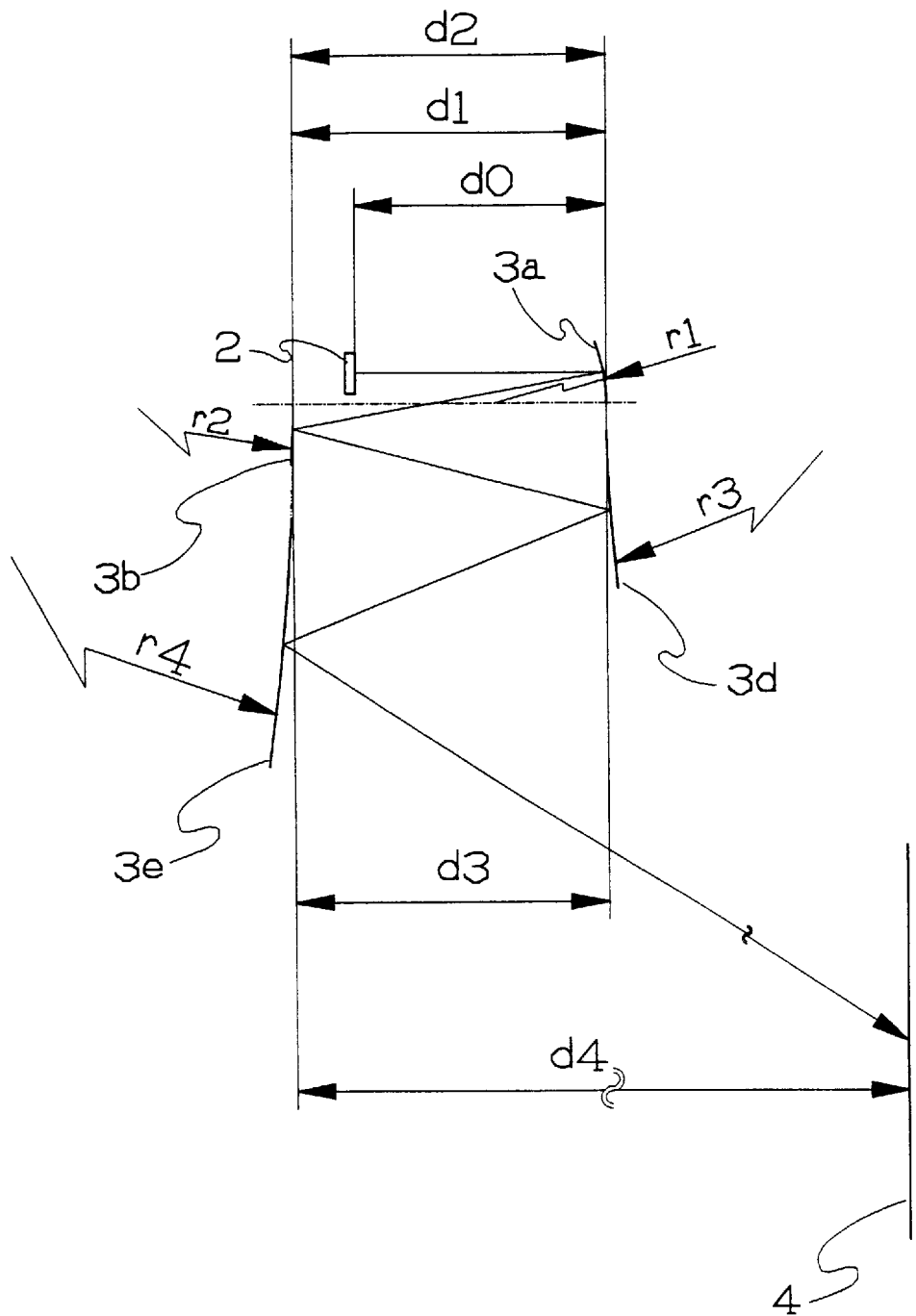
FIG. 27 shows a first example in which the reflective optical means of the imaging portion is configured of four mirrors.

Note that z denotes the depth of the surface; h denotes height from the optical axis; k denotes a conical constant; c=1/r denotes a paraxial curvature (where r is the paraxial radius of curvature); and A, B, C, . . . denote high-order correction coefficients. However, it is not necessary to be limited to this equation, representative forms such as general polynomials or spline functions are naturally possible as well. The above described methods of controlling the Petzval Sum appear to restrict a limited number of parameters even further and thus destroy the degree of freedom of design, but it is clear that in practice the testing of designs enables skillful aberration correction. It also makes it possible and easy to ensure a long back focus, which is difficult with a refractive system. Other embodiments of such designs are combined with the embodiment of FIG. 25 and are shown in FIGS. 25 to 27. The radius of curvature, spacing, and coefficient data for aspheric surfaces corresponding to each of these figures are listed in Tables 1 to 3. The reference numbers used in Tables 1 to 3 correspond to those used in each of these figures. For example, d denotes distance along the optical axis; r denotes the paraxial radius of curvature of the above aspheric surface equation for each surface; and k, A, B, C, and D denote the same coefficients as those in the above aspheric surface equation. Note that notation such as "E-8" in these tables is. used to represent the exponential $10^{-8}$.

TABLE 1

| Radius of Curvature | Spacing | Optical characteristics | |
|---|---|---|---|
| | d0 = 160.64 | Focal distance mm | 57.4 |
| r1 = 237.98 | d1 = 299.8 | Magnification | −43 |
| r2 = 341.01 | d2 = 2387.1 | F No. | 16.4 |
| | | Cone angle φ (deg) | 3.5 |
| | | Half field angle (deg) | 31 |

TABLE 1-continued

| Aspheric surface coefficient for 3a | k | A | B | C | D |
|---|---|---|---|---|---|
| | -1.2228 | -0.14603E-8 | 0.28326E-12 | 0.37877E-15 | 0.22407E-18 |
| | — | E | F | G | H |
| | | — | — | — | — |

| Aspheric surface coefficient for 3b | k | A | B | C | D |
|---|---|---|---|---|---|
| | -2.6045 | -0.49317E-7 | 0.58936E-11 | -0.87122E-15 | 0.16611E-18 |
| | — | E | F | G | H |
| | | — | — | — | — |

TABLE 2

| Radius of Curvature | Spacing | Optical characteristics | |
|---|---|---|---|
| | d0 = 189.5 | Focal distance mm | 51.97 |
| r1 = 246 | d1 = 235 | Magnification | -43 |
| r2 = 282.35 | d2 = 143.95 | F No. | 8.97 |
| r3 = 1290.715 | d3 = 2070.8 | Cone angle φ (deg) | 6.4 |
| | | Half field angle (deg) | 32.2 |

| Aspheric surface coefficient for 3a | k | A | B | C | D |
|---|---|---|---|---|---|
| | — | — | — | — | — |
| | — | E | F | G | H |
| | | — | — | — | — |

| Aspheric surface coefficient for 3b | k | A | B | C | D |
|---|---|---|---|---|---|
| | -0.25629 | 0.94371E-7 | 0.32131E-10 | -0.13339E-13 | 0.29074E-17 |
| | — | E | F | G | H |
| | | — | — | — | — |

| Aspheric surface coefficient for 3c | k | A | B | C | D |
|---|---|---|---|---|---|
| | -125.52 | -078287E-8 | -013295E-13 | 0.49958E-17 | -0.96084E-22 |
| | — | E | F | G | H |
| | | — | — | — | — |

TABLE 3

| Radius of Curvature | Spacing | Optical characteristics | |
|---|---|---|---|
| | d0 = 197 | Focal distance mm | 23.54 |
| r1 = 273.94 | d1 = 250 | Magnification | -43 |
| r2 = 766.81 | d2 = 250 | F No. | 11.3 |
| r3 = 479.56 | d3 = 150 | Cone angle φ (deg) | 5 |
| r4 = 900 | d4 = 800 | Half field angle (deg) | 50.7 |

| Aspheric surface coefficient for 3a | k | A | B | C | D |
|---|---|---|---|---|---|
| | 0.0855 | -0.11272E-10 | -0.43178E-11 | 0.72344E-14 | -0.40083E-17 |
| | — | E | F | G | H |
| | | — | — | — | — |

| Aspheric surface coefficient for 3b | k | A | B | C | D |

TABLE 3-continued

| | | | | | |
|---|---|---|---|---|---|
| | 75.894 | 0.27461E-7 | −0.72184E-11 | 0.49008E-14 | −0.14449E-17 |
| | — | E | F | G | H |
| | — | — | — | — | — |
| Aspheric surface coefficient for 3c | k | A | B | C | D |
| | −0.1734 | −0.44094E-8 | −0.17056E-12 | −0.61638E-17 | 0.61575E-21 |
| | — | E | F | G | H |
| | — | — | — | — | — |
| Aspheric surface coefficient for 3d | k | A | B | C | D |
| | −65.061 | −0.59731E-10 | −0.36302E-15 | −0.14193E-20 | 0.13839E-26 |
| | — | E | F | G | H |
| | — | — | — | — | — |

It would be extremely advantageous to be able to construct the imaging portion 3 of only a few reflective optical components. It would, for example, enable constructive use of synthetic resins. With lenses, there is the problem of the refractive index of the material changing with temperature and it is also difficult to obtain a uniform material that has a good transmissivity, so the employment of synthetic resins is limited. In the past, the objective lens for compact discs was one successful example thereof. In that case, the wavelength used is a single wavelength, the angle of view is small, and also focal adjustment is performed mechanically by a drive mechanism. This means that changes in refractive index due to temperature are not a problem. However, the use of such materials in the lenses of cameras or the like is limited to non-crystalline materials such as polycarbonate (PC) or polymethyl methacrylate. Furthermore, circuitry for temperature compensation must be provided in order to cope with temperature variations.

On the other hand, with a reflective system, the luminous flux does not pass through optical material, unlike in a refractive system, so the only accuracy necessary is that of the surface shapes that reflect the light. This broadens the range of selectable materials and also makes it possible to optimize the materials to suit the surface shapes and the portions used. It is also possible to select materials that have a comparatively small linear expansion ratio and little form shrinkage, to handle temperature variations. The shaping method that is most suited to the purpose can also be selected. Thus this system differs from lenses in that it is advantageous from many viewpoints, such as materials, fabrication method, cost, and weight.

Figure 28:
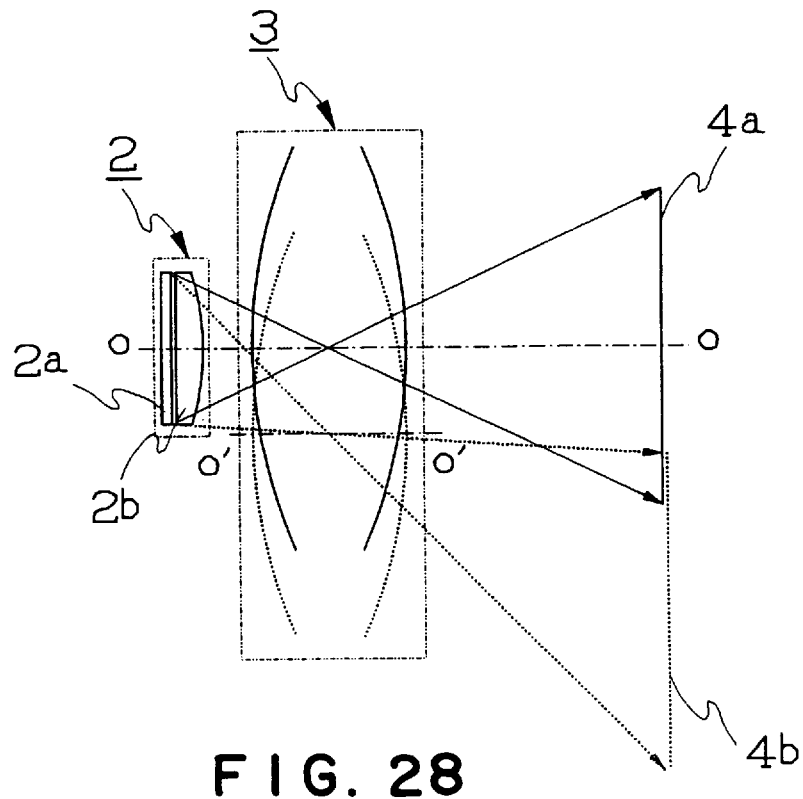
FIG. 28 is a conceptual diagram of adjustment concomitant with a change in projection position with this invention.

There is another advantage in configuring the imaging portion 3 of reflective optical components and enabling fabrication by molding, as means for implementing oblique projection. To implement oblique projection by a refractive system in the prior art, it was necessary to design for a large angle of view beforehand, and prepare large-diameter lenses which included parts that could not be used in practice. This state is shown in FIG. 28. During ordinary projection, the luminous flux from the image creation portion 2 passes through the imaging portion 3 configured of a refractive system, then is projected onto the screen 4. The form of the imaging portion 3 is shown idealized; it does not represent an actual configuration. Within the image creation portion 2, 2a is the portion that actually creates the image and 2b is a condenser lens for focussing the principal light ray. For oblique projection, the optical axis o—o of the imaging portion 3 must be offset to o'—o', as shown by the dotted line. Aberration correction is applied beforehand, on the premise that this offset will occur. The portion through which the luminous flux passes in practice is limited to part of the imaging portion 3, but if the lens is not made to be circular, the cost will increase and furthermore a high degree of accuracy on the order of 1/100 mm is demanded of the optical axis and centering adjustment, so that assembly is not easy either. It is therefore necessary to create and assemble a large circular lens.

Since there is no such restriction when a reflective optical system is created by molding means, it can be created with a freely selectable external form. Therefore, since this projector can be created from the start to be within a range in which it will be used in practice, it can naturally be made smaller and less expensive. In addition, the cone angle φ of the luminous flux that is used is small, so that a comparatively coarse accuracy will suffice, facilitating assembly.

Variations in the position of the projection-type display device will now be considered. First of all, consider a case in which the screen 4 is fixed but the position of the device varies parallel thereto. To change the way of looking at this situation: it is the same as if the device is fixed but the projected image thereof is moved parallel to the screen. With a lens of a refractive system, this adjustment is enabled by moving the lens system in a direction perpendicular to the optical axis. This is illustrated schematically in the previously mentioned FIG. 28. In other words, if an image initially projected at 4a on the optical axis, as shown by the solid lines, moves to a dotted-line position 4b on the lower side of the figure, it is of course best for the optical axis of the lens to be moved by a fixed quantity downward, as shown by o'—o'.

Figure 29:
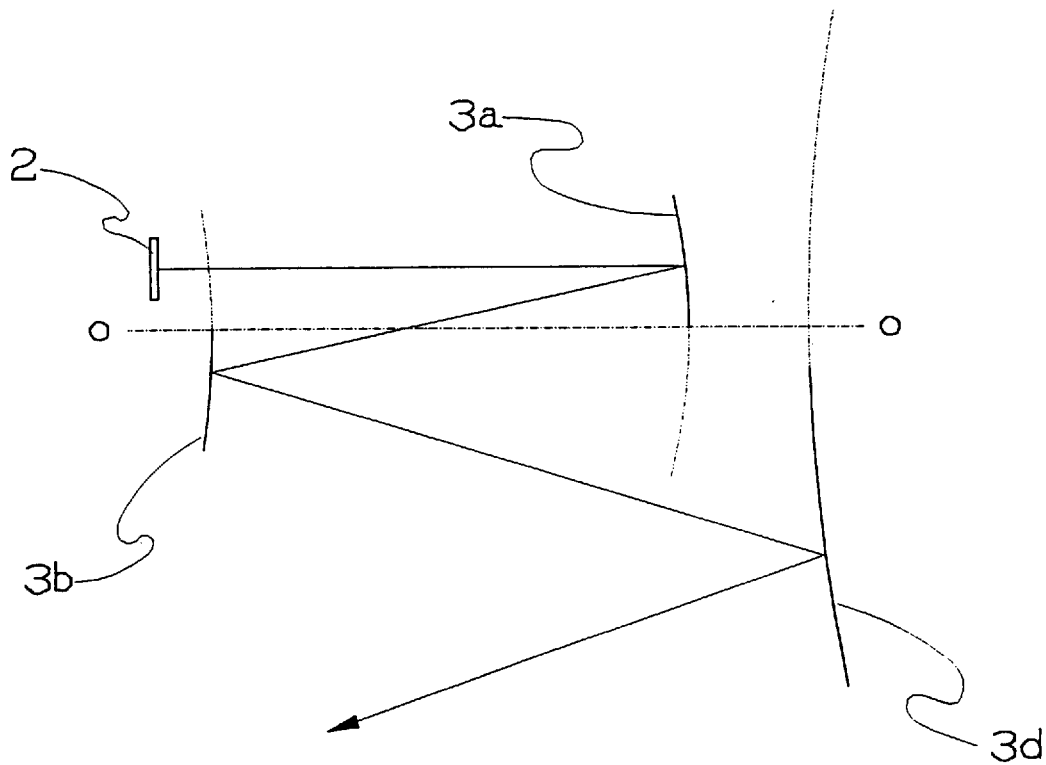
FIG. 29 is a sectional view of a case in which the imaging portion of this invention is configured of reflecting mirrors.
Figure 30:
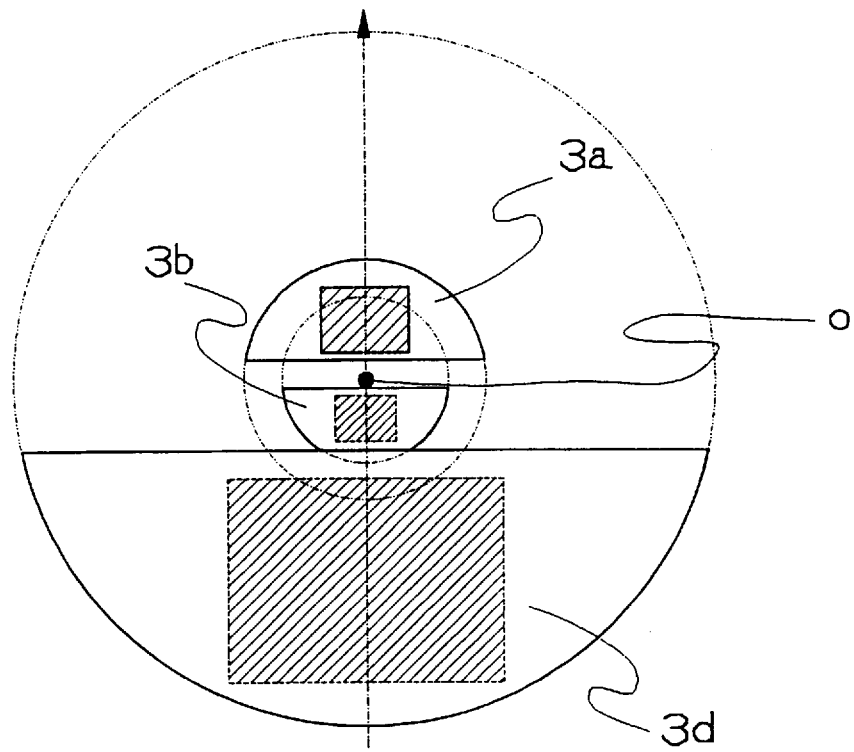
FIG. 30 shows the portions used by luminous flux when the imaging portion of this invention is configured of reflecting mirrors.
Figure 31:
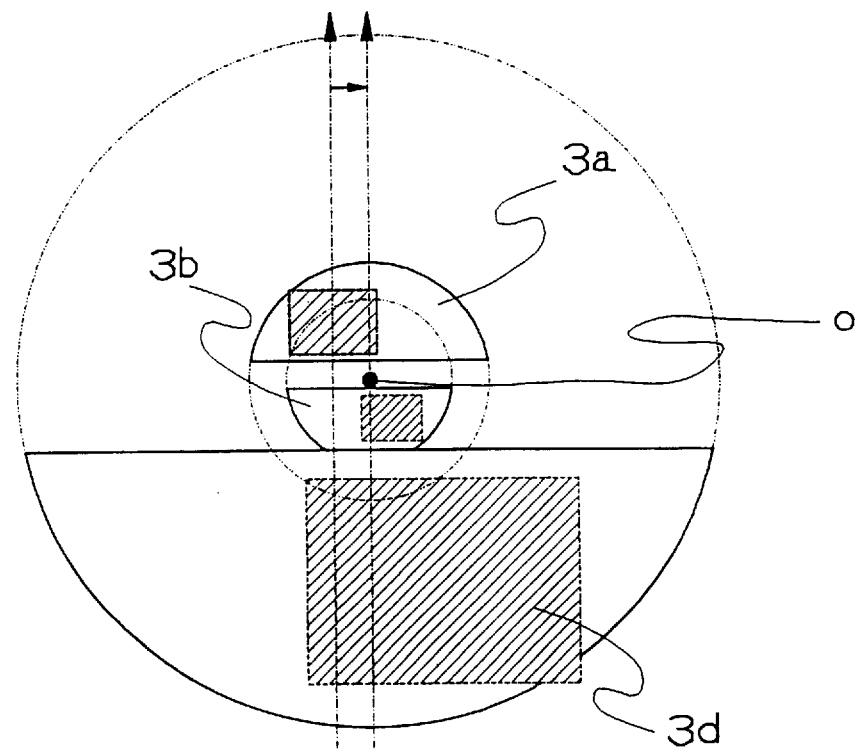
FIG. 31 shows a change in the portions used when the imaging portion of this invention is configured of reflecting mirrors.

If the imaging portion 3 is configured of reflective optical components, position adjustment can be done by basically the same principle. However, in this case it is necessary to make the optical components slightly larger than in a fixed projector, to match the variation range. Schematic views of this are shown in FIGS. 29 to 31. FIG. 29 is a sectional view of a case in which the imaging portion of this invention is configured of three rotationally symmetrical reflecting mirrors 3a, 3b, and 3d having the same optical axis. Reference number 2 denotes a image creation portion.

FIG. 30 shows the regions of the reflecting mirrors of this imaging portion that are used when a screen 4, which is not shown in the figure, is positioned below a line extending from the optical axis o—o and projection is downward. This figure shows the state as seen from the right side of the mirror 3d, on a line extending from the optical axis o—o. The shaded portions show the regions of the reflecting mirrors through which the luminous flux passes in practice. The slightly thicker dashed lines shown on the reflecting mirror 3a represent the position of the image creation portion 2. FIG. 31 shows a case in which the position of the optical system of the projector has been changed and projection is towards the lower right. As should be clear from a comparison with FIG. 30, the regions of the reflecting mirrors that are used have changed. To move the projection position to the left or right in this manner, the optical axis indicated by a dot in the figure could be moved to the left or right of the central axis of the image creation portion 2.

With the projector of this invention, oblique projection is intended from the start of the design considerations. Therefore, the projector will often be disposed in a position such as in close contact with a side-wall surface, where it will not be obstructive and it will not need to be moved frequently. However, if the partitions of a room such as a conference room are changed or if it is desired to change the magnification, it would be convenient to provide the imaging portion with a mechanism for moving it either intermittently or continuously, to make it possible to change the position of the device or the projection direction. Conversely, if the projector is to be used in a fixed position, the portions of the components that are used, as shown in FIG. 30, will be fixed so that it is obvious that the cost and size of the projector can be greatly reduced by creating only those portions that will be used. In accordance with this invention, it is not necessary to have coincident optical axes for the various reflective optical means that configure the entire imaging portion 3, but making the optical axes coincident will be useful from many points of view, including accuracy, when moving and adjusting the entire imaging portion 3.

The above described means provides a method of moving the projected image parallel to the image creation portion 2, which acts as a reference plane. However, it is also possible to make the reflecting mirror 3d of FIG. 29 oblique. If, for example, the projected image is to be moved in the vertical direction, this mirror 3d could be inclined within the plane of the paper. Unfortunately, this simple method leads to deterioration of the normal resolution and changes in distortion, so it is necessary to be cautious when using it.

Now consider a case in which the position of the projector is moved in the depthwise direction with respect to the screen 4. With the present invention, the cone angle $\phi$ of the collected luminous flux of the imaging portion 3 is set to be as small as possible, so that as a result the imaging portion 3 has an extremely shallow focal depth. However, if the projection distance has been greatly changed or if more brightness is required and the cone angle $\phi$ has been increased to the limit, it is of course necessary for the projector to have a focus adjustment mechanism in the same manner as in a general-purpose optical system. This corresponds to the focus adjustment of an ordinary lens system, and various methods can be considered therefor. One method of focus adjustment that can be considered is to move the entire imaging portion 3 with respect to the image creation portion 2 and thus change the magnification, in a totally commonplace manner, but this is terrible because an elaborate movement mechanism is necessary for moving the entire assembly. It would therefore be more advantageous to move one of the components of the imaging portion 3 to adjust the focus. This embodiment enables this type of adjustment by subtly moving only the first reflecting mirror 3a of the imaging portion 3 along its optical axis.

Furthermore, not only the above described focus adjustment, but also correction of aberration changes concomitant with the change in projection distance can be employed. Such adjustment can be implemented by moving one of the optical components in the direction normal to the reference plane of the image creation portion.

When a polymer dispersed liquid crystal is used in the image creation portion of a projector having an illumination portion based on luminous flux control, as in this invention, the luminous flux from the illumination portion 1 is controlled in such a manner that it is incident on the image creation portion 2 efficiently and with a small cone angle $\theta$, so that it has a direct link to increased brightness. Since the imaging portion 3 uses only luminous flux of a small cone angle $\phi$ of 8 degrees or less, resulting in a large F number, this also contributes an increase in contrast. As a result, oblique projection, uniform brightness, magnified projection over a short distance, and a deep focal depth, which are objectives of the present invention, can be achieved simultaneously without overloading the optical system, making it an even more suitable display device for the projection-type display device of the present invention. One requirement of the image creation portion of this invention is that control is provided in such a manner that the cone angle of the luminous flux does not vary before and after that portion. Note that, with a polymer dispersed liquid crystal, the cone angle of the luminous flux varies greatly in dispersion mode, but there is virtually no variation in the cone angle in transparent mode.

The above detailed description concerned a second embodiment of the present invention. The use of a reflective system in the imaging portion 3, as described in this embodiment, ensures that the imaging portion does not become bigger, thus making it possible to construct a light, inexpensive projector. It is necessary to emphasize once again that, as a result, this makes it possible to position the projector on a side-wall surface where it does not obstruct the viewers with respect to the screen.

Figure 6:
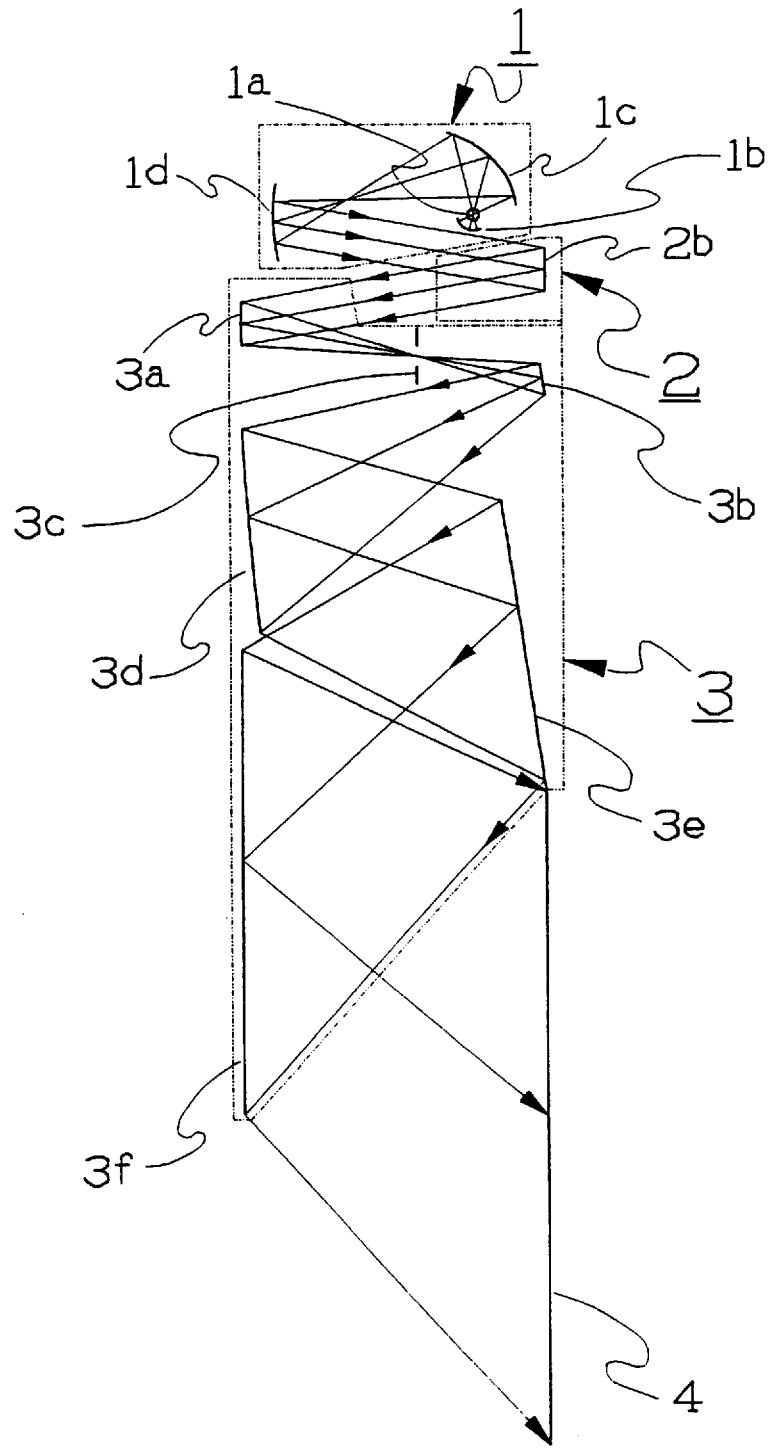
FIG. 6 is a sectional view of a third embodiment of the present invention.

A third embodiment of this invention is shown in FIG. 6. This embodiment differs from the front projection type projector of the first and second embodiments in that it is an example of a rear projection type display device that uses a method of projecting onto a screen from the opposite side to that of the viewers. In comparison with a front projection type projector, a rear projection type projector is not likely to be affected by external light and thus an image with a comparatively good contrast can be obtained. The biggest technical problem to be solved with a rear projection type display device is making it thinner, but the main cause thereof is the focal length of the imaging portion. In other words, as the focal length becomes shorter, the projection distance can be reduced, and thus the device itself can be made thinner. However, shortening the focal length makes the imaging system more complicated, increasing the cost.

Figure 44:
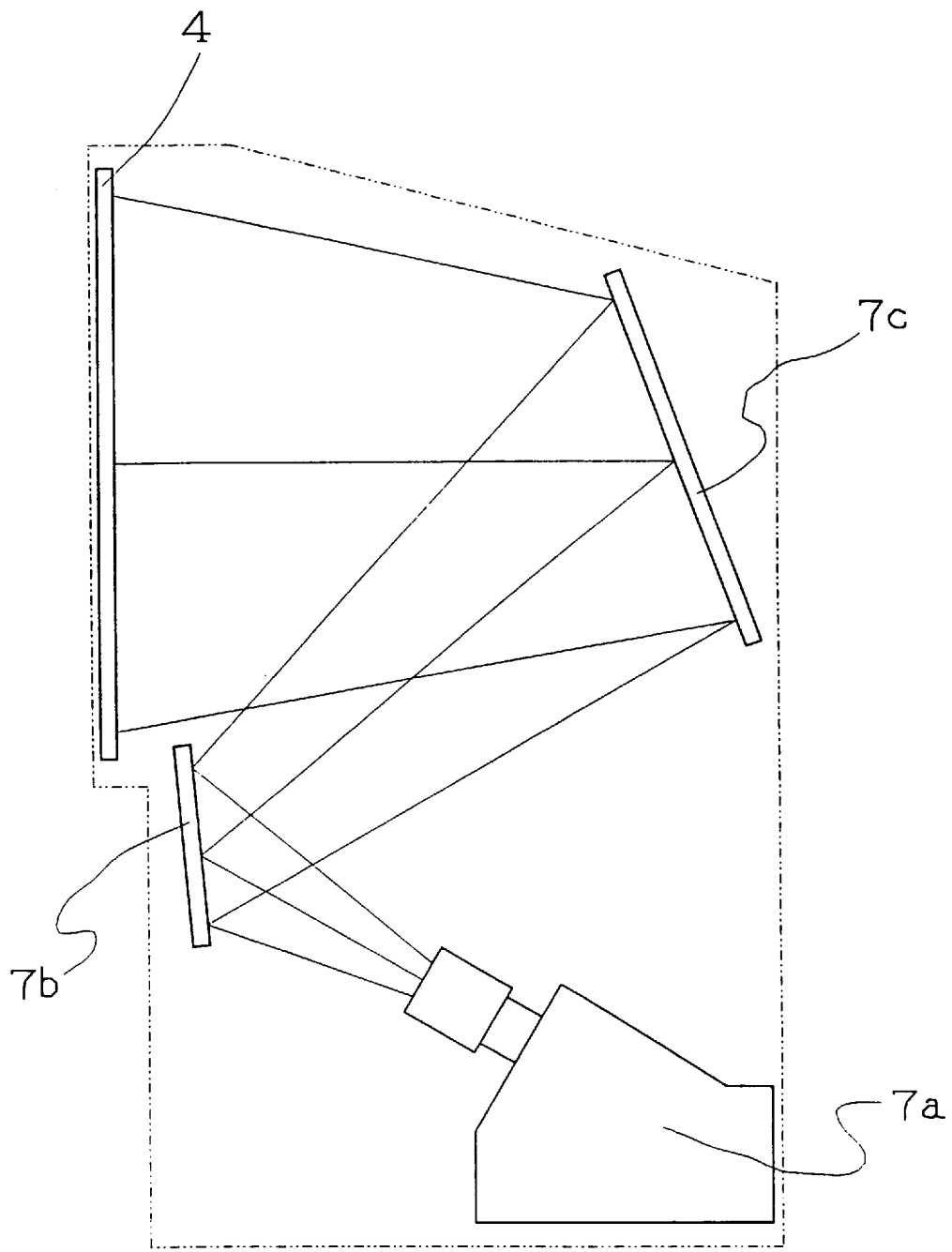
FIG. 44 is a conceptual diagram of a prior-art rear-plane projection-type display device.
Figure 45:
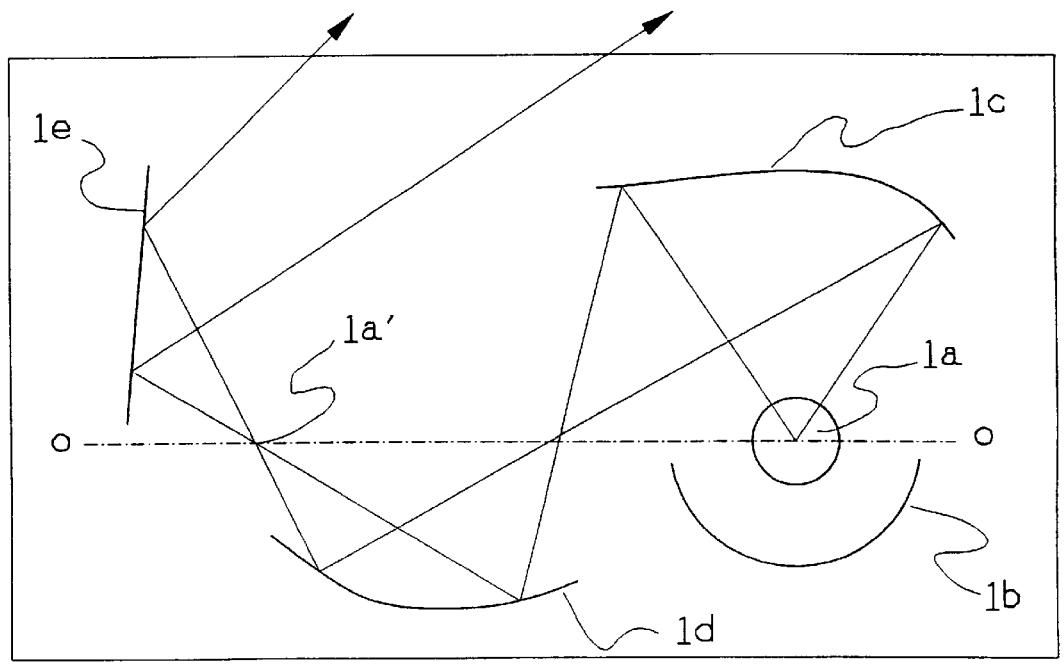
FIG. 45 is a cross-sectional view through the structure disclosed in Japanese Patent Publication No. 6-1295.
Figure 46:
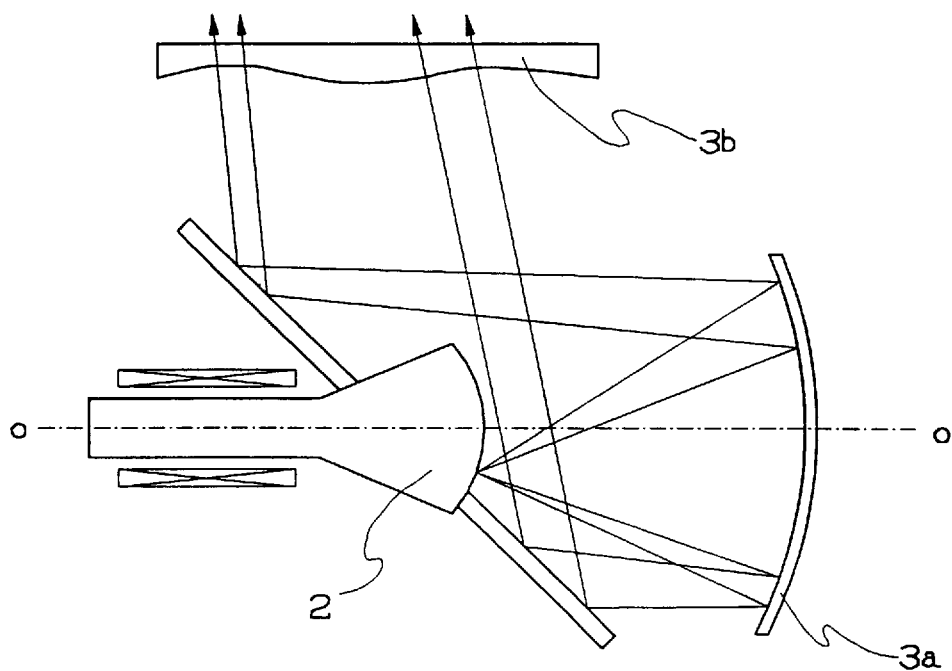
FIG. 46 shows the configuration of a prior-art projection-type display device using a Schmidt optical system.

The configuration of the illumination portion 1 and image creation portion 2 of this embodiment is basically the same as that of the second embodiment shown in FIG. 5, so further description thereof is omitted. A particular feature of this embodiment is the configuration of the imaging portion 3. The imaging portion shown in FIG. 6 comprises five reflecting mirrors, which are four reflecting mirrors 3a, 3b, 3d, and 3e and a flat reflecting mirror 3f, and a aperture stop 3c. Luminous flux emitted from the image creation portion 2 is sequentially reflected in the above sequence to form a secondary image on the screen 4. A rear projection type display device of the prior art shown in FIG. 44 is clearly divided into the projector portion 7a and the flat reflecting mirrors 7b and 7c that are designed to fold the luminous flux; in contrast, the reflecting mirrors configuring the imaging portion in FIG. 6 also act simultaneously as reflecting mirrors that fold the luminous flux. It is therefore possible to compress the projection distance, even with a comparatively long focal distance. This is why no more than four flat reflecting mirrors can configure the imaging portion. The technical problem of making the device thinner is also solved, enabling the implementation of a 60-inch large-screen display with a depth of no more than 35 cm, without any forcing. In the prior-art example shown in FIG. 44, it is necessary to support the large flat mirror 7c, which folds the luminous flux, at an angle. To avoid this, a thin-film pellicle mirror could be used instead, but the flat mirror 3f of this embodiment could be simply suspended vertically. It is clear that an imaging portion 3 using such reflective optical components would exhibit features that attract attention in a rear projection type.

When the imaging portion is configured in this manner of four reflecting mirrors 3a, 3b, 3d, and 3e having an imaging action, the freedom of disposition thereof can also be ensured. With this embodiment, the configuration is such that 3a is a concave mirror, 3b is a convex mirror, 3d is a concave mirror, and 3e is a convex mirror. Different variations of the shapes of these surfaces are possible, such as concave-convex-convex-convex or concave-concave-convex-convex, but details thereof are omitted.

Figure 7:
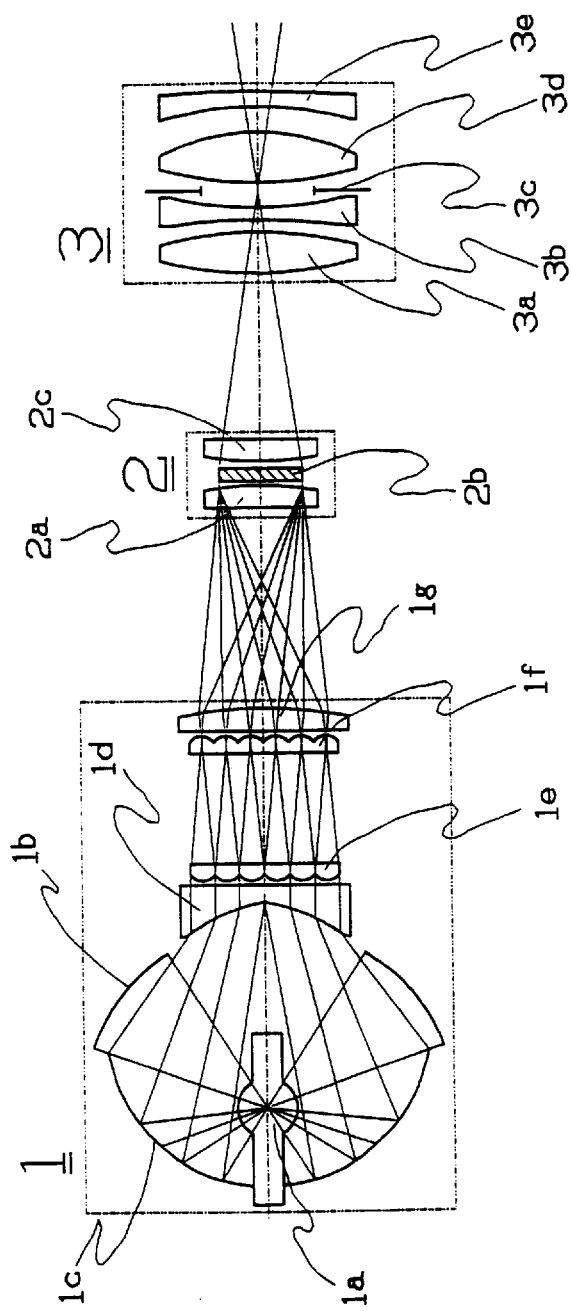
FIG. 7 is a sectional view of a fourth embodiment of the present invention.

Finally, a fourth embodiment of the present invention is shown in FIG. 7. The illumination portion 1 is configured of the light source 1a, reflecting mirrors 1b and 1c, and lenses 1d, 1e, 1f, and 1g. The reflecting mirror 1b is part of a spherical surface with the imaginary center of the light source 1a at the center thereof, to configure an auxiliary imaging device. The reflecting mirror 1c having a rotationally symmetrical surface configures a group of collection angle control components, together with the reflecting mirror 1b. The reflecting mirror 1c also configures a group of luminous flux control components, together with the lens 1d which also has the rotationally symmetrical surface. In this embodiment, an integrator configured of the lenses 1e, 1f, and 1g is provided between the image creation portion 2 and the group of luminous flux control components. This integrator configures a group of shape modification components. With this configuration, it is clear that the lenses 1d and 1e and the lenses 1f and 1g can each be made integral bodies, by facing the lenses 1e and 1f in opposite directions.

The image creation portion 2 is configured of a plano-convex lens 2a, a single sheet of transparent polymer dispersed liquid crystal display device 2b, and a plano-convex lens 2c. The lens 2a is a field lens for taking the principal light ray from the integrator and making it incident perpendicularly on the display device 2b. The lens 2c also acts as the same sort of field lens, for making the principal light ray emitted from the display device be incident on the entrance pupil of the imaging portion 3.

The imaging portion 3 is configured of four lenses 3a, 3b, 3d, and 3e having a common axis of rotation (hereinafter called the optical axis) and a aperture stop 3c.

The description of this embodiment concentrates on the group of shape modification components in particular. As described in the section on prior-art techniques, an integrator is extremely effective for making uniform the efficiency and the illuminance of the luminous flux. However, as disclosed in Japanese Patent Application Laid-Open No. 7-174974, with a configuration in which the luminous flux from the light source is sent directly into the integrator by a parabolic surface or the like, the cone angle and distribution of the luminous flux at the entrance surface of the integrator will not be uniform. Therefore, if 1f is configured of a lens array of the same size, coupling losses of the luminous flux will be generated between the components 1e and 1f.

This situation will now be discussed in a little more detail. An idealized view of a lens pair 1ea and 1fa on the corresponding lens arrays 1e and 1f that configure the integrator is shown in FIG. 32. The external shape of 1ea is approximately similar to that of the image creation portion 2. If the field lens 1g is considered to be merely means for bending the principal light ray in the direction of the image creation portion, it can be omitted for the moment. Therefore, the luminous flux from the group of luminous flux control components, shown by dotted lines in FIG. 32, is shaped into luminous flux having a cone angle γ by the arbitrary lens 1ea on the lens array configuring 1e. This luminous flux of cone angle γ forms an image on the image creation portion 2 by the lens 1fa corresponding to 1ea on the lens array 1f. Similarly, the principal light ray from the group of luminous flux control components passed through the lens 1fa to reach the same image creation portion 2, as shown by the dashed lines.

In an integrator of a structure that is faithful to this principle, if the principal light ray incident on 1ea is incident parallel to the optical axis, the distance between 1ea and 1fa is substantially equal to the focal distance. The optical magnification β of 1fa is determined by the ratio of the sizes of 1ea and the image creation portion 2. Therefore, it is clear that, if the other parameters are fixed and the number of divisions in 1e is made to be large, the imaging magnification of 1fa is also large. In this case, the cone angle θ' of luminous flux that passes through 1fa and also reaches the image creation portion 2 is given by:

$$\theta' = \frac{\gamma}{\beta}$$

From the above, it is clear that the basic position of the integrator is determined if the size of 1e, the number of divisions, and also the focal distance are determined. The cone angle θ' becomes one essential component that determines the cone angle of the luminous flux at the image creation portion 2.

Another essential component in the determination of the cone angle of the luminous flux at the image creation portion 2 will now be discussed. In addition to the above θ', there is also the angle θ, as shown in FIG. 33, which is determined by the size of the lens array 1f and the distance d2 therefrom to the image creation portion 2. This decreases as 1f becomes smaller or d2 becomes longer. In general, 1fa is configured as a magnifying system, so ordinarily:

$$\theta' < \theta$$

and the cone angle of the luminous flux at the image creation portion 2 is determined substantially by θ.

Therefore, the only way to make the cone angle θ of the luminous flux smaller is to reduce the size of the lens array 1f, as described above, or lengthen d2. If 1f is made smaller, the previously described Lagrange relationship causes the angle of divergence γ to increase. If d2 is lengthened, d1 of FIG. 32 inevitably lengthens too, in order to satisfy the magnification condition. In either case, the likelihood of luminous flux losses between 1ea and 1fa increases.

To view this a little more quantitatively, an abbreviated form of the efficiency will now be estimated, by once again using the previous specific equation derived from assuming a layout:

$$\frac{S}{\delta S} = \frac{2\pi}{\phi^2} \eta$$

Note that, since the target of luminous flux control is the entrance surface of the integrator, φ is not the cone angle at the image creation portion, but it corresponds to the cone angle γ at 1e of the integrator. To simplify the description, it is considered that the external shapes of 1e and 1f have the same dimension L. The number of divisions along the diagonal is n and the correction coefficient for the aspect ratio is k. Under these suppositions, the condition that ensures that no coupling losses occurs between 1e and 1f can be written as:

$$d_1 \tan\phi < k \times \frac{l}{n}$$

If the diagonal of the image creation portion is assumed to be Lg, the cone angle θ and the magnification β at the image creation portion are given by:

$$\tan\theta \approx \frac{l}{d_2}$$

$$\beta = \frac{d_2}{d_1} = n\frac{lg}{l}$$

Since S is the surface area of the integrator 1e:

$$S = \pi \left(\frac{l}{2}\right)^2$$

and thus the above can be rewritten as:

$$\eta < \frac{k^2 lg^2 \tan^2\theta}{8\delta S}$$

If the effective surface area δS of the light source is 1 mm² (1 mm×1 mm), the aspect ratio correction coefficient k is 0.6, the length Lg of the diagonal of the image creation portion is 25.4 mm, and luminous flux cone angle θ of the image creation portion is 8 degrees, substitution of those values into the above equation makes it clear that setting the efficiency η to 57% (collection angle of 35 degrees) or less causes the generation of coupling losses. Therefore, even an example that is thought to be comparatively useful could prove on closer inspection to have no leeway concerning efficiency. The above has clarified the importance of the group of collection angle control components comprising the auxiliary imaging device and the group of luminous flux control components, even when an integrator method is used as the group of shape modification components of the illumination portion.

The above described estimate calculation assumed that the lens arrays 1e and 1f configuring the integrator were each formed as lens arrays of the same dimensions. However, a certain amount of coupling losses can be avoided by varying the dimensions of each individual lens of 1f, shown in FIG. 34, according to the cone angle φ (γ) of the luminous flux on 1e. Thus it is necessary to adjust the angle of the principal light ray between 1e and 1f in order to vary the dimensions of individual lenses on 1f, while keeping the dimensions of the entire lens array 1f constant. It is also necessary to be skillful in arranging the individual lenses on 1f.

Figure 34:
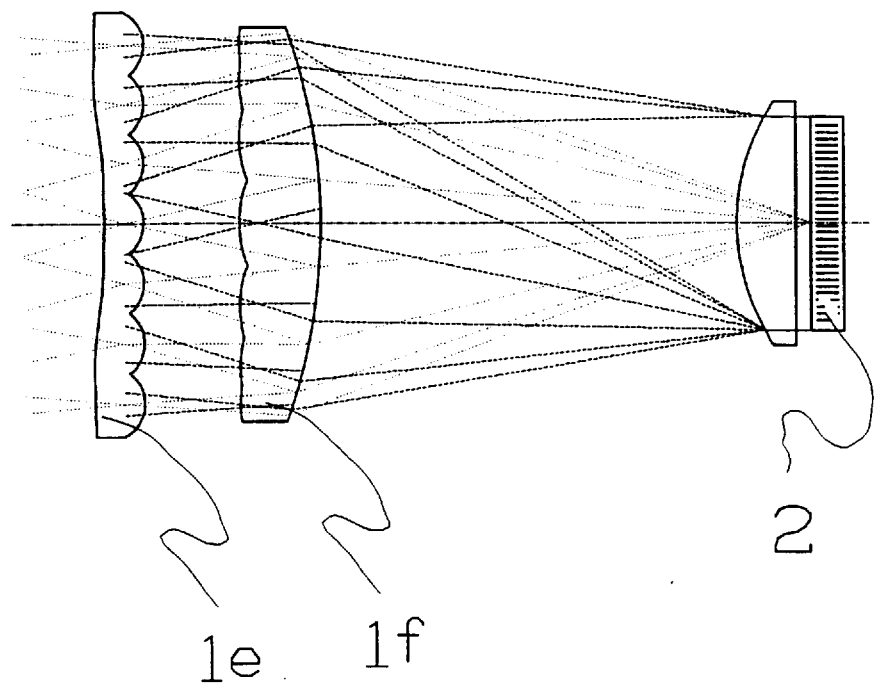
FIG. 34 shows a first example of a case in which the group of luminous flux control components is also used as a group of shape modification components.
Figure 36:
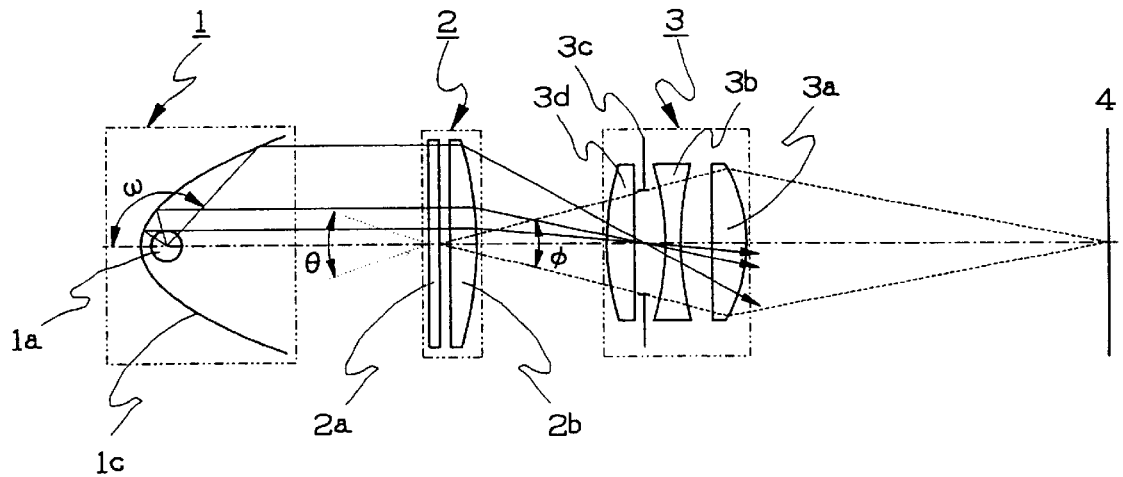
FIG. 36 is a perspective view of a prior-art projection-type display device.
Figure 37:
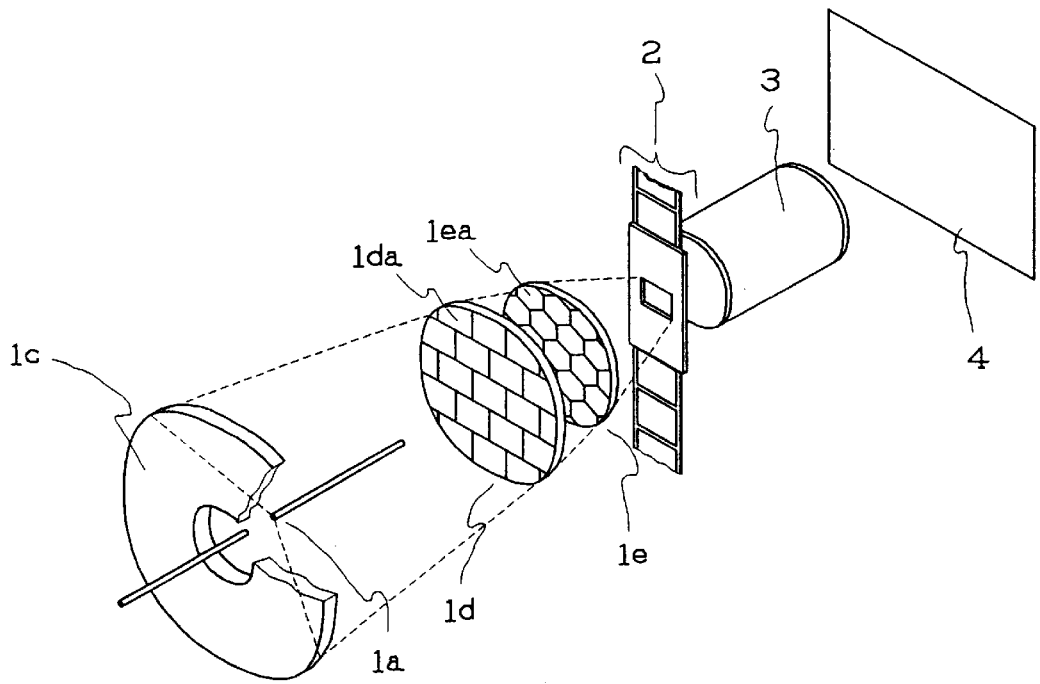
FIG. 37 shows the basic configuration of an integrator in accordance with U.S. Pat. No. 2,991,691.
Figure 38:
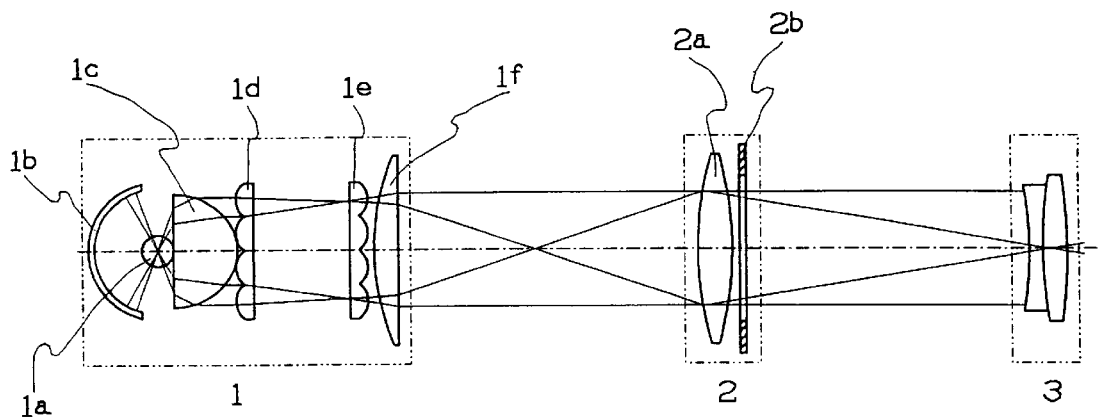
FIG. 38 shows a first basic configuration of an integrator in accordance with Japanese Patent Application Laid-Open No. 3-111806.
Figure 39:
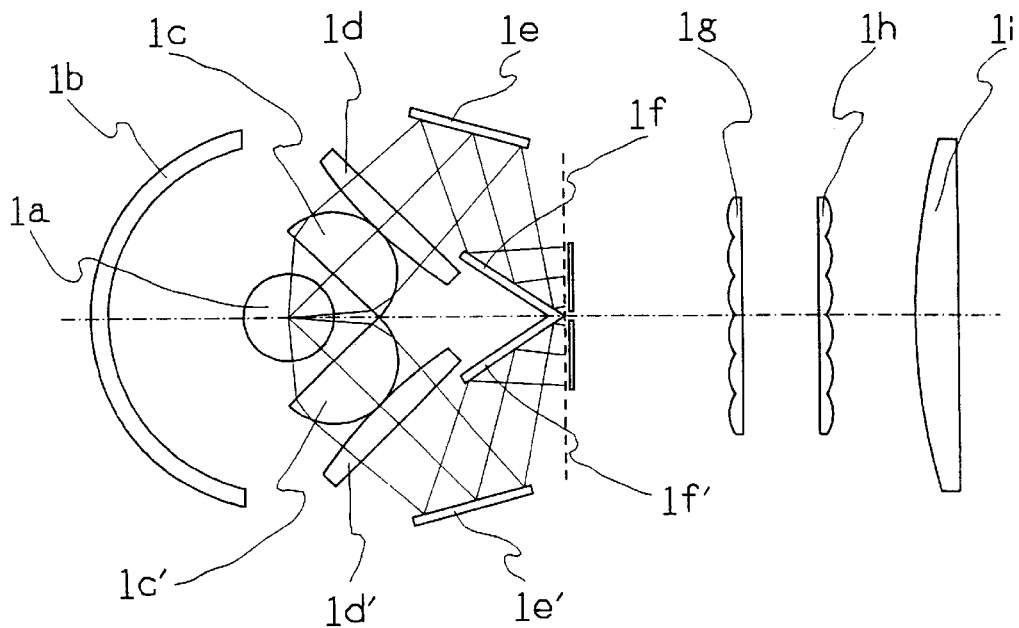
FIG. 39 shows a second basic configuration of an integrator in accordance with Japanese Patent Application Laid-Open No. 3-111806.
Figure 40:
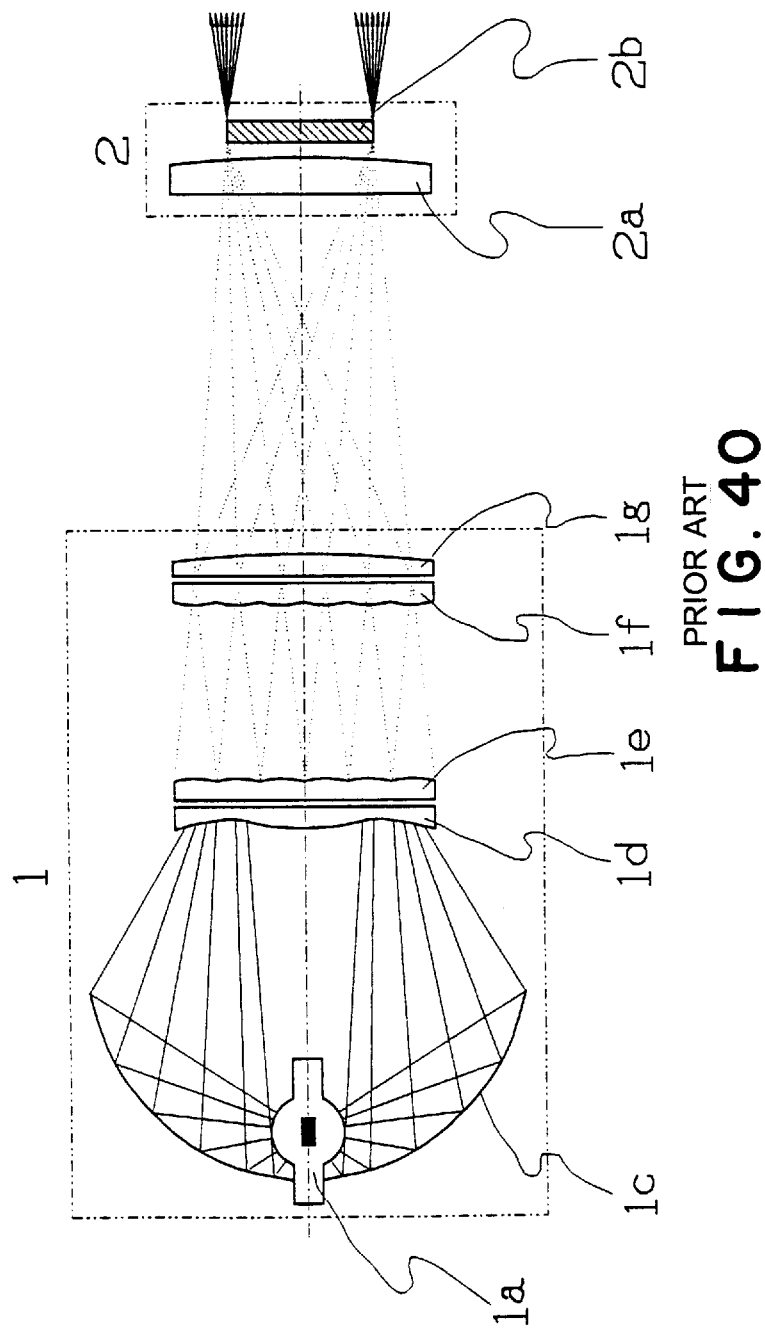
FIG. 40 shows the basic configuration of an integrator in accordance with Japanese Patent Application Laid-Open No. 7-174974.
Figure 41:
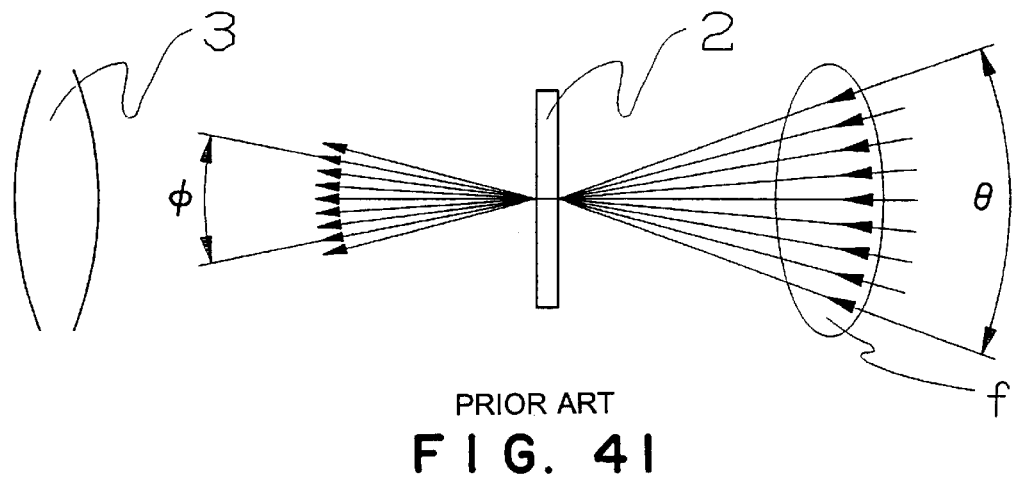
FIG. 41 is a conceptual diagram of the state of luminous flux when a transparent type of polymer dispersed liquid crystal is in a transparent mode.
Figure 42:
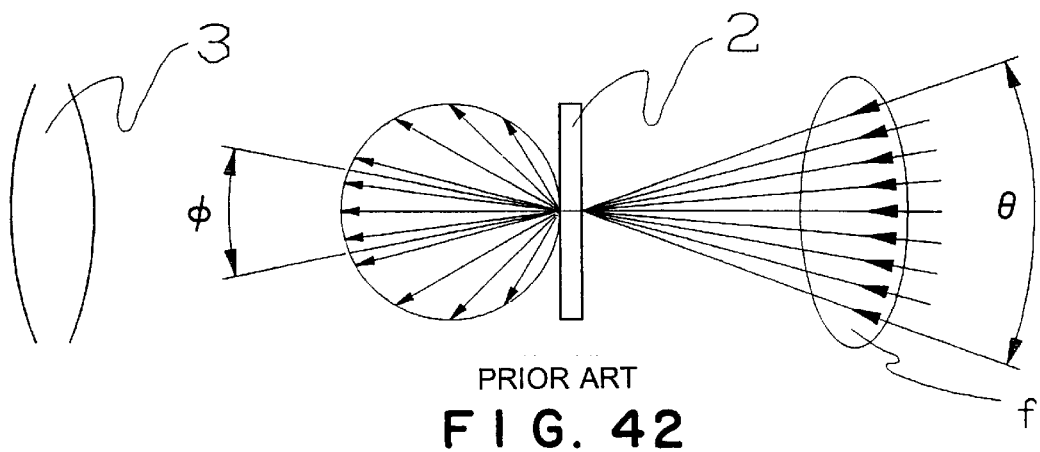
FIG. 42 is a conceptual diagram of the state of luminous flux when a transparent type of polymer dispersed liquid crystal is in a scattering mode.
Figure 43:
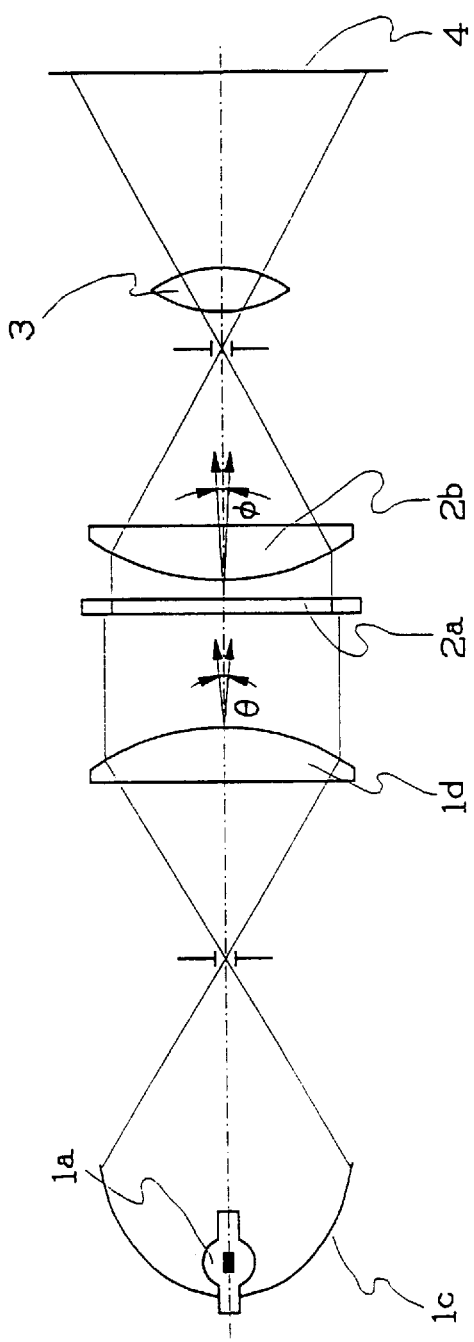
FIG. 43 is a conceptual diagram of a prior-art projection-type display device using a polymer dispersed liquid crystal.

Several methods could be considered for adjusting the principal light, ray, such as a method of offsetting the individual lenses of 1e, a method of using the surface on the entrance side of 1e, or a method of previously creating that angle by means of the group of luminous flux control components. Whichever method is used, each of them allocates the role of the group of luminous flux control components to the integrator. A case in which the integrator is configured of two components is shown in FIG. 34, but it can also be configured of a suitable combination of field lenses.

As can be seen from the above description, it is clear that when an integrator is used as the group of shape modification components, the operations of the group of luminous flux control components and the group of collection angle control components in the previous stage are important. In other words, the function of the integrator can be brought out by optimizing the size of the cone angle and the cone angle distribution. On the other hand, coupling losses will occur between the lens arrays 1e and 1f if only a parabolic mirror is used in the previous stage. It is possible to reduce coupling losses to a minimum by performing control according to the principles of the present invention, as shown in FIG. 7. It is also possible to bring about the same sort of effect even without the configuration in accordance with these principles, if the collection angle is strictly controlled, by allocating a luminous flux control function to the integrator, as described above, and intending to adjust the principal light ray and cone angle distribution between 1e and 1f.

The imaging portion 3 will now be described. Reference number 3a denotes a spherical surface of glass and 3b, 3d, and 3e are configured from aspheric lenses of synthetic resin. This imaging lens provides aberration correction with respect to an angle of view that is approximately twice that necessary for affecting the effective display portion of the image display device 2b, while having a simple configuration of only four components. The F number of the lens is 9.3 (a cone angle of the luminous flux of approximately 6 degrees). The device has a resolution of at least 50 lp/mm. The configuration is such that this lens can move perpendicular to the optical axis, together with the field lens 2c. This makes it possible to move the image freely both vertically and horizontally, as shown in FIG. 35, with respect to an ordinary projection screen.

This present invention as described above provides a bright, efficient projection-type display device which ensures that the depth of focus of an image projected on a screen is deep and also makes it possible to ensure uniform illumination, oblique projection, and magnified projection with a comparatively simple configuration.

Improvements to the illumination portion make it possible to increase the efficiency of luminous flux emitted from a light source, and increase the efficiency of the luminous flux even further and also prevent the appearance of influence on the direct image by components such as the light source, thus increasing the uniformity of a secondary image on the screen. Simplification of the overall size and configuration enable a reduction in cost.

Furthermore, a comparatively unimpeded design for the illumination portion can be promoted and, at the same time, highly accurate processing of mirror surfaces is possible. A basic concept for use when fabricating complicated shapes and non-rotationally-symmetrical systems is also provided. These are expected to improve capabilities and reduce costs. Improvements to the imaging portion are expected to reduce the dimensions and weight thereof and thus reduce costs, and also make it possible to make the entire device more compact and reduce the cost thereof, enable focus and resolution adjustments, enable adjustment of simplified movement and resolution of the projected image, and enable changes in the position of the projected image and further increase the degree of freedom of the installation location of the projector during oblique projection. Improvements to the image creation portion make it possible to obtain a bright, high-contrast image.

Industrial Applicability

The present invention provides a projection-type display device that can be used in a projection-type display device such as a liquid crystal device or a digital micromirror device that creates an image by moving a large number of small mirrors independently.

We claim:

1. A projection-type display device comprising a light source; an illumination portion consisting of a group of collection angle control components, which comprises at least one optical surface for receiving a principal light ray generated from an imaginary center of said light source and for controlling the solid collection angle thereof, and a group of luminous flux control components, which comprises at least two optical surfaces including a first optical surface for carrying out a spatial distribution control over the principal light ray in a virtual plane provided across a direction of propagation of the principal light ray emitted from said group of luminous flux control components and a second optical surface for receiving a principal light ray from said first optical surface and for controlling the direction thereof; an image creation portion for creating a original image by selectively reflecting or transmitting luminous flux from said illumination portion and for ensuring that a cone angle of the luminous flux contributing to the image creation does not greatly change before and after; and an imaging portion for collecting the luminous flux emitted from said image creation portion and creating a secondary image on a screen; wherein the following conditions are satisfied:

$$\frac{S}{\delta S} \geq 100, \phi \leq 8°$$

where S is an effective surface area of the image creation portion, $\delta S$ is an effective surface area of the light source that actually emits the luminous flux, and $\phi$ is the cone angle of the luminous flux which the imaging portion collects relating to the luminous flux emitted from the various components of the image creation portion.

2. The projection-type display device as defined in claim 1, wherein the group of collection angle control components comprises at least one optical surface of said illumination portion and is further provided with at least one auxiliary imaging device having at least one reflective optical means which makes the light source act as both object point and image point.

3. The projection-type display device as defined in claim 2, wherein the size of magnification of the auxiliary imaging device of said illumination portion, which acts as an imaging device, is at least one.

4. The projection-type display device as defined in claim 1, further comprising a group of shape modification components having at least one optical surface for converting the shape of the luminous flux to substantially the same shape as that of the image creation portion, said group of shape modification components being provided between the group of luminous flux control components of said illumination portion and said image creation portion.

5. The projection-type display device as defined in claim 4, wherein the group of shape modification components of said illumination portion comprises an optical integrator including at least two optical surfaces each having a large number of curved surfaces on the surface thereof in a lenticular form, and also the individual external shapes of a large number of curved surfaces formed on an optical surface closest to the group of collection angle control components are approximately the shape of the image creation portion.

6. The projection-type display device as defined in claim 4, wherein said group of luminous flux control components comprises at least two optical surfaces of said illumination portion and also has a shape modification function for luminous flux.

7. The projection-type display device as defined in claim 1, wherein, within said group of luminous flux control components comprising at least two optical surfaces of said illumination portion, an optical surface mainly having a spatial distribution control function for the principal light ray also has a collection angle control function.

8. The projection-type display device as defined in claim 1, wherein said group of collection angle control components and said group of luminous flux control components of said illumination portion comprise rotationally symmetrical surfaces having a common axis of rotation, and also each optical surface comprised within the group of luminous flux control components has a curved surface such that a principal light ray generated from the imaginary center of the light source, which is provided on the common axis of rotation, in such a manner as to subtend equal solid angles within any sectional plane comprising the axis of rotational symmetry is divided between areas of equal size on a virtual plane provided on the exit side of the group of luminous flux control components.

9. The projection-type display device as defined in claim 1, wherein an optical surface mainly having a direction control function for the principal light ray and being comprised within the group of luminous flux control components of said illumination portion has a surface figure such that the principal light ray after passing that optical surface is mutually parallel.

10. The projection-type display device as defined in claim 1, wherein said imaging portion comprises at least two reflective optical means.

11. The projection-type display device as defined in claim 10, wherein a reflective optical means of said imaging portion closest to the image creation portion and having an imaging action comprises a reflective optical means having the action of a concave reflecting mirror with respect to luminous flux generated from the image creation portion.

12. The projection-type display device as defined in claim 10, wherein at least one portion of said imaging portion is capable of movement in a substantially normal direction relative to said image creation portion which acts as a reference surface.

13. The projection-type display device as defined in claim 10, wherein at least one portion of said imaging portion is capable of being inclined relative to said image creation portion which acts as a reference surface.

14. The projection-type display device as defined in claim 1, wherein at least one portion of said imaging portion is capable of movement in a substantially parallel direction relative to said image creation portion which acts as a reference surface.

15. The projection-type display device as defined in claim 1, wherein said image creation portion comprises a polymer dispersed liquid crystal.

* * * * *